United States Patent
Sadilek et al.

(10) Patent No.: US 12,442,158 B1
(45) Date of Patent: Oct. 14, 2025

(54) AUTOMATED TRAINING AND USE OF PREDICTIVE MODELS FOR AUTONOMOUS CONTROL OF POWERED EARTH-MOVING VEHICLES

(71) Applicant: AIM Intelligent Machines, Inc., Monroe, WA (US)

(72) Inventors: Adam Sadilek, Monroe, WA (US); Ross Walker, Edinburgh (GB)

(73) Assignee: AIM Intelligent Machines, Inc., Redmond, WA (US)

( * ) Notice: Subject to any disclaimer, the term of this patent is extended or adjusted under 35 U.S.C. 154(b) by 0 days.

(21) Appl. No.: 19/004,294

(22) Filed: Dec. 28, 2024

(51) Int. Cl.
*E02F 9/20* (2006.01)
*E02F 9/26* (2006.01)
(Continued)

(52) U.S. Cl.
CPC .......... *E02F 9/2045* (2013.01); *E02F 9/2054* (2013.01); *E02F 9/26* (2013.01); *G05B 13/048* (2013.01); *G07C 5/008* (2013.01)

(58) Field of Classification Search
CPC ......... E02F 9/2045; E02F 9/2054; E02F 9/26; G05B 13/048; G07C 5/008
See application file for complete search history.

(56) References Cited

U.S. PATENT DOCUMENTS

| | | |
|---|---|---|
| 9,630,321 B2 | 4/2017 | Bradski et al. |
| 11,346,086 B1 | 5/2022 | Kikani et al. |

(Continued)

FOREIGN PATENT DOCUMENTS

| | | |
|---|---|---|
| CN | 111942200 A | 11/2020 |
| CN | 115205395 A | 10/2022 |

(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.

(Continued)

*Primary Examiner* — James J Lee
*Assistant Examiner* — Steven Vu Nguyen
(74) *Attorney, Agent, or Firm* — VLP Law Group LLP; James A. D. White

(57) ABSTRACT

Systems and techniques are described for implementing autonomous control of powered earth-moving vehicles, including to automatically control movement of a vehicle's component parts on a job site to perform tasks. The techniques may include using an MPC-based Control System to perform a cycle of training and deployment of a predictive model specific to a particular earth-moving vehicle to control that vehicle's autonomous operations, and to further using resulting data in additional manners—such a cycle may include using a data gathering module on the vehicle to gather actual operational data of the vehicle during manual control of the vehicle on job site(s) by human operator(s) during performance of task(s), generating a 3D site map modeling the vehicle's surroundings, training a Model Predictive Control (MPC) model based on the actual operational data and 3D site map, and deploying the trained model to the vehicle for use in autonomous operations.

20 Claims, 20 Drawing Sheets

(51) Int. Cl.
*G05B 13/04* (2006.01)
*G07C 5/00* (2006.01)

(56) References Cited

U.S. PATENT DOCUMENTS

| | | | |
|---|---|---|---|
| 11,375,041 | B2 | 6/2022 | Theverapperuma et al. |
| 11,560,690 | B2 | 1/2023 | Halder et al. |
| 11,567,197 | B2 | 1/2023 | Halder |
| 11,746,499 | B1 | 9/2023 | Kotlaba |
| 11,746,501 | B1* | 9/2023 | Gajić .................. G06V 20/64 |
| | | | 701/27 |
| 11,898,324 | B1 | 2/2024 | Hurwitz et al. |
| 11,952,746 | B1 | 4/2024 | Kotlaba et al. |
| 12,037,773 | B2 | 7/2024 | Kotlaba |
| 2016/0170089 | A1 | 6/2016 | Collins |
| 2018/0245308 | A1 | 8/2018 | Ready-Campbell et al. |
| 2020/0032483 | A1 | 1/2020 | Ready-Campbell et al. |
| 2020/0063395 | A1 | 2/2020 | Ready-Campbell et al. |
| 2020/0111169 | A1 | 4/2020 | Halder et al. |
| 2020/0150650 | A1 | 5/2020 | Jarlengrip |
| 2020/0150687 | A1 | 5/2020 | Halder et al. |
| 2020/0310442 | A1 | 10/2020 | Halder et al. |
| 2020/0394813 | A1 | 12/2020 | Theverapperuma et al. |
| 2021/0017738 | A1 | 1/2021 | Sano |
| 2021/0191409 | A1 | 6/2021 | Ready-Campbell et al. |
| 2021/0254308 | A1 | 8/2021 | Thibblin et al. |
| 2021/0317633 | A1 | 10/2021 | Sherlock |
| 2022/0024485 | A1 | 1/2022 | Theverapperuma et al. |
| 2022/0025612 | A1 | 1/2022 | Zhang et al. |
| 2022/0026921 | A1 | 1/2022 | Halder |
| 2022/0042286 | A1 | 2/2022 | Tsuji et al. |
| 2022/0057513 | A1 | 2/2022 | Pihl |
| 2022/0154431 | A1 | 5/2022 | Kurosawa |
| 2022/0282451 | A1 | 9/2022 | Ready-Campbell et al. |
| 2022/0340171 | A1* | 10/2022 | Halder ................. G05D 1/0274 |
| 2022/0412057 | A1 | 12/2022 | Kikani et al. |
| 2023/0031524 | A1 | 2/2023 | Ready-Campbell et al. |
| 2023/0134855 | A1 | 5/2023 | Hodel et al. |
| 2023/0407595 | A1* | 12/2023 | Kotlaba ................. E02F 9/205 |
| 2024/0093464 | A1 | 3/2024 | Sadilek et al. |

FOREIGN PATENT DOCUMENTS

| | | |
|---|---|---|
| EP | 4083335 A2 | 8/2022 |
| KR | 10-2022-0014477 | 12/2022 |
| WO | 2018099755 A1 | 6/2018 |
| WO | 2022107587 A1 | 5/2022 |
| WO | 2022198331 A1 | 9/2022 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/lm317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V Can Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
LIVOX LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
LIVOX Mid-40/Mid-100 LiDAR Specs, retrieved on Aug. 22, 2022 from https://www.livoxtech.com/mid-40-and-mid-100/specs, 2 pages.
Elaine Ball, "Top Benefits Of Using LiDAR For Construction Projects", Oct. 1, 2020, retrieved from https://csengineermag.com/top-benefits-of-using-lidar-for-construction-projects/ on Nov. 4, 2022, 4 pages.
"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.
Peter Brown, "LiDAR Improves Efficiency And Safety In Industrial Heavy Equipment", Oct. 22, 2021, retrieved from https://electronics360.globalspec.com/article/17336/lidar-improves-efficiency-and-safety-in-industrial-heavy-equipment on Nov. 4, 2022, 2 pages.
"Construction Remains Ahead In Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.
"LiDAR For Heavy Machinery", retrieved from https://innoviz.tech/applications/industrial on Nov. 4, 2022, 2 pages.
"Hitachi Construction Machinery Invests In Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.

(56) References Cited

OTHER PUBLICATIONS

Nakagawa et al., "Real-Time Mapping Of Construction Workers Using Multilayered LiDAR", The 40th Asian Conference On Remote Sensing 2019, Oct. 14-18, 2019, 8 pages.

Sabbir Rangwala, "LiDAR Vision—Helping Bring Autonomous Trucks To Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.

"Collision Warning On The Rear Of An Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.

"Autonomous Construction Vehicles", retrieved from https://www.technologycards.net/english/the-technologies/autonomous-construction-vehicles on Nov. 4, 2022, 2 pages.

\* cited by examiner

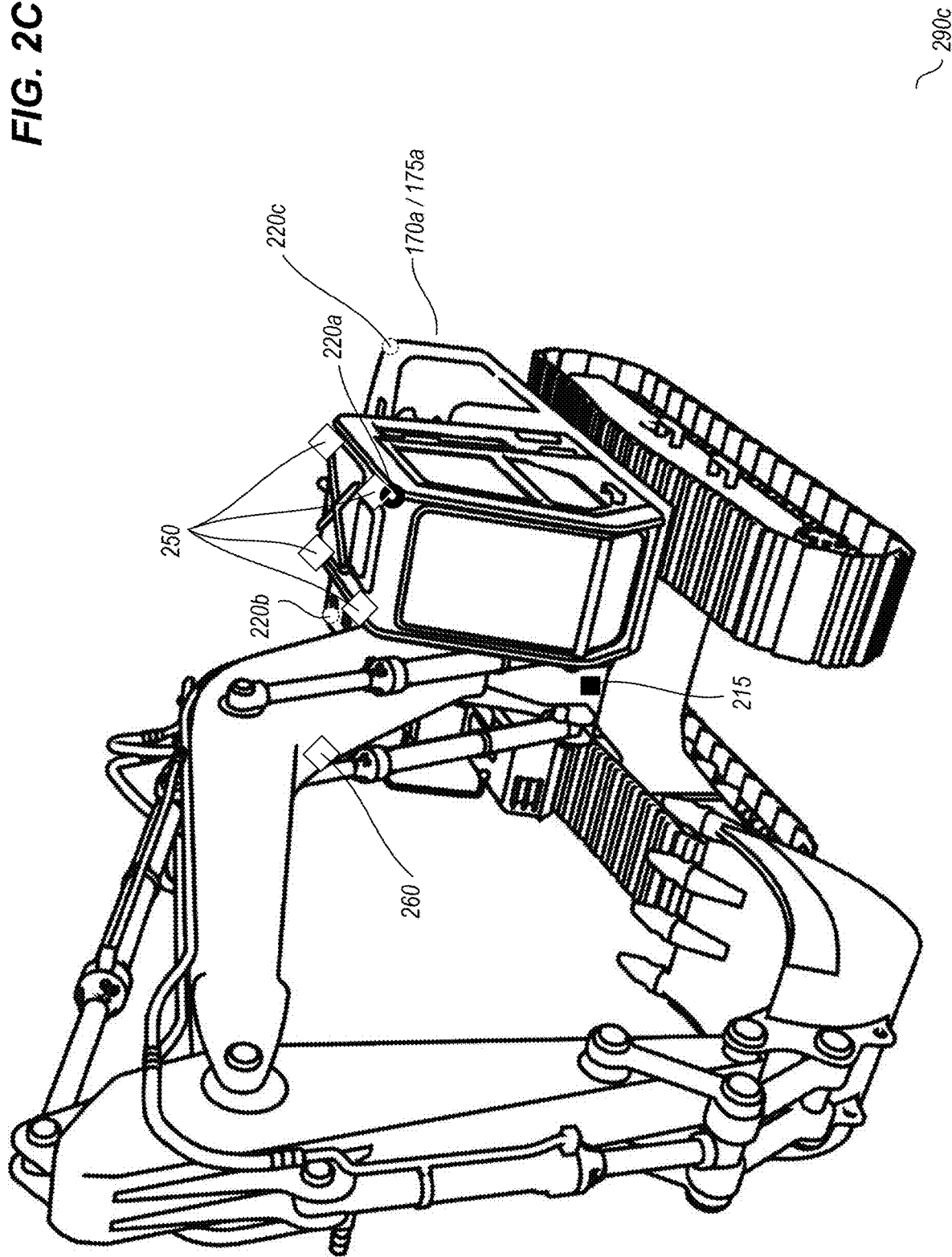

AUTOMATED TRAINING AND USE OF PREDICTIVE MODELS FOR AUTONOMOUS CONTROL OF POWERED EARTH-MOVING VEHICLES

TECHNICAL FIELD

The following disclosure relates generally to systems and techniques for autonomous control of powered earth-moving vehicles, such as to automatically train a predictive model for controlling autonomous operations of a powered earth-moving mining and/or construction vehicle on a site using data gathered on the vehicle during task performance on the site under manual control and to then initiate use of the predictive model for the autonomous operations after it is trained.

BACKGROUND

Earth-moving construction vehicles (e.g., loaders, excavators, bulldozers, deep sea machinery, extra-terrestrial machinery, etc.) may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited fully autonomous operations (e.g., performed under automated programmatic control without human user interaction or intervention) of some construction and mining vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction and/or mining vehicles, requirements for bulky and expensive hardware systems to support the limited autonomous operations, etc.

BRIEF DESCRIPTION OF THE DRAWINGS

FIGS. 2A-2H illustrate examples of powered earth-moving construction and/or mining vehicles having an on-vehicle autonomous operations control system and multiple types of on-vehicle data sensors positioned to support autonomous operations on a site.

DETAILED DESCRIPTION

Figure 1A:
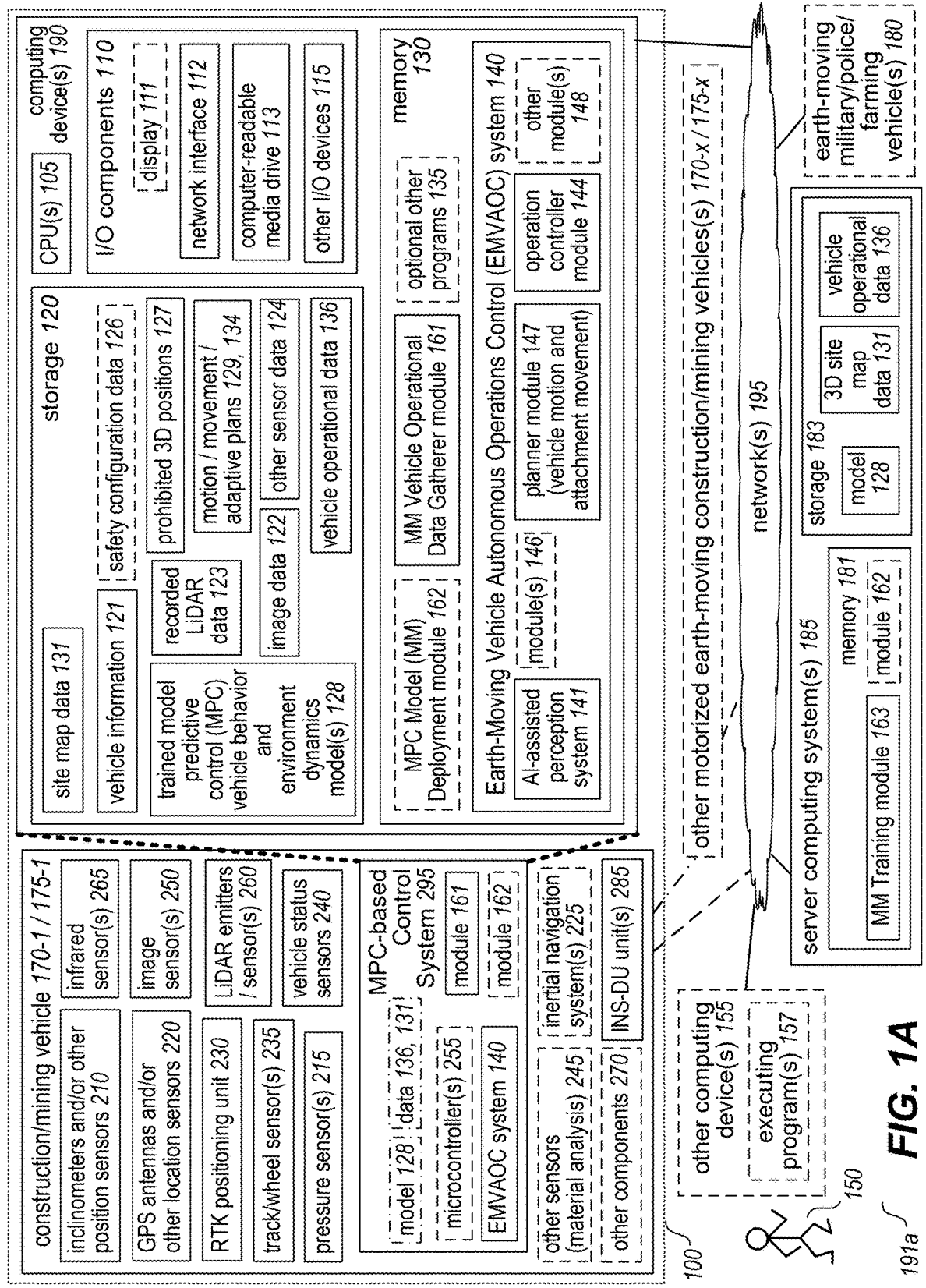
FIG. 1A is a network diagram illustrating an example embodiment of using described systems and techniques to determine and implement autonomous operations of one or more powered earth-moving vehicles on a site using data gathered by on-vehicle sensors, including to perform automated operations that include a cycle of training and deployment of a predictive model to control autonomous operations of an earth-moving vehicle.

Systems and techniques are described for implementing autonomous control of operations of powered earth-moving vehicles (e.g., construction and/or mining vehicles) on a site, including to automatically control movement of movable vehicle components of one or more powered earth-moving vehicles on a job site to implement automated operations for performing tasks. Such automated operations may in at least some embodiments be implemented as part of automated safety-related autonomous operations of the vehicle in accordance with specified safety configuration data, such as to prevent a powered earth-moving vehicle and/or its moveable components (e.g., a rotatable chassis with a cabin; a tool attachment, such as a digging bucket, claw, hammer, blade, etc.; one or more hydraulic arms; wheels and/or tracks; etc.) from entering positions in three-dimensional ("3D") space that inhibit safe operations (e.g., positions that cause a lack of balancing above a defined threshold and/or are already occupied by on-site obstacles or other portions of the powered earth-moving vehicle, such as chassis, tracks or wheels; etc.), or to cause other specified safety-related criteria to be satisfied.

The described techniques may include automatically training a predictive model for controlling autonomous operations of a powered earth-moving vehicle using data gathered on the vehicle during actual operations in performing tasks, and then initiating use of the predictive model after it is trained. In at least some embodiments and situations, the described techniques include installing one or more data gathering modules of a Model Predictive Control (MPC)-based Control System on a particular powered earth-moving vehicle, which execute on one or more computing devices on the powered earth-moving vehicle to gather actual operational data during manual control of the powered earth-moving vehicle on one or more job sites by one or more human operators during performance of one or more tasks of one or more task types during one or more task performance sessions—such actual operational data may include, for example, inputs of the human operator(s) of the powered earth-moving vehicle to controls of the powered earth-moving vehicle to perform the task(s) on the site(s), perception data gathered by one or more sensors on the powered earth-moving vehicle (e.g., one or more LiDAR sensors, one or more cameras with image sensors, etc.) about surroundings of the vehicle on the site(s) during the performance of the task(s), and vehicle data gathered by one or more other sensors on the powered earth-moving vehicle (e.g., one or more GPS sensors on a chassis of the vehicle, one or more inclinometers on one or more movable components of the vehicle, one or more pressure sensors associated with one or more movable components of the vehicle, etc.) during the performance of the task(s). The data gathering module(s) may use at least the perception data and optionally additional vehicle data to generate a current version of a three-dimensional (3D) site map of visible surfaces around the vehicle (e.g., to repeatedly update an existing version of the site map, such as in a real-time or near-real-time manner with respect to the gathering of the actual operational data), and may further transfer the gathered actual operational data and the current 3D site map to one or more separate computing systems off the powered earth-moving vehicle (e.g., elsewhere on the site(s), in the cloud or elsewhere across one or more computer networks, etc.), such as periodically or in a substantially continuous manner (e.g., in a real-time or near-real-time manner with respect to the gathering of the actual operational data, such as within microseconds, milliseconds, centiseconds, deciseconds, seconds, etc.).

The one or more separate computing systems may further execute at least one training module of the MPC-based Control System to use the received transferred data from the earth-moving vehicle to train a predictive model specific to that vehicle to control autonomous operations of that vehicle that include movements of components of the vehicle to perform tasks based at least in part on predicted resulting changes to the visible surfaces around the vehicle, such as to repeatedly train and update an MPC model that uses model predictive control techniques to encode vehicle behavior and environment dynamics information. At any time, a determination may be made to initiate use of the trained predictive model on the powered earth-moving vehicle (e.g., based on an automated determination that the model is sufficiently trained, such as based on an amount of training time and/or amount of training data and/or predictive results of the model that meet and/or exceed results of the manual control of the vehicle in performing tasks), and a deployment module of the MPC-based Control System executing on the vehicle's computing device(s) and/or on the separate computing system(s) may transfer a current copy of the predictive model to the powered earth-moving vehicle. An Earth-Moving Vehicle Autonomous Operations Control (EMVAOC) system executing on the vehicle's computing device(s) may then use the current copy of the predictive model on the powered earth-moving vehicle to implement autonomous operations of one or more types on the powered earth-moving vehicle in performing tasks of one or more types, such as semi-autonomous and/or fully autonomous operations, and the copy of the predictive model on the powered earth-moving vehicle being used by the EMVAOC system may be further updated in some embodiments and situations as additional actual operational data is gathered from the powered earth-moving vehicle during additional manual operations and transferred to the separate computing system(s) for further training and updating of the vehicle-specific predictive model.

In addition, in at least some embodiments and situations, the described techniques may further include using the gathered actual operational data in additional manners. For example, in at least some embodiments and situations, the gathered actual operational data for a powered earth-moving vehicle may be analyzed to determine analytics information with respect to one or more types of defined metrics (e.g., on a periodic basis, such as weekly, daily, monthly, etc.), with non-exclusive examples of such defined metrics including the following: allocation of time that the vehicle spends in enumerated activities (e.g., mobilization activities such as transportation and setup, idle-engine on, idle-engine off, fueling, operation-forward, operation-reverse, etc.); safety-related data (e.g., proximity to hazards, proximity to humans, etc.); fuel consumption and optionally other costs; etc. In addition, the described techniques may further include aggregating gathered actual operational data and/or site map data from multiple powered earth-moving vehicles (e.g., multiple vehicles on the same site, multiple vehicles with the same owner and/or operated by the same entity, multiple vehicles of multiple owner and/or multiple operating entities but all using the EMVAOC and/or MPC-based Control System, etc.) in additional manners, such as to determine similar analytics information across the multiple vehicles, to generate an aggregated site map for a site using data from two or more of the multiple vehicles that are on that site, determining patterns across manual operations of two or more of the multiple vehicles of the same vehicle type (e.g., to determine one or more suggested improvements for manual performance of one or more tasks by earth-moving vehicles of the vehicle type, such as based on comparative analysis of activities of at least one of those vehicles relative to one or more other of those vehicles). Additional details are included below regarding performing automated operations that include using the MPC-based Control System and its modules to perform a cycle of training and deployment of a predictive model to control autonomous operations of an earth-moving vehicle, and to further using resulting data in additional manners.

As noted above, the autonomous control of operations of a powered earth-moving vehicle is performed in some embodiments and situations as part of fully autonomous operations of the powered earth-moving vehicle without any human input during those fully autonomous operations (e.g., to receive human input only to provide information about task goals and/or other configuration settings before the fully autonomous operations commence), including planning motion of the powered earth-moving vehicle between on-site locations and/or movement of component parts of the vehicle (e.g., hydraulic arms, tool attachments, a rotatable chassis, tracks and/or wheels, etc.) to accomplish one or more indicated tasks without violating any specified safety configuration data and while satisfying any other specified criteria, and implementing the planned motion/movement via automated manipulation of controls of the vehicle. In some embodiments and situations, the autonomous control of the operations of a powered earth-moving vehicle is performed as part of semi-autonomous operations of the powered earth-moving vehicle, including monitoring manipulation of some or all controls of the vehicle by one or more human operators (whether located in or on the vehicle, or instead remote from the vehicle) during the vehicle operations, and preventing motion/movements of the powered earth-moving vehicle and/or its component parts that would violate specified safety configuration data (e.g., to, even if not manually specified, automatically perform one or more of balancing-related operations, slippage-related operations, controlled stoppage operations, gradual turning operations, etc.) or to otherwise provide automated assistance to the actions of the human operator(s). Controlled operations of the powered earth-moving vehicle may in some embodiments and situations be performed while the vehicle remains at a fixed location (e.g., for a tracked excavator vehicle, to include component part movements such as chassis rotation and/or hydraulic arm movements and/or tool attachment movements, but not to include movement of the tracks), and may in some embodiments and situations be performed as the vehicle is in motion from an initial location to a destination location. Additional details related to implementing autonomous control of powered earth-moving vehicles in particular manners are described below, and some or all of the described techniques are performed in at least some embodiments by automated operations of an Earth-Moving Vehicle Autonomous Operations Control ("EMVAOC") system to control one or more powered earth-moving vehicles (e.g., an EMVAOC system operating on at least one powered earth-moving vehicle being controlled).

The described techniques provide various benefits in various embodiments, including to improve efficiency and speed and accuracy and safety in operations involving controlling powered earth-moving vehicle motion and vehicle component part movements to perform tasks, including to gather and use actual operational data from manual control of a vehicle to train a vehicle-specific predictive model for use in subsequent autonomous operations of the vehicle. In addition, in some embodiments the described techniques may be used to provide an improved GUI in which one or more users (e.g., on-site and/or remote users) may obtain and view information about operations of one or more powered earth-moving vehicles on a site, and in which an operator user may more accurately control operations of one or more such powered earth-moving vehicles. Various other benefits are also provided by described techniques, some of which are further described elsewhere herein.

As part of performing the described techniques, the EMVAOC system may in some embodiments obtain and integrate data from sensors of multiple types positioned on a powered earth-moving vehicle at a site, and use the data to determine and control motion of the powered earth-moving vehicle on the site, such as by determining current location and positioning of the powered earth-moving vehicle and its moveable component parts on the site, determining a target destination location and/or route (or 'path') of the powered earth-moving vehicle on the site, identifying and classifying objects and other obstacles (e.g., man-made structures, rocks and other naturally occurring impediments, other equipment, people or animals, non-level terrain, etc.) along one or more possible paths (e.g., multiple alternative paths between current and destination locations), implementing actions to address any such obstacles (e.g., move, avoid, pass over, etc.), and performing movement-related operations (e.g., balancing-related, slippage-related, steering-related, related to tool attachment placement, related to emergency stopping, related to sensor calibration, etc.) as needed during vehicle motion (e.g., on non-level surfaces). In addition, in at least some embodiments, the described systems and techniques are further used to implement coordinated actions of multiple powered earth-moving vehicles of one or more types (e.g., one or more excavator vehicles, bulldozer vehicles, front loader vehicles, grader vehicles, plowing vehicles (e.g., snow plows, dirt plows, tractors with plow attachments, etc.), loader vehicles, crane vehicles, backhoe vehicles, compactor vehicles, conveyor vehicles, dump trucks or other truck vehicles, etc.).

The described techniques may further include using the data from one or more types of sensors on a powered earth-moving vehicle to generate a site map of at least some of an environment around the vehicle (e.g., with a 3D representation of surfaces for an area of the site around the vehicle), including to determine slopes and other non-level surfaces and more generally surface heights and shapes (e.g., to create a grid of cells covering the surface(s) to be mapped, such as with each cell being sized 20 cm by 20 cm or another defined size, and to determine surface height, shape, slope, etc. for each such cell), as well as to detect other obstacles in an area around the vehicle (e.g., in at least an area reachable by a tool attachment and/or other component parts of the vehicle), and to optionally further classify the obstacles with respect to multiple defined obstacle types (e.g., having different specified safety configurations). Such data may include, for example, LiDAR data from one or more LiDAR sensors of one or more LiDAR components positioned on the vehicle, and/or image data from one or more camera devices with image sensors positioned on the vehicle, and/or infrared data from one or more infrared sensors positioned on the vehicle, and/or material type data from one or more material type sensors positioned on the vehicle, etc., and with some or all of the sensors optionally mounted on moveable portions of the vehicle (e.g., a hydraulic arm, a tool attachment, etc.) to enable movement of those sensors (e.g., separate from motion of the vehicle) to different positions to obtain additional data readings. The data related to such obstacles may be used to determine positions in 3D space around the vehicle that are prohibited in accordance with the specified safety configuration data or that otherwise trigger safety-related actions, including slopes or other non-level surfaces that exceed defined thresholds, although at least some obstacles may not be included in the prohibited 3D positions (e.g., obstacles that are to be moved as part of one or more tasks, such as rocks or other material that are within the movement capacity of the vehicle's tool attachment; non-level portions of the terrain that are not flat but do not exceed safety parameters for the vehicle to drive over; other obstacles that the vehicle or its parts may move over or through, such as sparse vegetation or water; etc.)—in at least some embodiments, each cell of a grid covering an area around some or all of a vehicle will have one or more 3D data points (e.g., of a generated 3D point cloud) that are used to determine the data for that cell.

The powered earth-moving vehicle may further use additional sensors on some or all moveable parts of the vehicle to determine positions of those parts, including relative to other parts of the vehicle. As one non-exclusive example, a first hydraulic arm attached to a chassis of the vehicle (e.g., a hydraulic 'boom' arm of an excavator vehicle) may include at least one first inclinometer sensor that measures a first angle of that first hydraulic arm relative to the chassis, a second hydraulic arm (if any) attached to the first hydraulic arm (e.g., a hydraulic 'stick' arm of an excavator vehicle attached to a hydraulic boom arm) may include at least one additional second inclinometer sensor that measures a second angle of that second hydraulic arm relative to the first hydraulic arm, a tool attachment connected to one of the hydraulic arms (e.g., a bucket tool of an excavator vehicle connected to the hydraulic stick arm) may include at least one additional third inclinometer sensor that measures a third angle of that tool attachment relative to that hydraulic arm to which it is connected, etc., with a combination of the angles from the multiple inclinometer sensors for such hydraulic arm(s) and tool attachment then used to determine positions in 3D space of those component parts relative to a connection point to the vehicle chassis—similar operations may be used for other types of powered earth-moving vehicles, including those having only a single set of one or more hydraulic arms connecting a chassis to a tool attachment, such as to not have one or more second inclinometer sensors as discussed above with respect to an example excavator vehicle). In addition, a cabin or other portion of the chassis may include one or more sensors to provide relative or absolute location and/or direction information (e.g., one or more GPS receivers, such as multiple GPS receivers at known locations on the chassis to in combination provide directional information for the chassis; one or more INS-DU (inertial navigation system—dual antenna) sensors that combine GPS data with compass data and other IMU data such as acceleration and angular velocity; etc.), and tracks or wheels of the vehicle may include one or more directional sensors to determine a direction of the tracks/wheels (whether an absolute direction and/or a direction relative to the chassis if the chassis and/or tracks/wheels are rotatable), with the relative directions of the tracks/wheels able to be used to determine positions in 3D space of those component parts relative to the vehicle chassis—if the sensors on the vehicle are able to determine an absolute position of the vehicle chassis, the positions of the vehicle component parts may further be determined in absolute coordinates, such as by using GPS coordinates from one or more GPS antennas mounted on the chassis, optionally after being corrected using real-time kinematic (RTK)-based GPS correction data transmitted via signals from a base station (e.g., at a location remote from the site at which the vehicle is located), and/or by using LiDAR and/or visual data to determine a position of the vehicle within a job site with known locations. The positions of the vehicle component parts may be represented in various manners in various embodiments (e.g., in XYZ coordinates, whether absolute or relative to a position of the vehicle chassis; in angle-based coordinates, such as to represent the position of an excavator vehicle's tool attachment using the first angle for the hydraulic boom arm and the second angle for the hydraulic stick arm and the third angle for the tool attachment; etc.)—the positions of the obstacles around the vehicle and/or the prohibited 3D positions may similarly be represented in the same format as used for the vehicle component parts (e.g., in angle-based coordinates relative to the same point on the vehicle's chassis as for moveable parts of the vehicle whose positions use such angle-based coordinates), or instead different position formats may be used for vehicle parts and prohibited 3D positions/obstacle locations, with a conversion determined between formats during use of the vehicle part position information and the information about the prohibited 3D positions/obstacle locations.

As noted above, the automated operations of the EMVAOC system may include automatically planning vehicle motion between two or more locations (e.g., between starting and ending locations on a site) and/or vehicle attachment movements while the powered earth-moving vehicle is stationary and/or in motion. In some embodiments, the EMVAOC system may include one or more planner modules, and at least one such planner module may perform such planning operations for one or more vehicle component parts, such as to determine a 3D movement/motion plan that includes a sequence of 3D positions for a vehicle's tool attachment to perform one or more tasks while avoiding prohibited 3D positions and otherwise preventing violations of safety configuration data or satisfying other specified criteria, optionally while the vehicle moves on a path between multiple locations (e.g., in accordance with other goals or planning operations being performed by the EMVAOC system, such as based on an overall analysis of a site and/or as part of accomplishing a group of multiple activities at the site). In particular, the EMVAOC system may implement autonomous control of motion of the vehicle and movements of its component parts to prevent intersection with prohibited 3D positions corresponding to the obstacles and optionally additionally corresponding to positions of component parts of the vehicle that can be reached by other moveable component parts of the vehicle (e.g., for an excavator vehicle's tracks and/or chassis that can be reached by the vehicle's tool attachment), whether during planning and implementing fully autonomous operations for the vehicle, and/or for motion/movements initiated in part or in whole by a human operator of the vehicle. These techniques may be further extended for motion of the vehicle between different locations on a job site, such as when moving to a destination location at which one or more tasks will be performed, while moving between locations as part of implementing one or more tasks (e.g., carrying or otherwise moving material between two locations, forming a road or lane between two locations, etc.), or otherwise performing activities involving vehicle motion—as part of doing so, the locations of obstacles along the vehicle motion path(s) may be similarly determined and used to identify prohibited 3D positions along the path(s) that are reachable by the vehicle component parts, and movement of the vehicle component parts may be similarly monitored and controlled to avoid those prohibited 3D positions not only at the initial and destination locations but also along the path(s), as well as to implement other vehicle component part positioning in accordance with specified safety configuration data (e.g., to maintain balance of the vehicle, to prevent positions of vehicle component parts that cause damage to the vehicle, etc.) or to otherwise satisfy specified criteria. Additional details are included below related to automatically controlling motion of a powered earth-moving vehicle on a job site and movement of vehicle component parts to conform with specified safety configuration data.

For illustrative purposes, some embodiments are described below in which specific types of data are acquired and used for specific types of automated operations performed for specific types of powered earth-moving vehicles, and in which specific types of autonomous operation activities are performed in particular manners. However, it will be understood that such described systems and techniques may be used with other types of data and powered earth-moving vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to a powered earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A is a diagram including information 191a illustrating an example embodiment of an MPC-based Control System that may be used to implement at least some of the described systems and techniques to gather and use actual operational data from manual control of a powered earth-moving vehicle in order to train a vehicle-specific predictive model for use in subsequent autonomous operations of the vehicle, and of an EMVAOC ("Earth-Moving Vehicle Autonomous Operations Control") system 140 that may be used to implement at least some of the described systems and techniques for implementing autonomous control of powered earth-moving vehicles using one or more trained predictive MPC models, such as to automatically control motion of one or more powered earth-moving vehicles between locations on a job site and movement of component parts of the vehicle(s) to perform tasks while conforming with specified safety rules or other specified safety configuration data and/or to otherwise satisfy specified criteria. The EMVAOC system 140 and one or more MPC-based Control System modules (e.g., an MPC Vehicle Operational Data Gatherer module 161 and optionally MPC Model (MM) Deployment module 162) may be implemented using one or more hardware processors 105 of one or more network-accessible configured computing devices 190—such a computing device may, for example, be part of a self-contained control unit located on a powered earth-moving vehicle (e.g., without a separate cooling unit, and operable without receiving external instructions), such as when the EMVAOC system 140 is part of otherwise integrated 100 with a particular powered earth-moving construction vehicle 170-1 and/or powered earth-moving mining vehicle 175-1 (e.g., located on that powered earth-moving vehicle) or other powered earth-moving vehicle(s) 180 such as one or more military vehicles and/or police vehicles and/or farming vehicles. Similarly, one or more MPC-based Control System modules (e.g., an MM Training module 163 and optionally MM Deployment module 162) may be implemented using one or more hardware processors (not shown) of one or more network-accessible configured computing systems 185, such as to receive vehicle operational data 136 from a particular powered earth-moving vehicle 170-1 and/or 175-1 and store in on storage 183, for module 163 executing in memory 181 to generate a corresponding trained MPC vehicle behavior and environment dynamics model 128 specific to that vehicle, and for module 162 optionally executing in memory 181 on the computing system(s) 185 and/or on that vehicle's computing device 190 to deploy a current copy of the trained model 128 to that vehicle-such computing systems 185 may, for example, be separate and remote from the powered earth-moving vehicle, such as elsewhere on a job site on which the vehicle is operating, at a separate location (e.g., as part of a cloud execution system), etc. In some embodiments and situations, multiple powered earth-moving vehicles 170 and/or 175 and/or 180 may each have a separate executing copy of the EMVAOC system 140, while in other embodiments and situations, the EMVAOC system 140 may support multiple powered earth-moving vehicles 170 and/or 175 and/or 180 (e.g., operating in a distributed manner on the multiple vehicles, such as via one or more computing devices 190 on each of the multiple vehicles that are interacting in a peer-to-peer manner), and/or may operate separately from one or more such powered earth-moving vehicles 170 and/or 175 and/or 180 (e.g., at a location on site and in communication with one or more such powered earth-moving vehicles over one or more networks 195). Similarly, in at least some embodiments and situations, the multiple powered earth-moving vehicles 170 and/or 175 and/or 180 may each have a separate copy of the MPC module 161 and optionally MM deployment module 162, while at least the MM training module 163 and optionally MM deployment module 162 execute on one or more separate computing systems 185 to support the MPC-based Control System modules executing on the multiple powered earth-moving vehicles-alternatively, in other embodiments a separate copy of the MM training module 163 may execute on each of the multiple powered earth-moving vehicles, such as if the vehicle-specific model training is performed on each vehicle concurrently with the gathering of that vehicle's operational data during its performance of tasks under manual control without using the separate computing system(s) 185. In some embodiments, one or more other computing devices or systems may further interact with the EMVAOC system 140 (e.g., to obtain and/or provide information), such as one or more other computing devices 155 each having one or more associated users and optionally executing one or more software programs 157, and/or one or more other computing systems 185 (e.g., to, in addition to executing MPC model module 163 to generate a vehicle-specific trained MPC vehicle behavior and environment dynamics model 128 and optionally executing an MPC model module 162, optionally store and provide other data, provide supplemental computing capabilities, etc.). The one or more computing devices 190 and one or more computing systems 185 may include any computing device or system that may receive data and/or requests, and take corresponding actions (e.g., store the data, respond to the request, etc.) as discussed herein. The earth-moving vehicle(s) 170 and/or 175 and/or 180 may correspond to various types of vehicles and have various forms, with non-exclusive examples illustrated in FIGS. 2A-2H.

In this example, the powered earth-moving vehicle 170-1 or 175-1 includes a variety of sensors to obtain and determine information about the powered earth-moving vehicle and its surrounding environment (e.g., a job site on which the powered earth-moving vehicle is located), including one or more GPS antennas and/or other location sensors 220, one or more inclinometers and/or other position sensors 210, one or more image sensors 250 (e.g., visible light sensors that are part of one or more cameras or other image capture devices), one or more LiDAR components 260 (e.g., with LiDAR emitters and sensors), one or more infrared sensors 265, one or more pressure sensors 215, optionally an RTK-enabled GPS positioning unit 230 that receives GPS signals from the GPS antenna(s) and RTK-based correction data from a remote base station (not shown) and optionally other data from one or more other sensors and/or devices, optionally one or more INS-DU or other IMU units 285 (e.g., each using 3-axis precision magnetometers, accelerometers and gyroscopes along with GPS data, such as RTK-corrected GPS data, for high-precision position determination) or other inertial navigation systems 225, optionally one or more track or wheel alignment sensors 235, optionally one or more other sensors 245 (e.g., material analysis sensors, sensors associated with radar and/or ground-penetrating radar and/or sonar, etc.), optionally other vehicle status sensors 240, etc. The powered earth-moving vehicle 170-1 or 175-1 may further optionally include one or more low-voltage microcontrollers 255 (e.g., hardware CPU(s) 105) and/or other hardware components 270 (e.g., corresponding to some or all of the components 110, 120 and 130), such as part of a self-contained control unit that operates on the vehicle without a cooling unit to implement some or all of the EMVAOC system 140 (e.g., to execute some or all of the AI-assisted perception system 141, planner module 147, modules 146e-146i, operation controller module 144, and/or optional other modules 148) and MPC module 161 and optionally MM module 162.

During manual control of the powered earth-moving vehicle 170-1 or 175-1 to perform task(s) on a site, the MPC Vehicle Operational Data Gatherer module 161 of the MPC-based Control System 295 that is executing on the vehicle gathers actual operational data 136 of various types from the sensors on the powered earth-moving vehicle 170-1 or 175-1, such as perception data about surroundings of the vehicle (e.g., from the LiDAR sensors 260 and/or image sensors 250 and/or infrared sensors 265 and/or material analysis sensors 245), vehicle status and positioning data (e.g., from the position sensors 210 and/or location sensors 220 and/or RTK positioning unit 230 and/or track/wheel sensors 235 and/or pressure sensors 215 and/or inertial navigation system (INS) 225 and/or INS-DU unit(s) 285 and/or other vehicle status sensors 240, such as to track fuel levels, battery charge levels, etc.), and information about manual input of one or more human operators (not shown) to controls 205 of the vehicle (e.g., one or more joystick controls, pedal controls, button controls, switch controls, etc.). The module 161 then stores the operational data 136 on storage 120, and uses at least the perception data to generate a new and/or updated 3D site map 131 of at least some of an area of the site on which the vehicle is located (e.g., an area surrounding or otherwise around the vehicle), optionally in coordination with the AI-assisted perception system 141 as discussed further below. The module 161 then transmits or otherwise provides the gathered operational data 161 and the site map 131 to the separate computing system(s) 185 for use by the MM Training module 163 in training the vehicle-specific model 128, such as to provide gathered operational data 161 and/or updated site map 131 data repeatedly (e.g., periodically; in a substantially continuous manner, such as within milliseconds or centiseconds or deciseconds or seconds of gathering; etc.), and optionally in a real-time or near-real-time manner with respect to the data gathering and/or site map generation (e.g., within milliseconds or centiseconds or deciseconds or seconds of gathering), and the module 163 may similarly repeatedly use the received operational data and site map to train the model 128 (e.g., periodically; in a substantially continuous manner, such as within milliseconds or centiseconds or deciseconds or seconds of gathering; etc.).

Similarly, during autonomous operations to control the vehicle (e.g., in a fully autonomous or semi-autonomous manner), the EMVAOC system 140 obtains some or all of the data from the sensors on the powered earth-moving vehicle 170-1 or 175-1, stores the data in corresponding databases or other data storage formats on storage 120 (e.g., vehicle information 121, image data 122, LIDAR data 123, other sensor data 124, environment object (e.g., obstacle) and other mapping (e.g., terrain) data 131, etc.), and uses the data to automatically control autonomous operations of the powered earth-moving vehicle 170-1 or 175-1 to perform specified tasks and in accordance with specified safety configuration data 126 and/or other specified criteria (not shown). In this example embodiment, the EMVAOC system 140 has modules that include an AI-assisted perception system 141 (e.g., to analyze LiDAR and/or visual data of the environment to identify objects and/or determine 3D site map data 131 for 3D surfaces of an environment around the vehicle 170-1 and/or 175-1, such as a 3D point cloud, a terrain contour map or other visual map, etc.); a vehicle motion and part movement planner module 147 (e.g., to determine how to accomplish a goal that includes movement of one or more component parts of a vehicle, optionally while avoiding prohibited 3D positions and/or performing one or more tasks, including optionally moving the powered earth-moving vehicle from its current location to a determined target destination location and determining how to handle any possible obstacles between the current and destination locations); a system operation manager module 144 (e.g., to control overall operation of the EMVAOC system and/or the vehicle 170-1 and/or 175-1); optionally one or more additional modules 146 to perform specific activities (e.g., a blade-based turn determiner module 146f to determine whether to use a blade tool attachment to participate in turning the vehicle, such as while the blade is in use in pushing/cutting/loading operations, and optionally to implement such blade-based steering; a blade load determiner module 146e to determine a degree and/or amount of loading of a blade tool attachment and any associated vehicle slippage along with corresponding activities to perform; a ripper lane coverage determiner module 146g to determine placement of ripper tool teeth for use in ripping operations and optionally to implement such ripper tool usage; a slope-based stop determiner module 146h to determine whether to implement a controlled stop based at least in part on the slope of the surface that the vehicle is approaching; a LIDAR calibration module 146i to determine calibration information for one or more on-vehicle sensors that includes current position and orientation of the sensor relative to one or more other points on the vehicle; etc.); and optionally one or more other modules 148 (e.g., an obstacle determiner module to analyze information about potential obstacles in an environment of powered earth-moving vehicle 170-1 or 175-1 and determine corresponding information, such as a classification of the type of the obstacle, for use in generating prohibited 3D position data 127 corresponding to the obstacles and optionally parts of the vehicle; a blade load determiner module; one or more modules for analyzing and describing a job site or other surrounding environment, such as quantities and/or types and/or locations and/or activities of vehicles and/or people; one or more GUI modules, including to optionally support one or more VR (virtual reality) headsets/glasses and/or one or more AR (augmented reality) headsets/glasses and/or mixed reality headsets/glasses optionally having corresponding input controllers; etc.). Such modules may generate and use additional data as part of their operations, including for the planner module to use one or more trained vehicle behavior models 128 (e.g., a MPC vehicle behavior and environmental dynamics model trained by the module 163) as part of implementing planned vehicle motion and vehicle component part movements and generating one or more corresponding vehicle motion plans and/or vehicle component part movement plans 129 (e.g., to perform one or more tasks, etc.), and optionally determining and implementing one or more adaptive vehicle motion/movement plans 134e-134h from modules 146e-146h, respectively, for use in addressing changing conditions while performing other operations (e.g., to adapt an original motion/movement plan 129 in use when the changing conditions occur). In some embodiments and situations, additional data may further be used as part of training the behavioral model(s) 128 (e.g., using simulated data from one or more simulator modules, not shown). In at least some embodiments, some or all of the EMVAOC system 140 may execute on a computing device 190 of a powered earth-moving vehicle, while alternatively some or all of the EMVAOC system 140 (e.g., the planner module 147) may execute remotely from the powered earth-moving vehicle and exchange information with the portions of the EMVAOC system 140 executing on the powered earth-moving vehicle. Additional details related to operation of the EMVAOC system 140 are included elsewhere herein.

In this example embodiment, the one or more computing devices 190 may implement some or all of the MPC-based Control System 295 on the powered earth-moving vehicle that includes the gathered vehicle operational data 136 and trained vehicle behavior model 128 and other illustrated modules and data, including at least a copy of the module 161 (e.g., stored in memory 130 and being executed by one or more hardware CPUs 105) to gather the vehicle operational data 136 and transfer it to the separate computing system(s) 185, and a copy of the EMVAOC system 140 (e.g., stored in memory 130 and being executed by one or more hardware CPUs 105)—software instructions of the EMVAOC system 140 and/or modules 161-162 may further be stored on storage 120 (e.g., for loading into memory 130 at a time of execution), but are not separately illustrated in this example. The computing device(s) 190 and EMVAOC system 140 and modules 161 and/or 162 may be implemented using a plurality of hardware components that form electronic circuits suitable for and configured to, when in combined operation, perform at least some of the techniques described herein. In the illustrated embodiment, each computing device 190 includes the one or more hardware CPUs 105 (e.g., microprocessors), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, one or more VR headsets and/or glasses with corresponding input controllers, one or more AR headsets and/or glasses with corresponding input controllers, one or more mixed reality headsets and/or glasses with corresponding input controllers, etc.), although in other embodiments at least some such I/O components may not be provided (e.g., if the CPU(s) include one or more microcontrollers). The memory may further include one or more optional other executing software programs 135 (e.g., an engine to provide output to one or more VR and/or AR and/or mixed reality devices and optionally receive corresponding input). The other computing devices 155 and computing systems 185 may include hardware components similar to those of a computing device 190, but with those details being omitted for the sake of brevity.

One or more other powered earth-moving construction vehicles 170-*x* and/or powered earth-moving mining vehicles 175-*x* and/or earth-moving military vehicles 180 and/or earth-moving police vehicles 180 and/or earth-moving farming vehicles 180 may similarly be present (e.g., on the same job site as powered earth-moving vehicle 170-1 or 175-1; owned by the same entity, not shown; operated by the same entity, not shown; owned and/or operated by multiple entities but all using the EMVAOC system and/or MPC-based Control System provided by a different entity; etc.) and include some or all such components 210-285 and/or 105-148 (although not illustrated here for the sake of brevity) and have corresponding vehicle-specific trained predictive models based on gathered actual operational data, and autonomous operations controlled by the EMVAOC system 140 (e.g., with the EMVAOC system operating on a single powered earth-moving vehicle and communicating with the other powered earth-moving vehicles via wireless communications, with the EMVAOC system executing in a distributed manner on some or all of the powered earth-moving vehicles, etc.) or by another embodiment of the EMVAOC system (e.g., with each powered earth-moving vehicle having a separate copy of the EMVAOC system executing on that powered earth-moving vehicle and optionally operating in coordination with each other, etc.). The network 195 may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, while the example of FIG. 1A includes various types of data gathered for a powered earth-moving vehicle and its surrounding environment, other embodiments may gather and use other types of data, whether instead of or in addition to the illustrated types of data, including non-exclusive examples of image data in one or more non-visible light spectrums (e.g., infrared, ultraviolet, radiation, etc.), other energy data (e.g., sound, radiation, etc.), location data of types other than from satellite-based navigation systems, depth or distance data to an object, color data, etc. In addition, in some embodiments and situations, different devices and/or sensors may be used to acquire the same or overlapping types of data (e.g., simultaneously), and the EMVAOC system may combine or otherwise use such different types of data (e.g., via sensor fusion), including to determine differential information for a type of data.

Figure 1B:
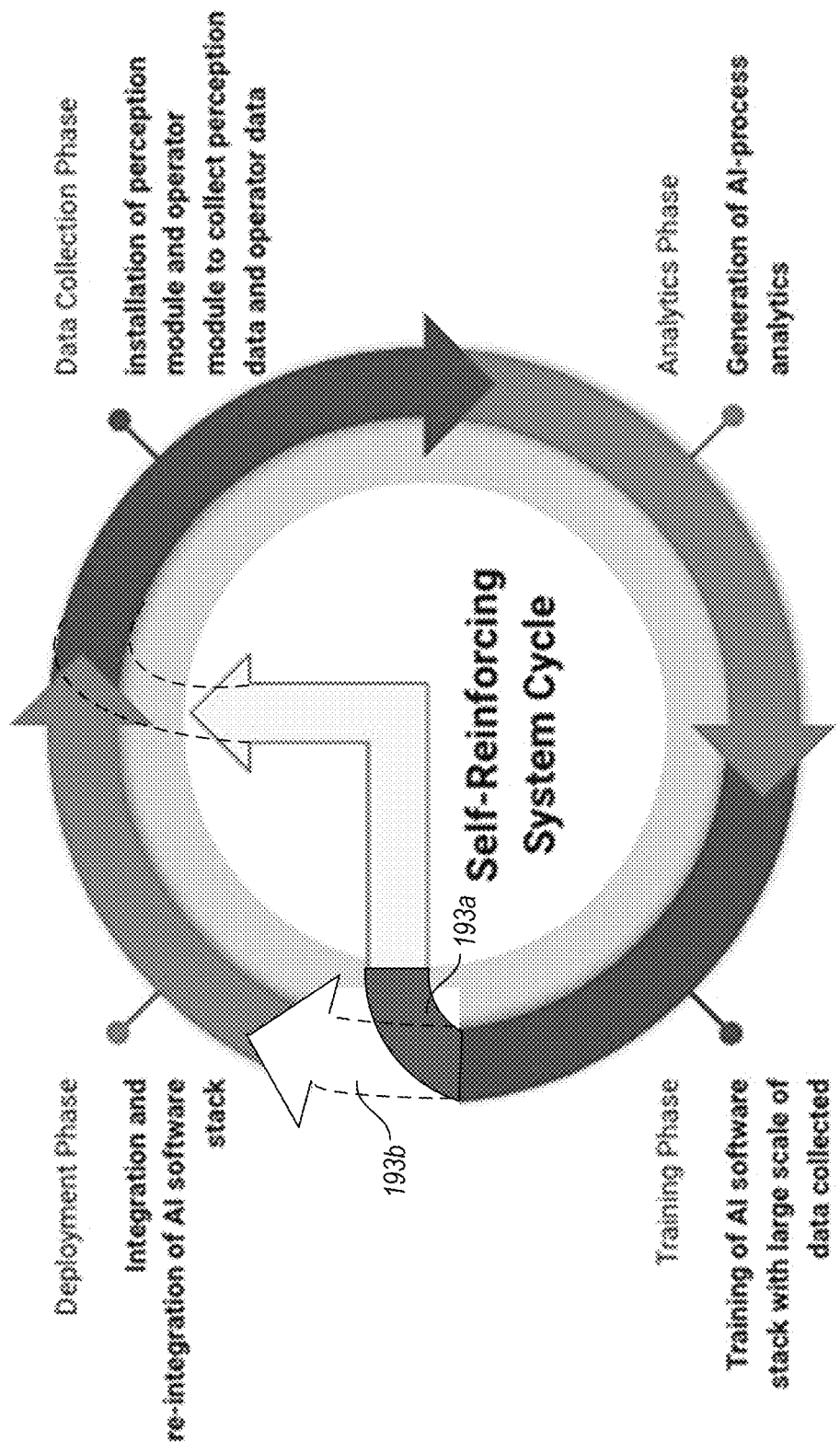
FIG. 1B is a diagram illustrating automated operations that include a cycle of training and deployment of a predictive model to control autonomous operations of an earth-moving vehicle.

FIG. 1B illustrates information 191*b* providing further details regarding automatically training a predictive model for controlling autonomous operations of a powered earth-moving vehicle on a site using data gathered on the vehicle during its manual control on the site, and then initiating use of the predictive model after it is trained, including with respect to a cycle of training and deployment of a predictive model to control autonomous operations of an earth-moving vehicle. In particular, as is illustrated, the cycle of training and deployment by the MPC-based Control System may begin with a data collection phase on a particular powered earth-moving vehicle (not shown), such as based on installation of one or more data gathering modules to gather actual operational data from the vehicle including inputs of one or more human operators (not shown) of the powered earth-moving vehicle to controls of the powered earth-moving vehicle to perform one or more tasks on one or more sites, perception data gathered by one or more sensors on the powered earth-moving vehicle, and vehicle data gathered by one or more other sensors on the powered earth-moving vehicle—as discussed in greater detail elsewhere herein, the one or more data gathering modules may further perform additional activities, such as to participate in the generation and/or updating of a 3D site map for an area of a site around the vehicle, as well as the transmission of the gathered actual operational data and 3D site map to one or more computing systems (not shown) separate from the powered earth-moving vehicle(s) for further analysis. In an analytics phase, such as on the one or more separate computing systems, the MPC-based Control System may further analyze the gathered actual operational data from one or more vehicles in order to generate various types of analytics, and may further present or otherwise provide or otherwise user the generated analytics data in various manners. In a subsequent training phase, one or more training modules of the MPC-based Control System on the one or more separate computing systems may further train an MPC model (not shown) specific to a particular powered earth-moving vehicle using actual operational data and 3D site map data gathered from that vehicle. The data collection phase, analytics phase, and training phase may be performed repeatedly for a particular powered earth-moving vehicle, such as to continue 193*a* after the training phase to the data collection phase, or instead for the data collection phase and training phase and optionally analytics phase to be performed in a substantially continuous manner for a particular powered earth-moving vehicle. At some point after the MPC model is trained, a determination may be made to move 193*b* to a further deployment phase, during which a current copy of the trained MPC model is transferred to the particular powered earth-living vehicle, and autonomous operations are initiated and that vehicle using the trained model. The determination to move to the deployment phase may be made in various manners in various embodiments and situations, as discussed in greater detail elsewhere herein. The cycle of training and deployment may further continue after the initial deployment of a copy of the trained MPC model, such as to gather additional actual operational data during later periods of manual operation of the vehicle, to gather other operational data during periods of autonomous operations of the vehicle, to continue to perform analytics with respect to data gathered during the additional manual and/or autonomous operations of the vehicle, to continue to train the MPC model based on gathered additional actual operational data and/or gathered other operational data, and to further deploy updated copies of the trained MPC model at one or more later times. It will be appreciated that the details of FIG. 1B are provided for illustrative purposes and lack various details discussed elsewhere herein for the sake of illustration, and that the MPC-based Control System may be implemented in other architectures and environments in other embodiments.

Figure 1C:
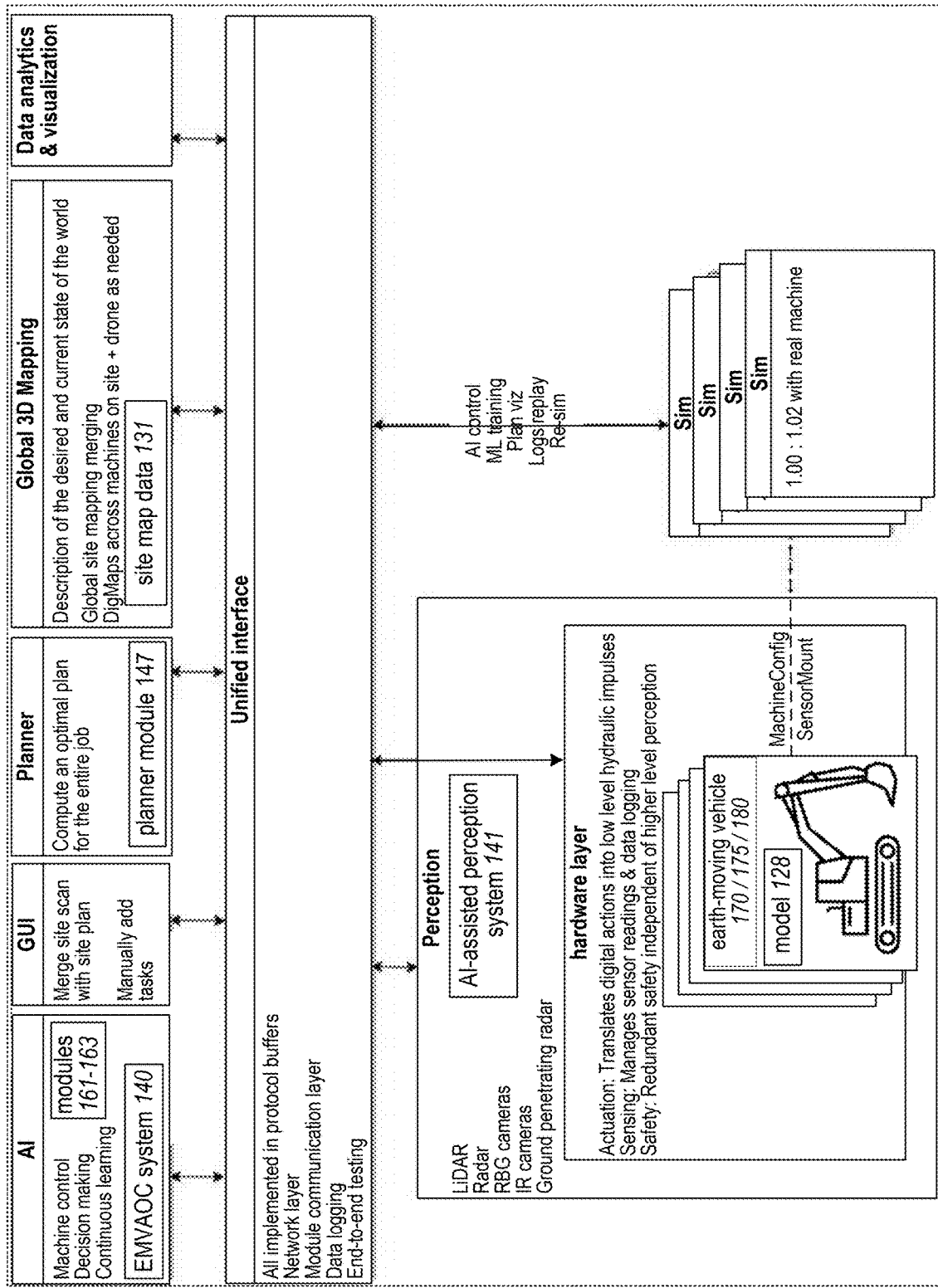
FIG. 1C is a diagram illustrating example components and interactions used to implement autonomous operations of one or more powered earth-moving vehicles on a site.

FIG. 1C illustrates example modules and interactions used to implement autonomous operations of one or more powered earth-moving vehicles on a site, such as to provide an overview of a software and/or hardware architecture used for performing at least some of the described techniques in at least some embodiments. In particular, FIG. 1C illustrates information 191c that includes a hardware layer associated with one or more types of powered earth-moving vehicles 170 and/or powered earth-moving mining vehicles 175 and/or powered earth-moving vehicles 180 (e.g., corresponding to components 210-285 of FIG. 1A), such as to receive instructions about controlling autonomous operation of the earth-moving vehicle(s) 170/175/180, and to perform actions that include actuation (e.g., translating digital actions into low-level hydraulic impulses, including in some embodiments to use one or more piston displacement mechanisms located on a powered earth-moving vehicle 170/175/180 and positioned to manipulate one or more controls of the powered earth-moving vehicle when actuated, such as one or more joystick controls, pedal controls, button controls, switch controls, etc.), sensing (e.g., to manage sensor readings and data logging), safety (e.g., to perform redundant safety independent of higher-level perception operations), etc. In the illustrated example, the hardware layer interacts with or as part of a perception module (e.g., including AI-assisted perception system 141), such as to use one or more sensor types to obtain data about the earth-moving vehicle(s) and/or their environment (e.g., LiDAR data, radar data, visual data from one or more RGB camera devices, infrared data from one or more IR sensors, ground-penetrating radar data, sound data, etc.). The perception module and/or hardware layer may further interact with a unified interface that connects various modules, such as to operate a network layer and to be implemented in protocol buffers as part of providing a module communication layer, as well as to perform data logging, end-to-end testing, etc. In the illustrated example, the unified interface further interacts with an AI (artificial intelligence) module (e.g., that includes the EMVAOC system 140 and modules 161-163 of a MPC-based Control System), a GUI module, a Planner module (e.g., including planner module 147), a Global 3D Mapping module (e.g., including 3D site map 131), one or more Sim simulation modules (e.g., operational data simulator modules that are part of the EMVAOC system 140), and one or more other modules to perform data analytics and visualization. In this example, the AI module provides functionality corresponding to machine control, decision-making, continuous learning, etc. The GUI module perform activities that include providing information of various types to users (e.g., from the EMVAOC system and/or MPC-based Control System) and manually receiving information (e.g., to be provided to the EMVAOC system and/or MPC-based Control System, such as instructions to initiate a deployment phase to provide a current copy of a vehicle-specific trained MPC model to that vehicle for use in autonomous operations to be initiated; to add tasks to be performed; to merge a site scan with a site plan; etc.). The Planner module performs operations that may include computing an optimal plan for an entire job (e.g., with various tasks to be performed in sequence and/or serially), and the Global 3D Mapping module performs activities that may include providing a description of a current state and/or desired state of an environment around the earth-moving vehicle(s), performing global site mapping merging (e.g., using DigMaps across earth-moving vehicles on the site and optionally drones, such as terrain height and shape), etc. The one or more Sim modules perform simulations to provide data from simulated operation of the one or more earth-moving vehicles, such as for use in AI control, machine learning neural network training (e.g., for one or more behavioral models), replaying logs, planning visualizations, etc. It will be appreciated that the EMVAOC system may be implemented in other architectures and environments in other embodiments, and that the details of FIG. 1C are provided for illustrative purposes. In addition, while not illustrated in FIG. 1C, in some embodiments one or more specialized versions of the EMVAOC system may be used for particular types of powered earth-moving vehicles, with non-exclusive examples including the following: an Excavator Motion/Movement Control (EMC) system to control motion/movement of one or more excavator vehicles; an Excavator X Motion/Movement Control (EMC-X) system to similarly control a particular construction and/or mining excavator X vehicle; a Dump Truck Motion/Movement Control (DTMC) system to control motion/movement of one or more types of construction and/or mining dump truck vehicles; a Dump Truck X Motion/Movement Control (DTMC-X) system to similarly control a particular construction and/or mining dump truck X vehicle; a Wheel Loader Motion/Movement Control (WLMC) system to control motion/movement of one or more types of construction and/or mining wheel loader vehicles; a Wheel Loader X Motion/Movement Control (WLMC-X) system to similarly control a particular construction and/or mining wheel loader X vehicle; one or more other motion/movement control systems specific to particular types of construction and/or mining vehicles other than excavators and dump trucks and wheel loaders; a Construction Vehicle Motion/Movement Control (CVMC) system to control some or all types of powered earth-moving construction vehicles; a Mining Vehicle Motion/Movement Control (MVMC) system to control some or all types of powered earth-moving mining vehicles; etc.

It will be appreciated that computing devices, computing systems and other equipment (e.g., powered earth-moving vehicle(s) included within FIGS. 1A-1C are merely illustrative and are not intended to limit the scope of the present invention. The systems and/or devices may instead each include multiple interacting computing systems or devices, and may be connected to other devices that are not specifically illustrated, including via Bluetooth communication or other direct communication, a mesh network, through one or more networks such as the Internet, via the Web, or via one or more private networks (e.g., mobile communication networks, etc.). More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVAOC system 140 and/or the modules 161-163 may in some embodiments be distributed in various modules, some of the described functionality of the EMVAOC system 140 and/or the modules 161-163 of the MPC-based Control System may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVAOC system 140 and/or module 161 and/or module 162 executing on computing device(s) 190, by the module 163 and/or module 162 executing on computing system(s) 185, etc.) and/or data structures (e.g., in databases 121-129 and 131-136), such as by execution of software instructions of the one or more software programs and/or by storage of such software instructions and/or data structures, and such as to perform algorithms as described in the flow charts and other disclosure herein. Furthermore, in some embodiments, some or all of the systems and/or modules may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

As noted above, in at least some embodiments, data may be obtained and used by the EMVAOC system from sensors of multiple types that are positioned on or near one or more powered earth-moving vehicles, such as one or more of the following: GPS data or other location data; inclinometer data or other position data for particular movable parts of an earth-moving vehicle (e.g., a digging arm/tool attachment of an earth-moving vehicle); real-time kinematic (RTK) positioning information based on GPS data and/or other positioning data that is corrected using RTK-based GPS correction data transmitted via signals from a base station (e.g., at a location remote from the site at which the vehicle is located); track and cabin heading data; visual data of captured image(s) using visible light; depth data from depth-sensing and proximity devices such as LIDAR (e.g., depth and position data for points visible from the LiDAR sensors, such as three-dimensional, or "3D", points corresponding to surfaces of terrain and objects) and/or other than LiDAR (e.g., ground-penetrating radar, above-ground radar, other laser rangefinding techniques, synthetic aperture radar or other types of radar, sonar, structured light, etc.); infrared data from infrared sensors; material type data for loads and/or a surrounding environment from material analysis sensors; load weight data from pressure sensors; etc. As one non-exclusive example, the described systems and techniques may in some embodiments include obtaining and integrating data from sensors of multiple types positioned on a powered earth-moving vehicle at a site, and using the data to determine and control operations of the vehicle to accomplish one or more defined tasks at the site (e.g., dig a hole of a specified size and/or shape and/or at a specified location, move one or more rocks from a specified area, extract a specified amount of one or more materials, remove hazardous or toxic material from above ground and/or underground, perform trenching, perform demining, perform breaching, etc.), including determining current location and positioning of the vehicle on the site, determining and implementing vehicle motion around the site, determining and implementing operations involving use of the vehicle's tool attachment(s) and/or arms (e.g., hydraulic arms) via their movements, etc. Such powered earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and powered earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of powered earth-moving vehicles (e.g., vehicles used by military and/or police for operations such as breaching, demining, etc., including demining plows, breaching vehicles, etc.). With respect to sensor types, one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an earth-moving vehicle (e.g., to determine a 3D, or three-dimensional, model of some or all of a job site on which the vehicle is situated), with non-exclusive examples including LiDAR sensors of one or more types from Livox Tech. (e.g., Mid-70, Avia, Horizon, Tele-15, Mid-40, Mid-100, HAP, etc.) and with corresponding data optionally stored using Livox's LVX point cloud file format v1.1, LiDAR sensors of one or more types from Ouster Inc. (e.g., OS0 and/or OS1 and/or OS2 sensors), etc.-in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF module, Digi XBee SX 900 RF module, etc.). Other hardware components that may be positioned on or near an earth-moving vehicle and used to provide data and/or functionality used by the EMVAOC system include the following: one or more inclinometers (e.g., single axis and/or double axis) or other accelerometers (with one non-exclusive example including use of an inclination sensor by DIS sensors, such as the QG76 series); a CAN bus message transceiver (e.g., a TCAN 334 transceiver with CAN flexible data rate); one or more low-power microcontrollers (e.g., an i.MX RT1060 Arm-based Crossover MCU microprocessor from NXP Semiconductors; an ARM Cortex-M7 at 600 MHZ, whether operating on its own or present on a PJRC Teensy 4.1 Development Board; a Grove 12-bit Magnetic Rotary Position Sensor AS5600, etc.) or other hardware processors, such as to execute and use executable software instructions and associated data of the EMVAOC system; one or more voltage converters and/or regulators (e.g., an ST LT1576 or LD1117 or LM217 or LM317 adjustable voltage regulator, etc.); a voltage level shifter (e.g., using a field effect transistor, such as a Fairchild Semiconductor BSS138 N-Channel Logic Level Enhancement Mode Field Effect Transistor); etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same or different type; etc.), with the combination of data used in one or more types of autonomous operations as discussed herein. Additional details are included below regarding positioning of data sensors and use of corresponding data, including with respect to the examples of FIGS. 2A-2H.

As is also noted above, automated operations of an EMVAOC system may include determining current location and other positioning of a powered earth-moving vehicle on a site in at least some embodiments. As one non-exclusive example, such position determination may include using one or more track sensors to monitor whether or not a vehicle's tracks are aligned in the same direction as the vehicle's cabin and/or chassis, and using GPS data (e.g., from 3 GPS antennas located on the vehicle's cabin and/or chassis, such as in a manner similar to that described with respect to FIGS. 2A-2H) optionally in conjunction with an inertial navigation system to determine the rotation of the cabin and/or chassis (e.g., relative to true north). When using data from multiple GPS antennas, the data may be integrated in various manners, such as by using a microcontroller located on the powered earth-moving vehicle, and with additional RTK (real-time kinetic) positioning data optionally used to reinforce and provide further precision with respect to the GPS-based location (e.g., to achieve 1-inch precision or better). In addition, in some embodiments and situations, LiDAR data is used to assist in position determination operations, such as by surveying the surrounding environment around the powered earth-moving vehicle (e.g., some or all of a job site on which the powered earth-moving vehicle is located, such as terrain of the job site and objects on the job site) and confirming a current location of the powered earth-moving vehicle in two-dimensional ("2D") and/or three-dimensional ("3D") space, whether an absolute location (e.g., using GPS locations) and/or a relative location (e.g., using one or more points on the vehicle or other defined point(s) as a center point relative to which other points are mapped), and in some cases relative to a 2D and/or 3D site map of the job site generated from the LiDAR data and/or from analysis of visual data of images (e.g., a 3D point cloud having a plurality of data points each with an associated position in 3D space and representing a point on a surface, such as the ground or other terrain, an obstacle or other object above the ground, etc.; other types of 3D representations, such as meshes, planar surfaces or other types of surfaces, parametric models, depth-maps, RGB-D, voxels, etc.; 2D point clouds and/or other 2D representations; etc.). Additional details are included below regarding automated operations to determine current location and other positioning of a powered earth-moving vehicle on a site.

In addition, automated operations of an EMVAOC system may further include determining a target destination location and/or path of a powered earth-moving vehicle on a job site or other geographical area. For example, one or more planner modules of the EMVAOC system determines a current target destination location and/or path of a powered earth-moving vehicle (e.g., in accordance with other goals or planning operations being performed by the EMVAOC system, such as based on an overall analysis of a site and/or as part of accomplishing a group of multiple activities at the site). In addition, the motion of the powered earth-moving vehicle from a current location to a target destination location or otherwise along a determined path may be initiated in various manners, such as by an operator module of the EMVAOC system that acts in coordination with the one or more planner modules (e.g., based on a planner module providing instructions to the operator module about current work to be performed, such as work for a current day that involves the powered earth-moving vehicle leaving a current work area and moving to a new area to work), or directly by a planner module (e.g., to move to a new location along a path to perform terrain leveling and/or to prepare for digging). In other embodiments, determination of a target destination location and/or path and initiation of powered earth-moving vehicle motion may be performed in other manners, such as in part or in whole based on input received from one or more human users or other sources. Additional details are included below regarding such automated operations to determine a target destination location and/or path of a powered earth-moving vehicle on a site.

Automated operations of an EMVAOC system may further in at least some embodiments include identifying and classifying obstacles (if any) along one or more paths between current and destination locations, and implementing actions to address any such obstacles. For example, LiDAR data (or other depth-sensing data) and/or visual data may be analyzed to identify objects that are possible obstacles and as part of classifying a type of each obstacle, and other types of data (e.g., infrared, material type, sound, etc.) may be further used as part of classifying an obstacle type (e.g., to determine whether an obstacle is a human or animal, such as based at least in part by having a temperature above at least one first temperature threshold, whether an absolute temperature threshold or a temperature threshold relative to a temperature of a surrounding environment; whether an obstacle is a running vehicle, such as based at least in part by having a temperature above at least one second temperature threshold, whether an absolute temperature threshold or a temperature threshold relative to a temperature of a surrounding environment, and/or based on sounds being emitted; to estimate weight and/or other properties based at least in part on one or more types of material of the obstacle; etc.), and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute, etc., as discussed further below. In particular, one non-exclusive example of classifying objects includes an example classification system as follows: class 1, a small object that a powered earth-moving vehicle can move over without taking any avoidance action; class 2, a small object that is removeable (e.g., within the moving capabilities of a particular type of powered earth-moving vehicle and/or of any of the possible powered earth-moving vehicles, optionally within a defined amount of time and/or other defined limits such as weight and/or size and/or material type, such as to have a size that fits within a bucket attachment of the vehicle or is graspable by a grappling attachment of the vehicle, and/or to be of a weight and/or material type and/or density and/or moisture content within the operational limits of the vehicle) moving a large pile of dirt (requiring numerous scoops/pushes) and/or creating a path (e.g., digging a path through a hill, filling a ravine, etc.) and/or for which the vehicle can move over without taking any avoidance action; class 3, a small object that is removable but for which the vehicle cannot safely move over within defined limits without taking any avoidance action; class 4, a small-to-medium object that is removeable but may not be possible to do so within defined time limits and/or other limits and for which avoidance actions are available; class 5, a medium object that is not removeable within defined time limits and/or other limits and for which avoidance actions are available; class 6, a large object that is not removeable within defined time limits and/or other limits and for which avoidance actions are available; class 7, an object that is sufficiently large and/or structurally in place to not be removeable within defined time limits and/or other limits and for which avoidance actions are not available within defined time limits and/or other limits; classes 8-10 being small animals, humans, and large animals, respectively, which cause movement of the vehicle to be inhibited (e.g., to shut the vehicle down) to prevent damage (e.g., even if within the capabilities of the vehicles to remove and/or avoid the obstacle); etc. A similar system of classifying non-object obstacles (e.g., non-level terrain surfaces) may be used, such as to correspond to possible activities of a powered earth-moving vehicle in moving and/or avoiding the obstacle (e.g., leveling a pile or other projection of material, filling a cavity, reducing the slope e.g., incline or decline, etc.) including in some embodiments and situations to consider factors such as steepness of non-level surfaces, traction, types of surfaces to avoid (e.g., any water, any ice, water and/or ice for a cavity having a depth above a defined depth threshold, empty ditches or ravines or other cavities above a defined cavity size threshold; etc.).

Such classifying of obstacles may further be used as part of determining a path between a current location and a target destination location, such as to select or otherwise determine one or more of multiple alternative paths to use if one or more obstacles are of a sufficiently high classified type (e.g., not capable of being moved by the earth-moving vehicle, such as at all or within a defined amount of time and/or other defined limits, and/or being of class 7 of 10 or higher) are present along what would otherwise be at least one possible path (e.g., a direct path between the current location and the target destination location). For example, depending on information about an obstacle (e.g., a type, distance, shape, depth, material type, etc.), the automated operations of the EMVAOC system may determine to, as part of the autonomous operations of the powered earth-moving vehicle, perform at least one of (1) removing the obstacle from a path and moving along that path to the target destination location, or (2) moving in an optimized path around the obstacle to the target destination location, or (3) inhibiting motion of the powered earth-moving vehicle, and in some cases, to instead initiate autonomous operations of a separate second powered earth-moving vehicle to move to the target destination location as a replacement vehicle and/or to initiate a request for human intervention. Additional details are included below regarding such automated operations to classify obstacles and to use such information as part of path determination and corresponding powered earth-moving vehicle actions.

In addition, while the autonomous operations of a powered earth-moving vehicle controlled by the EMVAOC system may in some embodiments be fully autonomous and performed without any input or intervention of any human users (e.g., fully implemented by an embodiment of the EMVAOC system executing on that powered earth-moving vehicle without receiving human input and without receiving external signals other than possibly one or more of GPS signals and RTK correction signals), in other embodiments the autonomous operations of a powered earth-moving vehicle controlled by the EMVAOC system may include providing information to one or more human users about the operations of the EMVAOC system and optionally receiving information from one or more such human users (whether on-site or remote from the site) that are used as part of the automated operations of the EMVAOC system (e.g., a target destination location, a high-level work plan, etc.), such as via one or more GUIs ("graphical user interfaces") displayed on one or more computing device that provide user-selectable controls and other options to allow a user to interactively request or specify types of information to display and/or to interactively provide information for use by the EMVAOC system.

FIGS. 2A-2H illustrate examples of earth-moving vehicles and types of on-vehicle data sensors positioned to support autonomous operations on a site.

Figure 2A:
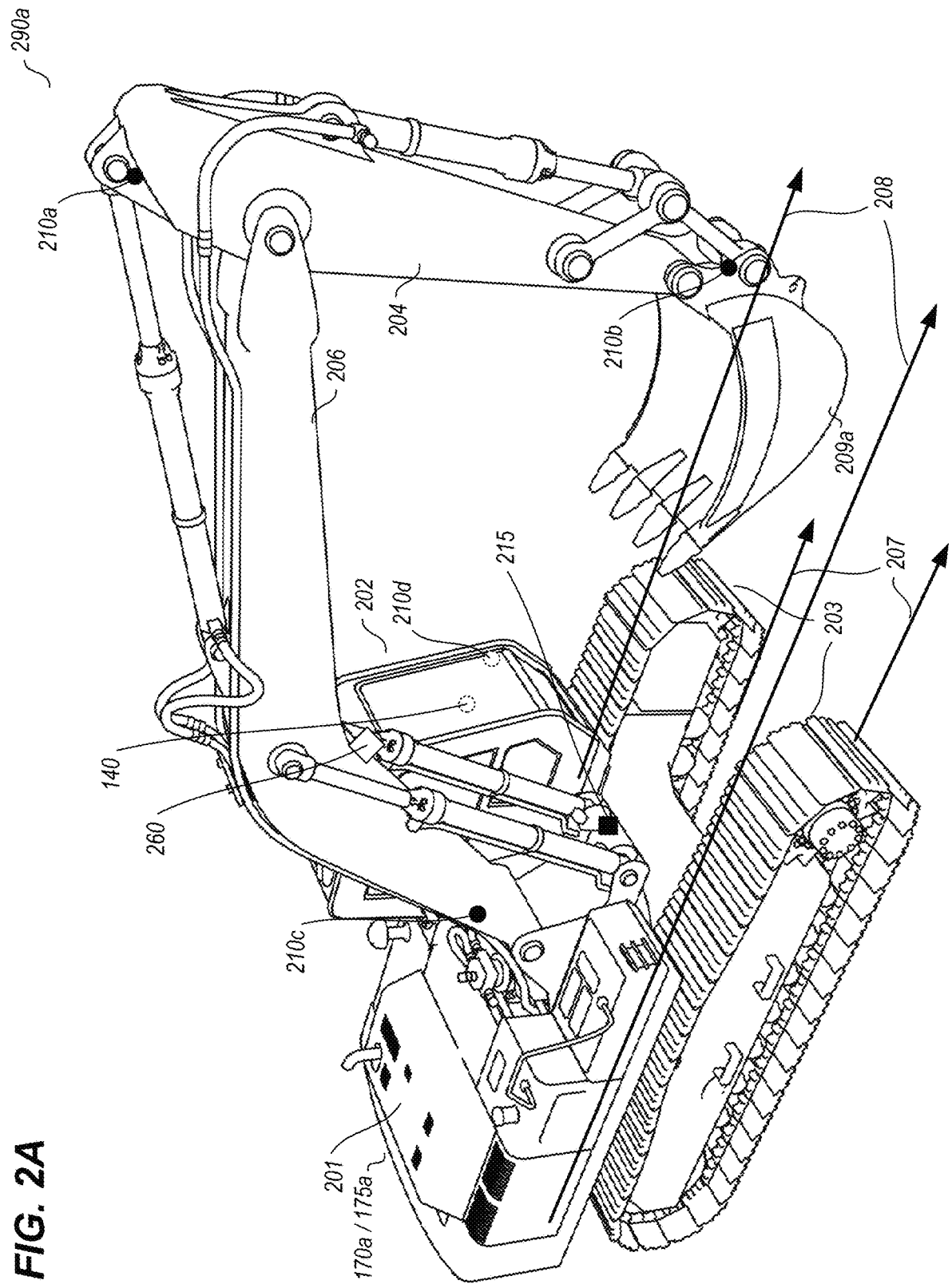

In particular, with respect to FIG. 2A, information 290a about an example powered earth-moving construction vehicle 170a and/or mining vehicle 175a is illustrated, which in this example is a tracked excavator vehicle, using an upper-side-frontal view from the side of the digging boom arm (or 'boom') 206 and stick arm (or 'stick') 204 and opposite the side of the cabin 202, with the earth-moving vehicle 170a/175a further having a main body chassis 201 (e.g., enclosing an counterweight 221 and engine, and including the cabin 202), tracks 203 and bucket (or 'scoop' or 'claw') tool attachment 209a—in other embodiments, other types of digging arm tool attachments may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the position of the bucket and other parts of the digging arms relative to the position of the cabin of the earth-moving vehicle. In this example, three inclinometers 210a-210c are mounted at respective positions on the digging arms of the earth-moving vehicle (position 210c near the intersection of the digging boom arm and the body of the earth-moving vehicle, position 210b near the intersection of the digging stick arm and the bucket attachment, and position 210a near the intersection of the digging boom and stick arms), such as to use single-axis inclinometers in this example, and with a fourth inclinometer 210d mounted within the cabin of the earth-moving vehicle and illustrated at an approximate position using a dashed line, such as to use a dual-axis inclinometer that measures pitch and roll angles-data from the inclinometers may be used, for example, to track the position of the earth-moving vehicle arms/attachment, including when a track heading direction 207 is determined to be different (not shown in this example) from a cabin/body heading direction 208. This example illustrates a position of one or more pressure sensors 215, which in this example are positioned along one or more pressure pipes (not shown) connected to the bottom of one or more pistons (or 'cylinders') configured to raise and lower the digging boom arm 206. This example further illustrates a position of a LIDAR component 260, which in this example is positioned on the underside of the digging boom arm 206 near its bend in the middle, and as such is movable along with the movements of the digging boon arm 206, as well as in some embodiments being independently movable (e.g., to rotate, tilt, swivel, etc.)—in other embodiments, the LiDAR component 260 may be located in other positions on the vehicle 170a/175a and/or may be one of multiple LiDAR components positioned at different locations on the vehicle. The vehicle may further have INS-DU or other IMU unit(s), not shown in this example. It will be appreciated that other quantities, positionings and types of illustrated sensors/components may be used in other embodiments.

Figure 2B:
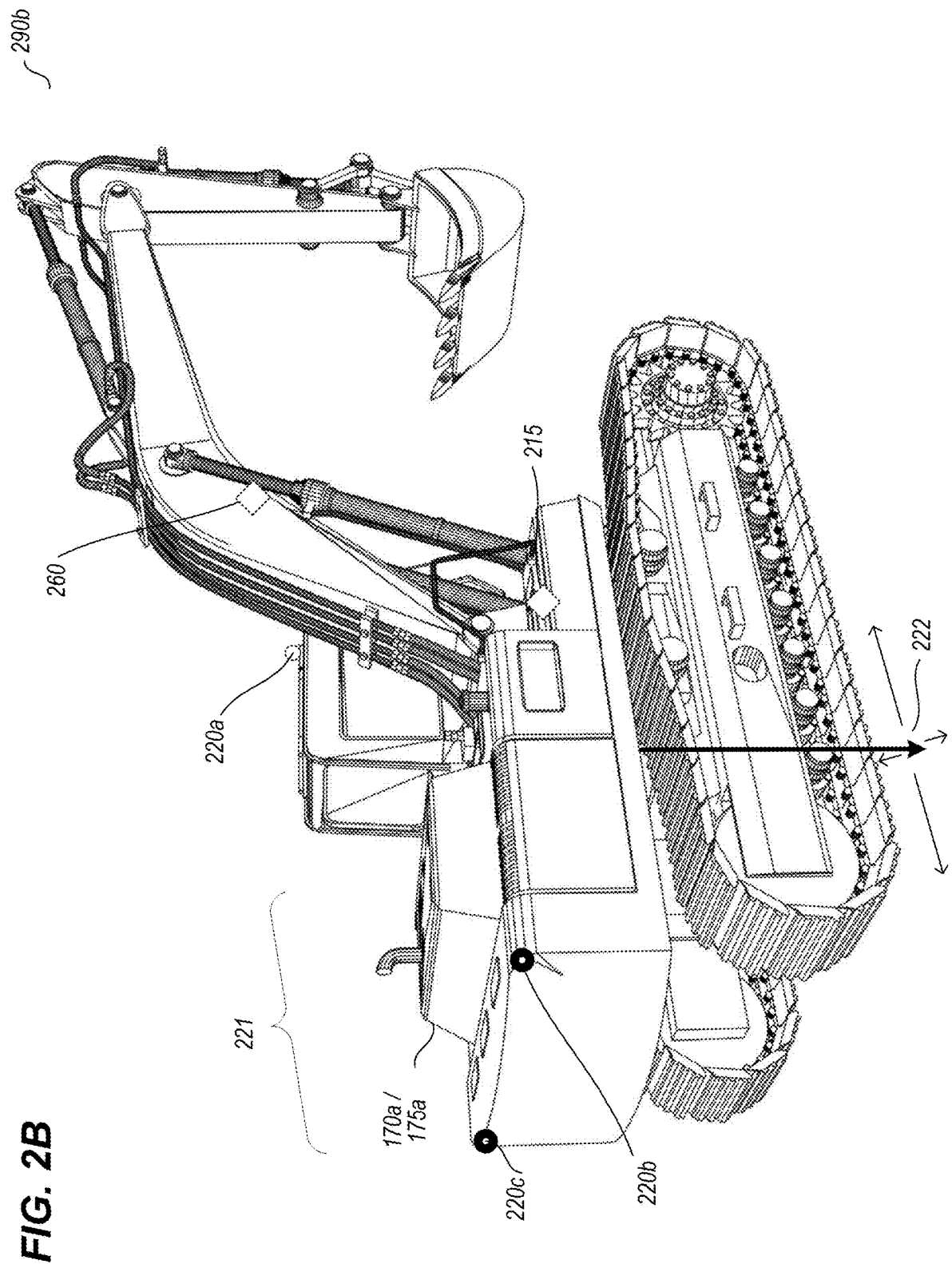

FIGS. 2B and 2C continue the example of FIG. 2A, and illustrate information 290b and 290c, respectively, about three example GPS antennas 220 at positions that beneficially provide GPS data to assist in determining the positioning and direction of the cabin/body of the earth-moving vehicle 170a/175a, including to use data from the three GPS antennas to provide greater precision than is available from a single GPS antenna. In this example, the three GPS antennas 220a-220c are positioned on the earth-moving vehicle body chassis and proximate to three corners of the chassis (e.g., as far apart from each other as possible), such that differential information between GPS antennas 220a and 220c may provide cabin heading direction information, and differential information between GPS antennas 220b and 220c may provide lateral direction information at approximately 90° from that cabin heading direction information. In particular, in FIG. 2B, the example earth-moving vehicle is shown using a side-rear view from the side of the arms, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). FIG. 2B further illustrates the counterweight 221 at the back of the chassis, and illustrates a center of gravity 222 of the vehicle that moves forward and backward as the arms and attachment are moved while the cabin/chassis is aligned with the tracks, and may move in other directions as the cabin/chassis rotates and/or as the arms and attachment are moved while the cabin/chassis is not aligned with the tracks (not shown). In FIG. 2C, the example earth-moving vehicle is shown using an upper-side-frontal view from the side of the cabin, with GPS antenna 220a shown on the cabin top near the front on the same side as GPS antenna 220c, and with the positions of GPS antennas 220b and 220c illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the earth-moving vehicle is located) to improve accuracy of the GPS signals from the GPS antennas, so as to be part of one or more RTK-enabled GPS positioning units. The LiDAR component 260 and pressure sensor 215 are also illustrated, using dashed lines in FIG. 2B to indicate the location on the underside of the digging boom arm (for the LiDAR component) and bottom of the piston(s) (for the one or more pressure sensors) due to the boom arm blocking a direct view of the component 260, and being directly visible in FIG. 2C. FIG. 2C also illustrates possible locations of one or more RGB cameras 250 with image sensors (not shown separately) that gather additional visual data about an environment of the vehicle 170a/175a from visible light—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In at least some embodiments and situations, some or all such cameras may be independently movable (e.g., to rotate, tilt, swivel, etc.) at their positions, and may further in at least some such embodiments be positioned on one or more moveable component parts of the vehicle (e.g., a hydraulic arm, attachment, etc.). In addition, in some embodiments and situations, the camera positioning may include having one or two forward-facing cameras (e.g., cameras that each produces perspective rectilinear images and/or video with a standard field of view and that in aggregate cover all or substantially all of the front area around the vehicle, such as all but a small area blocked by a front attachment of the vehicle), and one or two backward-facing camera (e.g., cameras that each produces panoramic images and/or video with a wide-angle field of view of 120° or 150° or 180° or more that covers the back and optionally some or all of the sides of vehicle). It will be appreciated that other quantities, positionings and types of GPS antennas (and/or antennas for other types of satellite-based navigation systems) and/or other sensors/components may be used in other embodiments.

Figure 2D:
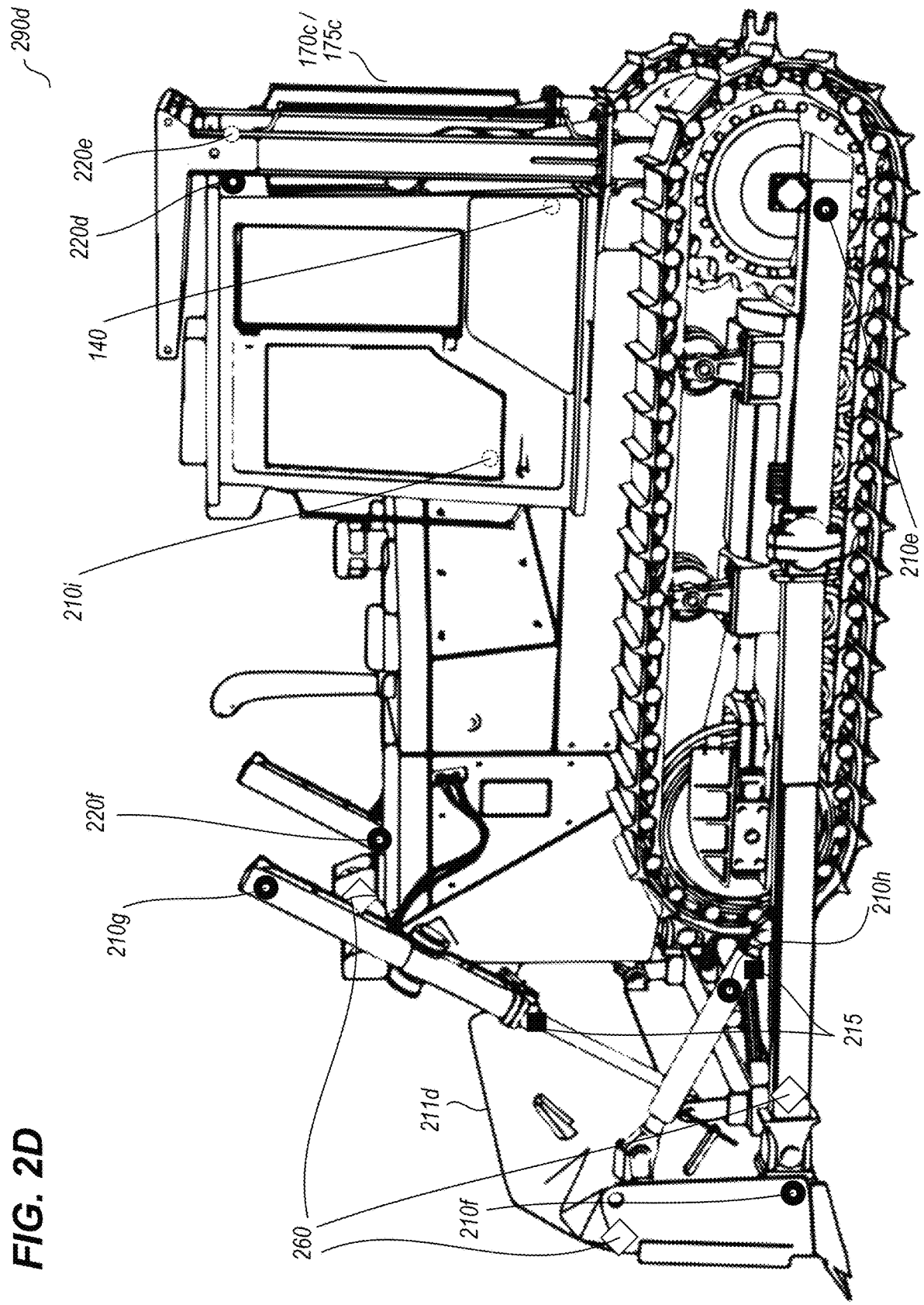
Figure 2E:
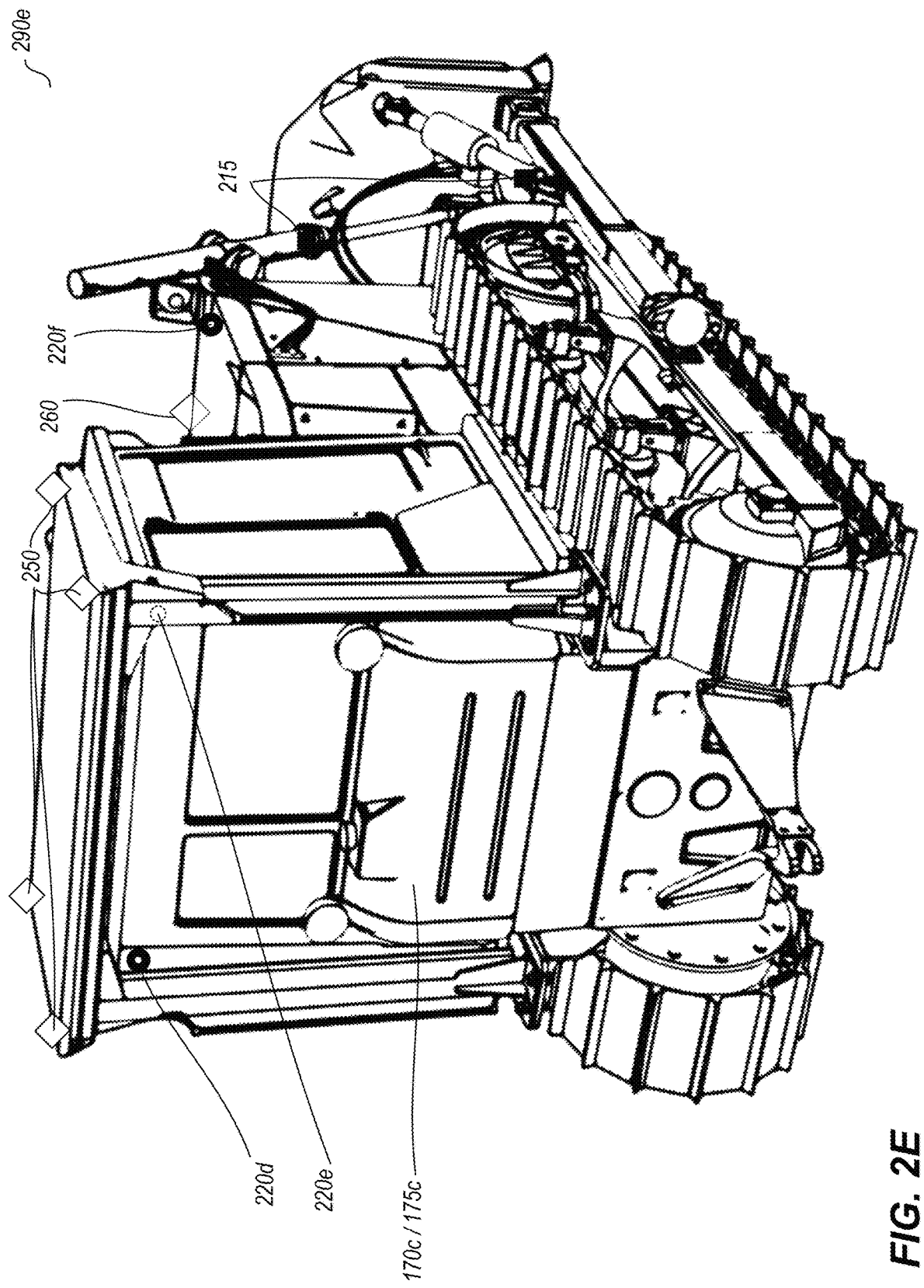

FIGS. 2D-2H continue the examples of FIGS. 2A-2C, with FIGS. 2D and 2E illustrating further example details 290d and 290e respectively about another earth-moving construction vehicle 170c and/or mining vehicle 175c, which in this example is a bulldozer vehicle having a blade attachment 211d (although other tool attachments may be used in other embodiments), such as to illustrate example positions for GPS receivers 220 and/or inclinometers 210 and/or one or more LiDAR components 260 and/or one or more cameras 250 and/or one or more pressure sensors 215. In particular, FIG. 2D illustrates example information 290d that includes various example inclinometers 210e-210i, example GPS antennas/receivers 220d-220f, and possible locations for one or more LiDAR components 260 and one or more pressure sensors 215. The example inclinometers 210e-210i are illustrated at positions that beneficially provide inclinometer data to compute the location of the blade or other front attachment (and optionally other parts of the bulldozer, such as the hydraulic arms) relative to the cabin of the bulldozer vehicle (e.g., at position 210e near the intersection of the track spring lifting arm and the body of the vehicle, position 210f near the intersection of the track spring lifting arm and the blade or other attachment, position 210g at one end of a hydraulic arm, position 210h at one end of the tilt cylinder, etc.), such as to use single-axis inclinometers in this example, and with another inclinometer 210i mounted within the cabin of the vehicle and illustrated at an approximate position using a dashed line, such as to use a dual-axis inclinometer that measures pitch and roll-data from the inclinometers may be used, for example, to track the position of the track spring lifting arm and attachment relative to the cabin/body of the vehicle. The example GPS antennas/receivers 220 are illustrated at positions that beneficially provide GPS data to assist in determining the positioning and direction of the cabin/body, including to use data from the three GPS antennas to provide greater precision than is available from a single GPS antenna. In this example, the three GPS antennas 220d-220f are positioned on the body chassis and proximate to three corners of the chassis (e.g., as far apart from each other as possible), such that differential information between GPS antennas 220f and 220e may provide cabin heading direction information, and differential information between GPS antennas 220d and 220e may provide lateral direction information at approximately 90° from that cabin heading direction information. The example one or more LiDAR components 260 are illustrated at one or more possible positions that beneficially provide LiDAR data about some or all of an environment around the vehicle 170c/175c, such as to be positioned on one or more sides of the blade/scoop attachment (e.g., to have a view to the side(s) of the vehicle) and/or a top or bottom (not shown) of the blade/scoop attachment (e.g., to have a view forwards), and/or on sides of one or more of the hydraulic arms (e.g., to have a view to the side(s) of the vehicle), and/or on a front of the chassis (e.g., near the top to have a view forwards over the blade/scoop attachment), etc. The example one or more pressure sensors 215 are illustrated at one or more possible positions to connect to pressure pipes (not shown) at the bottom of one or more pistons controlling movement of the attachment. FIG. 2E also illustrates possible locations of one or more RGB cameras 250 that gather additional visual data about an environment of the vehicle 170c/175c—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2D, the example earth-moving vehicle is shown using a side view, with GPS antennas 220d and 220e illustrated on the back of the body chassis at or below the top of that portion of the body chassis (using dashed lines to illustrate position 220e), and with an approximate position of GPS antenna 220f on the chassis top near the front—the positions 220d-220f are further illustrated in information 290e of FIG. 2E, in which the example earth-moving vehicle is shown using an upper-side-back view, with GPS antenna 220f shown on the body top near the front on the same side as GPS antenna 220e. While not illustrated in FIGS. 2D-2E, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. The vehicle may further have one or more INS-DU or other IMU units, which are not shown in this example. It will be appreciated that other quantities, positionings and types of GPS antennas (and/or antennas for other types of satellite-based navigation systems) and/or inclinometers and/or other sensors/components may be used in other embodiments.

Figure 2F:
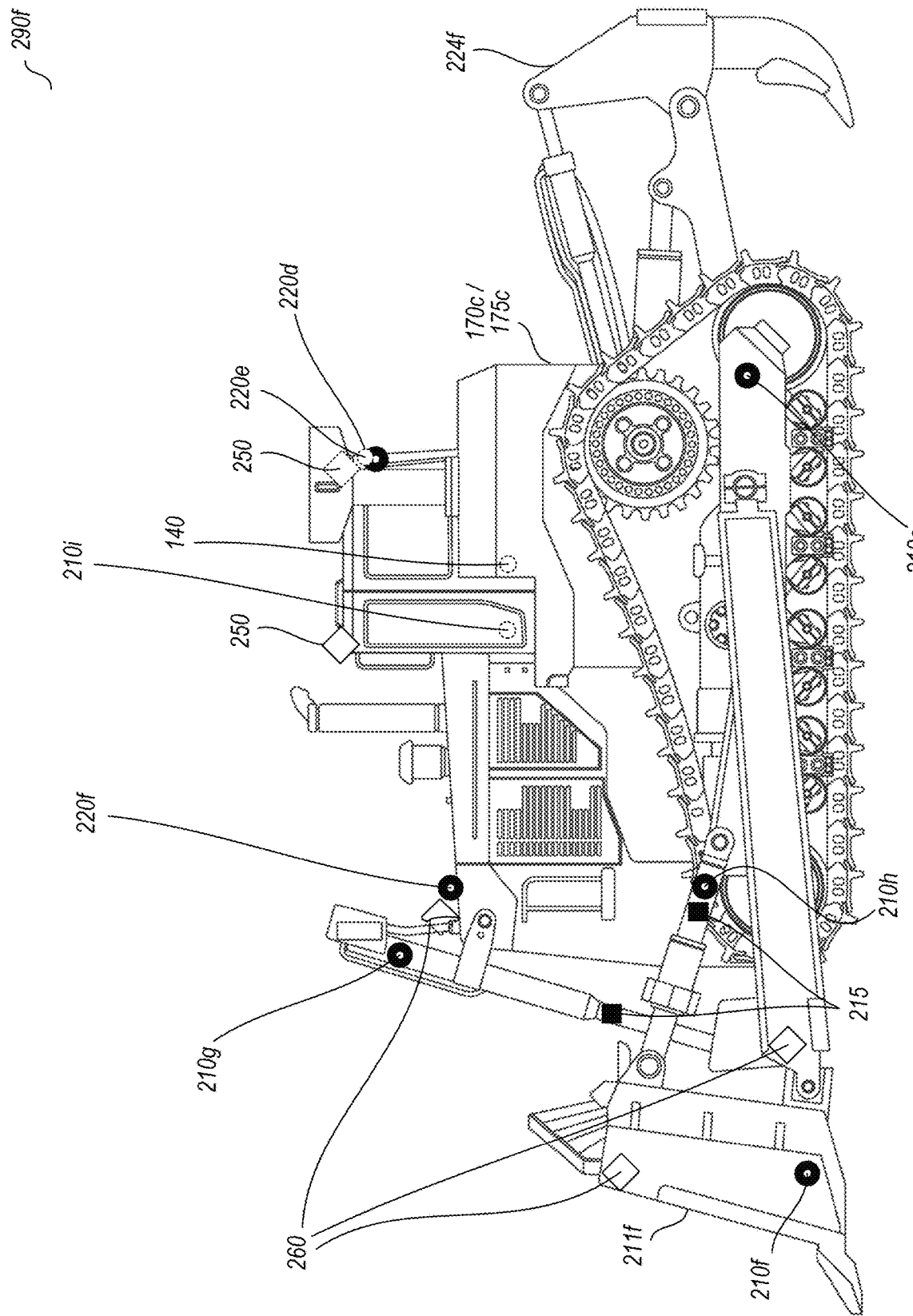

FIG. 2F continues the examples of FIGS. 2D-2E, and illustrates information 290f to show an example of an alternative configuration of a bulldozer vehicle 170c/175c in which the vehicle is equipped with both a front tool attachment and a rear tool attachment. In the example of FIG. 2F, the front tool attachment is a blade 211f, and the rear tool attachment is a ripper 224f with one or more teeth. Various sensors and components may be positioned on the vehicle in a manner similar to that of FIGS. 2D-2E, including illustrated elements 140, 210e-210i, 215, 220d-220f, 250 and 260.

Figure 2G:
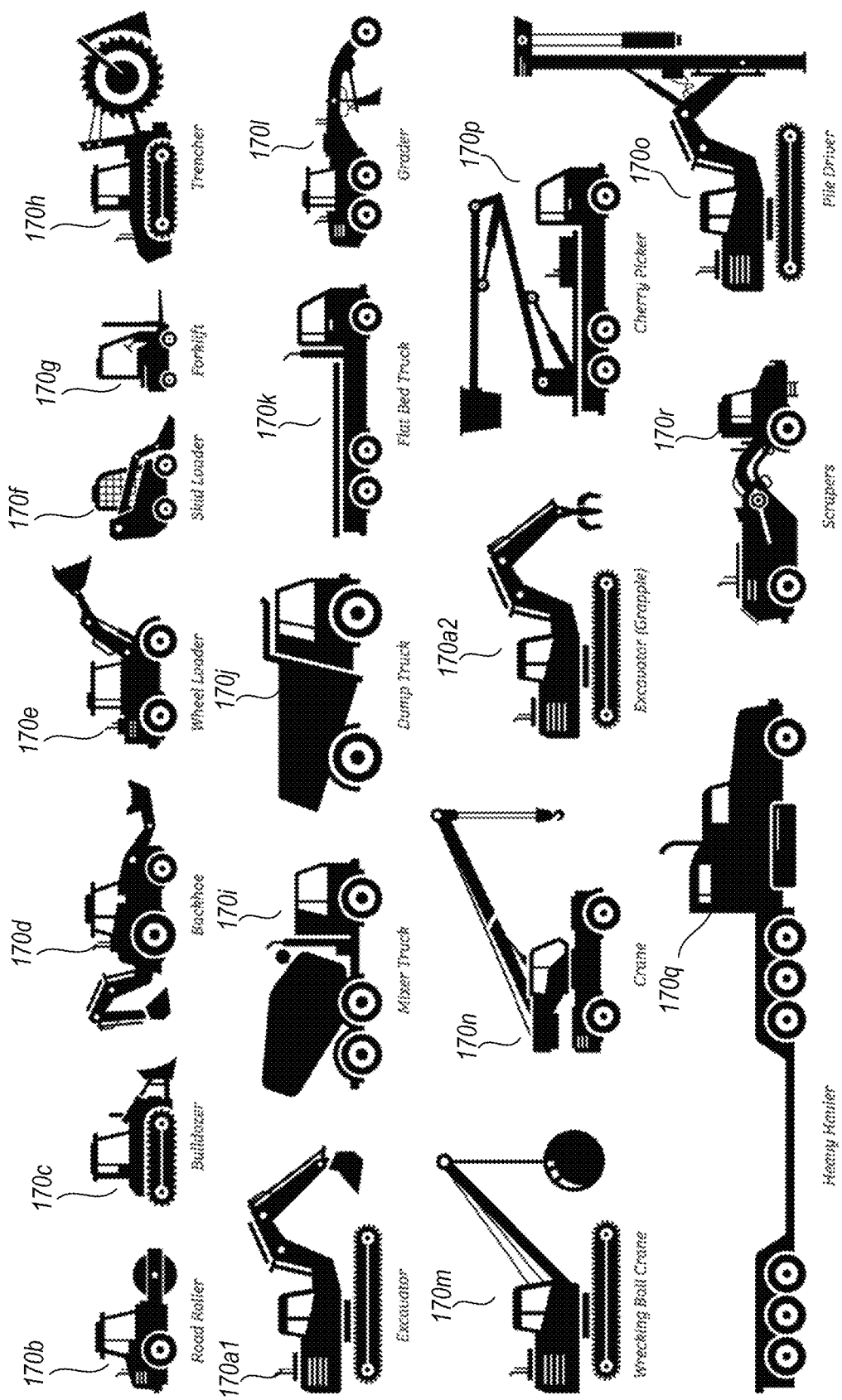
Figure 2H:
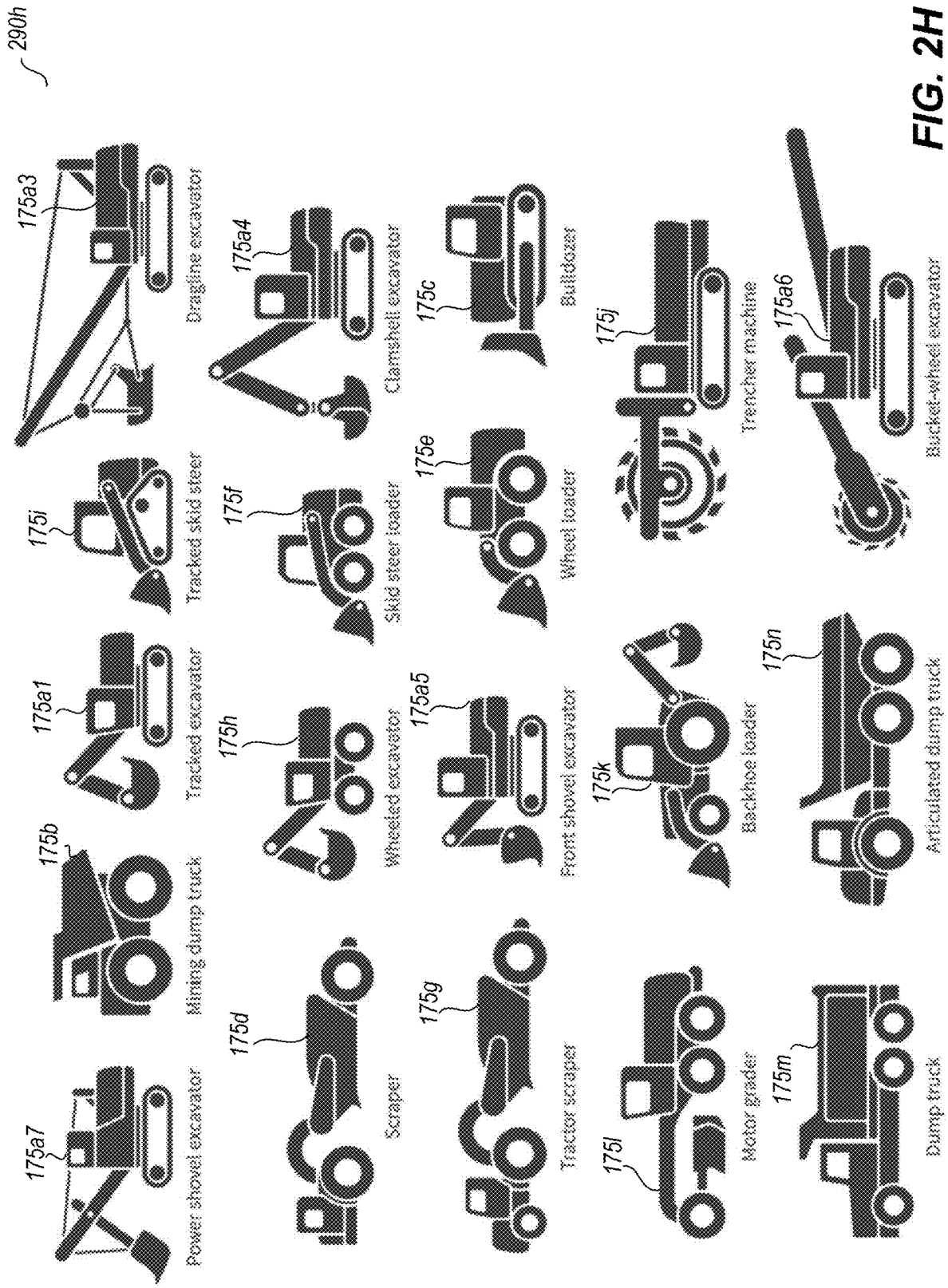

FIGS. 2G and 2H illustrate respective information 290g and 290h about a variety of non-exclusive example types of powered earth-moving construction vehicles 170 and powered earth-moving construction vehicles 175 that may be controlled by embodiments of the EMVAOC system. FIG. 2O (referred to herein as "2-O" to prevent confusion with the number 20) includes two example earth-moving tracked construction excavator vehicles 170a shown with different attachments (excavator vehicle 170a1 with a bucket attachment, and excavator vehicle 170a2 with a grapple attachment) that may be controlled by the EMVAOC system. Other example types of earth-moving construction vehicles 170 that are illustrated in FIG. 2G include a bulldozer 170c; a backhoe loader 170d; a wheel loader 170e; a skid steer loader 170f; a dump truck 170j; a forklift 170g; a trencher 170h; a mixer truck 170i; a flatbed truck 170k; a motorized grader 170l; a wrecking ball crane 170m; a truck crane 170n; a cherry picker 170p; a heavy hauler 170q; a scraper 170r; a pile driver 170o; a road roller 170b; etc. It will be appreciated that other types of earth-moving construction vehicles may similarly be controlled by the EMVAOC system in other embodiments. In a similar manner, FIG. 2H illustrates several example earth-moving tracked mining excavator vehicles 175a shown with different attachments (excavator vehicle 175a1 with a bucket attachment, excavator vehicle 175a3 with a dragline attachment, excavator vehicle 175a4 with a clamshell extractor attachment, excavator vehicle 175a5 with a front shovel attachment, excavator vehicle 175a6 with a bucket wheel extractor attachment, excavator vehicle 175a7 with a power shovel attachment, etc.) that may be controlled by the EMVAOC system. Other example types of earth-moving mining vehicles 175 that are illustrated in FIG. 2H include a dump truck 175m; an articulated dump truck 175n; a mining dump truck 175b; a bulldozer 175c; a scraper 175d; a tractor scraper 175g; a wheel loader 175e; a wheeled skid steer loader 175f; a tracked skid steer loader 175i; a wheeled excavator 175h; a backhoe loader 175k; a motor grader 175j; a trencher 175l; etc. It will be appreciated that other types of earth-moving mining vehicles may similarly be controlled by the EMVAOC system in other embodiments. In addition, while various types of sensors are not illustrated in FIGS. 2G-2H, it will be appreciated that such sensors (e.g., LiDAR sensors, image sensors of cameras, infrared sensors, material type sensors, etc.) may be mounted on the respective powered earth moving vehicles 170 and/or 175 at various positions, such as at the same or analogous positions as the sensors discussed with respect to FIGS. 2A-2N, or instead in other positions.

Figure 2I:
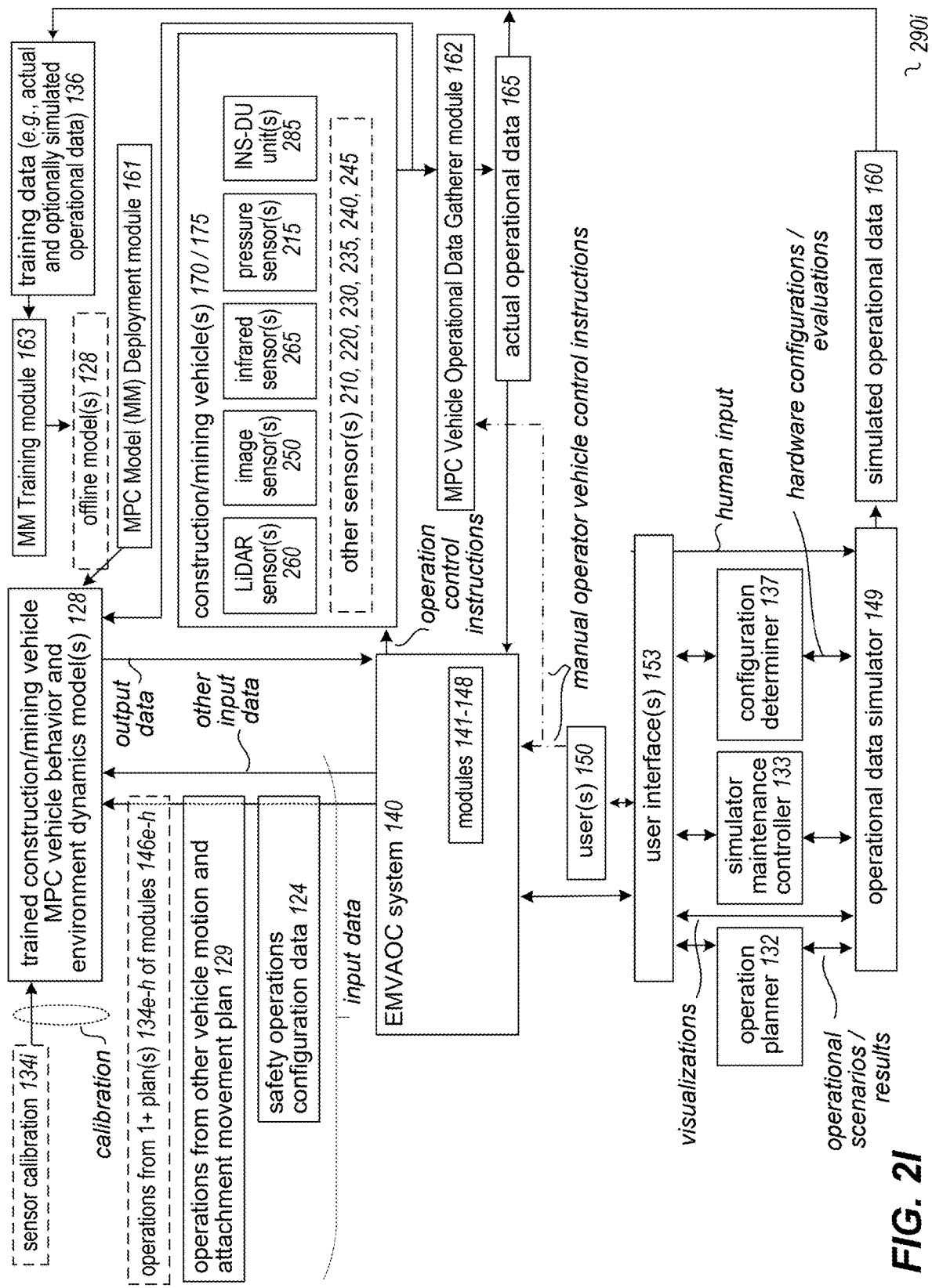
FIGS. 2I-2K illustrate examples of autonomous operations and associated data used for controlling movement of some or all of a powered earth-moving vehicle, including to perform automated operations that include a cycle of training and deployment of a predictive model to control autonomous operations of an earth-moving vehicle.
Figure 2J:
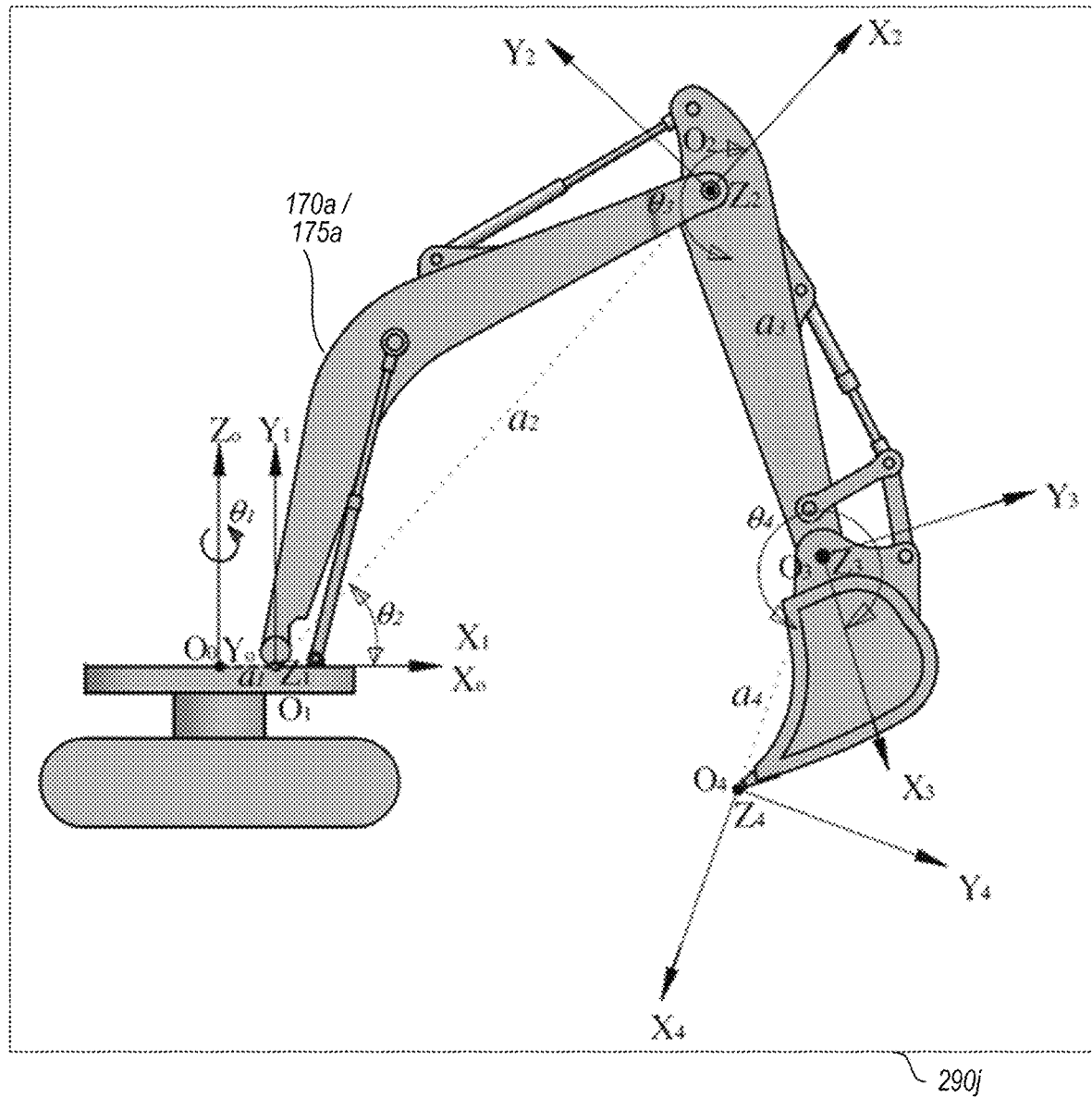

FIGS. 2I-2J illustrate examples of modules and interactions and information used to implement autonomous operations of one or more powered earth-moving vehicles based at least in part on gathered environment data. In particular, FIG. 2I illustrates information 290i about a powered earth-moving vehicle behavior and environment dynamics model 128 that is used by the EMVAOC system 140 to implement determined autonomous operations of one or more earth-moving vehicles 170/175/180, such as to supply input data to the model 128 corresponding to a current state and environment of the earth-moving vehicle(s) and about vehicle motion and/or attachment movement operations to be performed for one or more tasks (e.g., from a planner module or other source) and safety operations configuration data 124 to use (e.g., related to operations involving balancing, slippage, prohibited 3D positions, etc.), and to receive corresponding output data used to provide operation control instructions to the earth-moving vehicle(s)—in this example, the input data further includes one or more of information 134e about a plan to implement automated operations for controlling loading of a blade tool attachment (such as from module 146e using one or more blade load prediction models and predicted estimated blade load data, not shown), information 134f about a plan to implement automated operations for controlling vehicle steering using a blade tool attachment (such as from module 146f), information 134g about a plan to implement automated operations for controlling use of a ripper tool attachment to loosen ground materials for subsequent blade tool operations (such as from module 146g), information 134h about a plan to implement automated operations for managing vehicle motion based in part on the slope of surrounding surfaces (such as from module 146h), and information 134i about a plan to implement automated operations for calibrating on-vehicle sensors based in part on sensor position and orientation (such as from module 146i). In this example, the earth-moving vehicle(s) 170/175/180 each has one or more LIDAR sensors 260 that generate data about a surrounding environment of the earth-moving vehicle(s) 170/175/180 (e.g., in the form of one or more 3D point clouds, not shown, and optionally after calibration operations are performed that provide LiDAR calibration data to translate the LiDAR data obtained from a current position of each LiDAR sensor to a global coordinate system for the site), one or more image sensors 250 of one or more cameras that generate visual data about a surrounding environment of the earth-moving vehicle(s) 170/175/180 (e.g., video, still images, etc., and optionally after calibration operations are performed that provide camera calibration data to translate the visual data obtained from a current position of each camera or other image sensor to a global coordinate system for the site), one or more infrared sensors 265 that generate infrared data about a surrounding environment of the earth-moving vehicle(s) 170/175/180 (e.g., for objects and other obstacles, etc., and optionally after calibration operations are performed that provide infrared calibration data to translate the infrared data obtained from a current position of each infrared sensor to a global coordinate system for the site), one or more pressure sensors 215 that provide data about when the attachment(s) are touching the ground or other underlying surface (based on pressure to the piston(s) or other cylinder(s) that lift the attachment, such as to detect with the attachment is on the surface based on the pressure going to zero or otherwise below a defined threshold such as 20 or 30 PSI, and optionally after calibration operations are performed that provide pressure sensor calibration data), one or more INS-DU or other IMU units to assist in determining vehicle position (e.g., with respect to orientation and in some cases position of the INS-DU or other IMU units, and optionally after calibration operations are performed that provide corresponding calibration data), and may optionally further have one or more other sensors 210, 220, 230, 235 or 245.

The model 128 may further be generated and deployed in the illustrated embodiment by the MPC-based Control System, including by its modules 161-163. In particular, module 161 may gather actual operational data 165 during at least some times (e.g., during manual control of the vehicle), and supply that data to the module 163 as training data 136, optionally along with simulated operational data 160 from one or more operational data simulators 149 (e.g., for initial training before the model(s) are used; updated training while the model(s) are being used, such as to improve their performance over time; etc.)—the module 163 may initially generate one or more offline versions of the model 128, before the module 162 later deploys a current copy of the model 128 for use by the EMVAOC system. During operation, the actual operational environment data and other actual operational data 165 obtained by the on-vehicle sensors may similarly be provided to or otherwise accessed by the EMVAOC system 140. The EMVAOC system 140 may analyze the environment data and other data 165 from the vehicle(s) 170/175/180 to generate additional data (e.g., to classify types of obstacles of detected objects, to generate a terrain contour map or other visual map of some or all of the surrounding environment, to determine prohibited 3D positions, etc.) and to determine operation control instructions to implement on the vehicle(s) 170/175/180, including for vehicle motion between locations on a job site and for attachment movements as part of vehicle operations—for example, the EMVAOC system 140 may produce DIGMAP information or other 2D or 3D site map representations (not shown) to represent the terrain of some or all of the job site, such as for use by a planner module 132 and/or to further supply to the module 162 during the training phase; etc. As one non-exclusive example, the operation control instructions provided from the EMVAOC system 140 may simulate inputs to the control panel on a powered earth-moving vehicle that would be used by a human operator, if one were present, and the model(s) 128 may translate the operation control instructions to implementation activities for the vehicle(s) 170/175/180 (e.g., hydraulic and/or electrical impulses that are provided to the vehicle(s) 170/175/180)—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1, and such as by using one or more piston displacement mechanisms positioned to manipulate one or more controls of the powered earth-moving vehicle when actuated. In one embodiment, the behavioral model achieves at least 17% efficiency improvement and 20× duty cycle improvement over human operators and proportional fuel efficiency can also be achieved.

FIG. 2I further illustrates additional modules that may interact with the EMVAOC system 140 and/or each other to provide additional functionality. In particular, one or more users 150 may use one or more user interface(s) 153 (e.g., a GUI displayed on a computing device or provided via a VR and/or AR and/or mixed reality system) to perform one or more interactions, such as one or more of the following: to interact with a planner module 132 that computes an optimal or otherwise preferred plan for an entire job or to otherwise specify operational scenarios and receive simulated results, such as for use in determining optimal or otherwise preferred implementation plans to use for one or more tasks and/or multi-task jobs or to otherwise enable user what-if experimentation activities; to interact with a configuration determiner module 137 that uses the simulator module(s) 149 to determine optimal or otherwise preferred hardware component configurations to use and/or to generate simulated operational data 160 for use in model training; to interact with a simulator maintenance controller 133 to implement various types of maintenance activities; to directly supply human input for use by the simulator module(s) 149 (e.g., configuration parameters, settings, etc.); to request and receive visualizations of simulated operations and/or simulated operational data; etc. The planner module 132 may, for example, be independently developed through the design of artificial intelligence, and a plurality of plans from the planner module 132 may be input to the same trained model without having to train new models. In some embodiments, the simulator module(s) 149 may further generate rendered visualizations (e.g., using 'unreal engine' from Epic Games or another rendering engine).

FIG. 2J illustrates information 290j regarding physical movement dynamics information for an example powered earth-moving vehicle 170a/175a, which in this example is an excavator vehicle, such as may be used in the training and/or implementation of behavioral models 128, and/or by the operational data simulator module 149 in simulating operations of such an earth-moving vehicle, and/or as part of determining prohibited 3D positions for movement of the vehicle's hydraulic arms and tool attachment corresponding to other parts of the vehicle (e.g., the chassis, the tracks, etc.) and/or as part of determining positions of vehicle arm(s) and/or attachment(s) to use as part of operations related to balancing, slippage, controlled stoppage, etc. In this example, the information 290j illustrates angles and directions that arm(s)/attachment may move, such as for a bucket/scoop attachment in this example. In at least some such embodiments, the operational data simulator module may use various movement-related equations as part of its operations, such as to include the following:

Position
    Derivative: r(t)

Integral: $r(t)=r_0+\int_0^t v dt'$

Velocity

Derivative: $v(t)=dvdt$

Integral: $v(t)=v_0+\int_0^t a dt'$

Acceleration
    Derivative:

$$a(t) = \frac{dv}{dt} = \frac{d*d*r}{d*t*t}$$

Integral: a(t)

$$W=\int_a^b F(x)d^x$$

Then composes to the full law of motion:

$$x(t) = x_0 + \int_n^t v(T)dT =$$

$$x_0 + \int_n^t v_0 e^{-\frac{k}{m}T}dT = x_0 - m*v_0/k*\left(e^{-\frac{k}{m}T} - 1\right) = x_0 + m*v_0/k*\left(1 - e^{-\frac{k}{m}T}\right)$$

Forward Kinematics: This process transforms measured joint angles from a given origin to calculate positions of the end effectors (stick end and bucket bottom). It is a chain of transformations from the initial joint (cabin) up to the final effector (bucket).

Inverse kinematics: This process infers a possible set of joint angles to put the end effector (stick end or bucket end) to a specified position in the cylindrical space. It is handled by a custom Decision Tree-based machine learning model.

To create training/test data for the model, a grid search of all possible angles for joints (between minimum and maximum limit of the joints) is used, and forward kinematics are computed to create ground truth labels. 20% of the data may be used for testing of the model, and 80% may be used for the training. During the inference, a destination position in cylindrical coordinates is provided to the model, and the model outputs the closest joint angles that will hold the effector in the desired destination position. As a safety mechanism, forward kinematics may be run one more time with the model outputs to verify the results in a real-time manner.

Joint Physics: Simulation of hydraulic physics may be calculated with state-based approximations, such as for the following example states:

1—Idle—no input is applied after SlowDown state is transitioned out completely (model assumes no movement in the joints);

2—WindUp—in seconds, time between start input and start of movement, with delay caused by the pilot hydraulics getting pressurized before opening valves on the main hydraulics;

3—SpeedUp—interpolation until speed reaches MaxAngularSpeed, to ease in to the target angular velocity, using a formula as follows:
Alpha=Clamp(timedelta, 0.0, SpeedUpCoefficient)/SpeedUpCoefficient InterpolationEaseOut(0.0, Desired Angular Velocity, Alpha, 2.0);

4—Sustain—when input is stopped, until speed reaches 0, keeping steady at the target angular velocity;

5—SlowDown—ease out of the target angular velocity and ease in to zero, using a formula as follows:
Alpha=Clamp (timedelta, DesiredVelocityAtStart, SlowDownCoefficient)/SlowDownCoefficient InterpolationEaseOut (0.0, Desired Angular Velocity, Alpha, 2.0).

Different Windup/SpeedUp/Sustain/SlowDown times may be used based on particular machines and conditions, such as for domain randomization. It will be appreciated that the operational data simulator module may use other equations in other embodiments, whether for earth-moving vehicles with the same or different attachments and/or for other types of earth-moving vehicles. In at least some embodiments, the operational data simulator module may, for example, simulate the effect of wet sand on the terrain. More generally, use of the operational data simulator module may perform experimentation with different alternatives (e.g., different sensors or other hardware components, component placement locations, hardware configurations, etc.) without actually placing them on physical earth-moving vehicles and/or for different environmental conditions without actually placing earth-moving vehicles in those environmental conditions, such as to evaluate the effects of the different alternatives and use that information to implement corresponding setups (e.g., to perform automated operations to determine what hardware components to install and/or where to install it, such as to determine optimal or near-optimal hardware components and/or placements; to enable user-driven operations that allow a user to plan out, define, and visualize execution of a job; etc.). Furthermore, such data from simulated operation may be used in at least some embodiments as part of training one or more behavioral machine learning models for one or more earth-moving vehicles (e.g., for one or more types of earth-moving vehicles), such as to enable generation of corresponding trained models and methodologies (e.g., at scale, and while minimizing use of physical resources) that are used for controlling autonomous operations of such earth-moving vehicles.

Figure 2K:
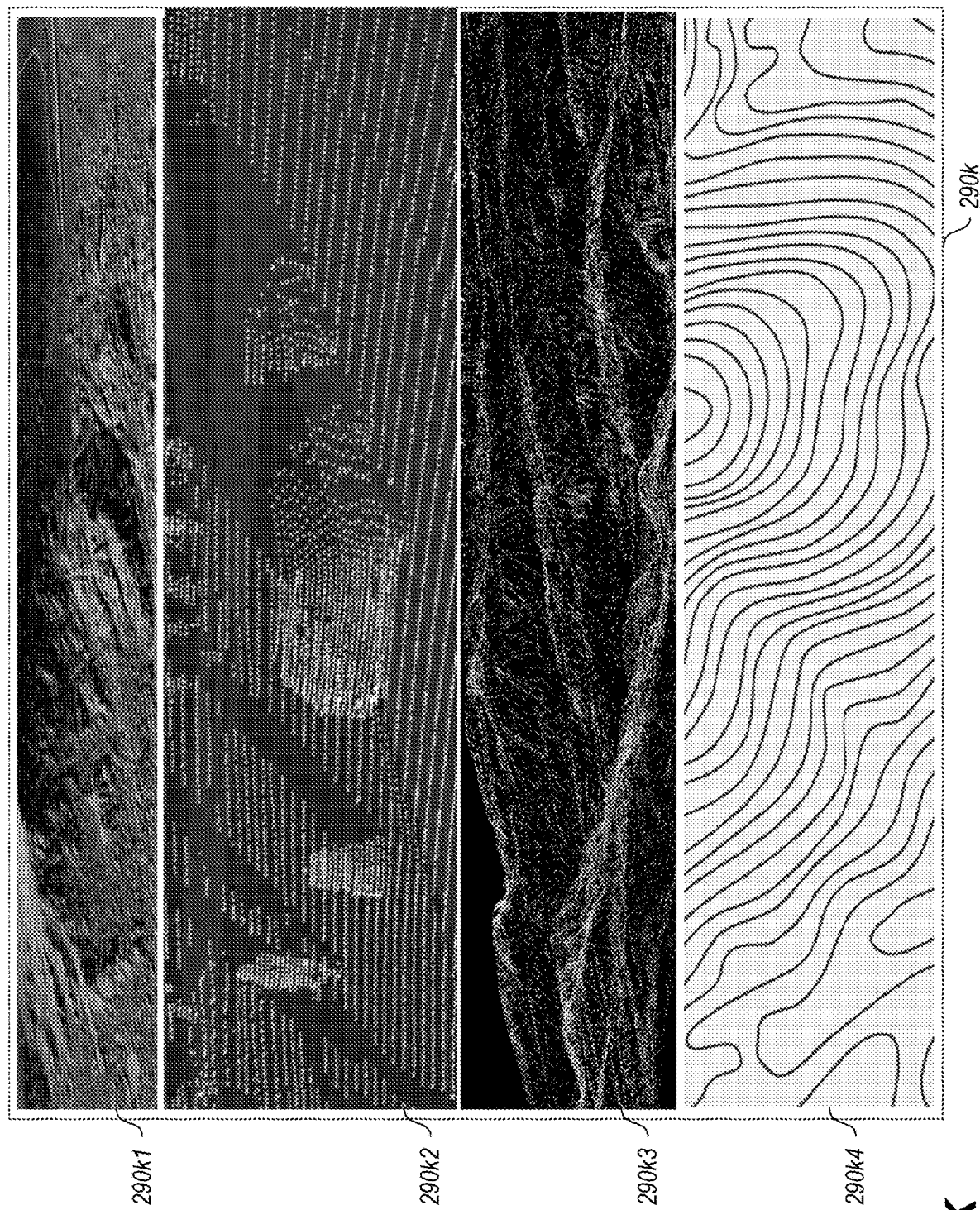

FIG. 2K illustrates further example information related to the gathering and generation of environment data, such as by perception system 141, and illustrates information 290$k$ to provide non-exclusive examples of environment data that may be gathered and generated by an embodiment of the EMVAOC system 140. In this example, information 290$k$1 illustrates an example of an image of surrounding terrain that may be captured around a powered earth-moving vehicle (not shown), such as by one or more RGB cameras located on the vehicle. Information 290$k$2 illustrates an example of information that may be gathered by one or more LiDAR modules on the vehicle regarding part of a surrounding environment, such as to include 3D data points that illustrate shape and depth information for surrounding terrain, as well as objects in the environment (e.g., one or more vehicles, a person, a rock or other object, etc.). Information 290$k$3 illustrates a further example of a 3D point cloud that may be generated from LiDAR data, and shows depth and shape information for a surrounding environment, such as terrain of the environment. Information 290$k$4 illustrates one example of a visual map of a surrounding environment (e.g., a DigMap) that may be generated from such LiDAR data, which in this example is a terrain contour visual map. In at least some embodiments, such a visual map may include a set of 3D data points, such as to each have a corresponding XYZ coordinate in relation to an origin point (e.g., a location of a LIDAR component that is used to generate the 3D data points).

As one non-exclusive example embodiment, the MPC-based Control System is used with earth-moving vehicles that may operate in challenging environment conditions such as unpredictable weather and terrain movements, which can be significantly more challenging than environments used with traditional machine learning and deployment models where training and deployment can be readily accomplished in standalone manual cycles and deployment issues and bugs are handled via labor-intensive and time-consuming requirement-tracking systems, with such traditional issue-tracking solutions being inefficient and dangerous in earth-moving tasks where perceived topography is actively and constantly changing according to plan and/or environmental variations. Accordingly, the operations of the MPC-based Control System improve upon machine learning speed and operational safety through fully automated, self-reinforcing cycles of data collection, training, and deployment.

In some situations, the one or more MPC Vehicle Operational Data Gatherer modules may include a perception module that obtains and uses data from a combination of sensors (e.g., one or more of LiDARs, imaging cameras, inclinometers, INS, pressure sensors, GPS, IMUs, GPS, and other sensors that collect perception data such as terrain composition, gradient, load, and obstacles), and an operator module that gathers human operator data such as control configurations and degree of control movements as well as machine data such as fuel consumption and pressure readings. Before the trained MPC model(s) 128 are deployed to a particular earth-moving vehicle, the perception module and the operator module executing on that vehicle are operated in read-only mode during reinforcing cycles for data collection and AI-processed analytics generation to facilitate efficient learning while the vehicle operates and changes the topography of the environment. The MM Deployment module may redirect data collection to the MM Training module, and perform the deployment of the trained MPC model and optionally additional software for performance of autonomous operations (e.g., the EMVAOC system) onto the vehicle. Gathered 3D data in various forms may be compiled into a digmap site map (e.g., as a compressed understanding of the terrain including millions of collected points in a simplified point cloud form), such as at least 20 times per second as the terrain changes to keep track of the current topography reality, and which is similarly provided to the MM Training module. The MM Training module may, for example, execute in the cloud with a live data feed from a particular earth-moving vehicle, and use a Model Predictive Control (MPC) designed specifically for controlling earth-moving machines in an environment with unknown environment parameters to train the MPC model 128 (e.g., a neural network that infers the dynamics of the environment from data, acting as a dynamics model)—through iteration, the MM Training module optimizes the MPC model 128 to predict future states based on both sequences of vehicle actions and a history of the vehicle's state to perform tasks according to a plan to result in a planned digmap site map. The use of the trained MPC model 128 on the vehicle for autonomous operations may be turned on or off based on user preferences, such as by enabling all, some, or none of the features of the automated operations on the vehicle.

In this example embodiment and with respect to the self-reinforcing cycle of FIG. 1B, the cycle may begin with the installation of the perception module and operator module in a data collection phase, with the collected data fed to the MM Deployment module for processing and generation of AI-processed analytics (e.g., including automated identification of areas for improvements) in an analytics phase and further used to train the MPC model in a training phase. These three phases operate iteratively without deployment until a determination is made to turn on AI automation features, at which time the cycle moves in the outer circle through the deployment phase to deploy the already-trained MPC model from the iteration of the first three phases and without manual training and adjustments. The MPC model may be trained for earth-moving tasks that include, for example, slot-dozing, production dozing, reclamation tasks, dealing with faults (e.g., misplaced materials), near-miss and other safety incidents, truck loading, trenching, scraping, loading, and general earth-moving tasks, and providing for a deep understanding of the variation of vehicles of a given type to provide for predictive maintenance and incident pre-emption. The self-reinforcing cycle may be used to auto-generate near-miss reports, provide recommendations based on AI-processed analytics, etc., and may be installed on many vehicles within the same environment to achieve complicated data collection and learning to operate in multi-machine settings, and/or may be installed on vehicles of the same type across different sites for achieving accurate predictive maintenance of the type of machine.

In this example embodiment and with respect to the self-reinforcing cycle, additional advances of these techniques may include the following: avoiding cold start issues in robotics by decomposing training and deployment into a structured series of steps, allowing for easier learning of mixed operation and safer model training; promote federated learning across vehicles owned and/or operated by multiple entities, such as with entity-specific data kept private and confidential in local training scenarios, while non-confidential data is shared to enable larger learning for the same type of vehicle across different sites; enable self-supervision and self-learning based on feedback to improve operations (e.g., vehicle traversability), such as based on site-specific learned terrain features, as well as to use the iterative process to self-check consistency in data from multiple sensors (e.g., perception data from a LIDAR and from a camera); provide a failsafe in semi-autonomous operations to prevent human operator mistakes (e.g., even if fully autonomous operations have not been deployed), such as to remove humans and other environmental elements from harm.

The EMVAOC system may further perform additional automated operations in at least some embodiments as part of determining a motion/movement plan that includes a powered earth-moving vehicle motion from a current location to one or more target destination locations, with non-exclusive examples including the following: having the powered earth-moving vehicle create a road (e.g., by flattening or otherwise smoothing dirt or other materials of the terrain between the locations) along a selected path as part of the motion/movement plan, including to optionally select that path from multiple alternative paths based at least in part on a goal involving creating such a road at such a location; considering environmental conditions (e.g., terrain that is muddy or otherwise slick/slippery due to water and/or other conditions), including in some embodiments and situations to adjust classifications of some or all obstacles in an area between the current and target destination locations to reflect those environmental conditions (e.g., temporarily, such as until the environmental conditions change); considering operating capabilities of that particular vehicle and/or of a type of that particular vehicle (e.g., tool attachments, size, load weight and/or material type limits or other restrictions, etc.), including in some embodiments and situations to adjust classifications of some or all obstacles in an area between the current and target destination locations to reflect those operating capabilities (e.g., temporarily, such as for planning involving that particular vehicle and/or vehicle type); using motion/movement of some or all of the vehicle to gather additional data about the vehicle's environment (e.g., about one or more possible or actual obstacles in the environment), including in some embodiments and situations to adjust position of a moveable component part of the vehicle (e.g., hydraulic arm, tool attachment, etc.) on which one or more sensors are mounted to enable gathering of the additional data, and/or to move a location of the vehicle to enable one or more sensors that are mounted at fixed and/or moveable positions to gather the additional data; performing obstacle removal activities for an obstacle that include a series of actions by one or more powered earth-moving vehicles, such as involving moving a large pile of dirt (e.g., requiring numerous scoops, pushes or other actions), flattening or otherwise leveling some or all of a path (e.g., digging through a hill or other projection of material, filling a hole or ravine or other cavity, etc.); etc.

The EMVAOC system may perform other automated operations in at least some embodiments, with non-exclusive examples including the following: tracking motion/movement of one or more obstacles (e.g., people, animals, vehicles, falling or sliding objects, etc.), including in response to instructions from the EMVAOC system for those obstacles to move themselves and/or to be moved; tracking objects on some or all of a job site as part of generating analytics information, such as using data from a single powered earth-moving vehicle on the site or by aggregating information from multiple such earth-moving vehicles, including information of a variety of types (e.g., about a number of vehicles of one or more types that are currently on the site or have passed through it during a designated period of time; about a number of people of one or more types, such as workers and/or visitors, that are currently on the site or have passed through it during a designated period of time; about activities of a particular vehicle and/or a particular person at a current time and/or during a designated period of time, such as vehicles and/or people that are early or late with respect to a defined time or schedule, identifying information about vehicles and/or people such as license plates or RFID transponder IDs or faces or gaits; about other types of site activities, such as material deliveries and/or pick-ups, task performance, etc.); etc.

The EMVAOC system may further perform additional automated operations in at least some embodiments as part of determining a motion/movement plan that includes powered earth-moving vehicle motion from a current location to one or more target destination locations, with non-exclusive examples including the following: having the powered earth-moving vehicle create a road (e.g., by flattening or otherwise smoothing dirt or other materials of the terrain between the locations) along a selected path as part of the motion/movement plan, including to optionally select that path from multiple alternative paths based at least in part on a goal involving creating such a road at such a location; considering environmental conditions (e.g., terrain that is muddy or otherwise slick/slippery due to water and/or other conditions), including in some embodiments and situations to adjust classifications of some or all obstacles in an area between the current and target destination locations to reflect those environmental conditions (e.g., temporarily, such as until the environmental conditions change); considering operating capabilities of that particular vehicle and/or of a type of that particular vehicle (e.g., tool attachments, size, load weight and/or material type limits or other restrictions, etc.), including in some embodiments and situations to adjust classifications of some or all obstacles in an area between the current and target destination locations to reflect those operating capabilities (e.g., temporarily, such as for planning involving that particular vehicle and/or vehicle type); using motion/movement of some or all of the vehicle to gather additional data about the vehicle's environment (e.g., about one or more possible or actual obstacles in the environment), including in some embodiments and situations to adjust position of a moveable component part of the vehicle (e.g., hydraulic arm, tool attachment, etc.) on which one or more sensors are mounted to enable gathering of the additional data, and/or to move a location of the vehicle to enable one or more sensors that are mounted at fixed and/or moveable positions to gather the additional data; performing obstacle removal activities for an obstacle that include a series of actions by one or more powered earth-moving vehicles, such as involving moving a large pile of dirt (e.g., requiring numerous scoops, pushes or other actions), flattening or otherwise leveling some or all of a path (e.g., digging through a hill or other projection of material, filling a hole or ravine or other cavity, etc.); etc.

The EMVAOC system may perform other automated operations in at least some embodiments, with non-exclusive examples including the following: tracking motion/movement of one or more obstacles (e.g., people, animals, vehicles, falling or sliding objects, etc.), including in response to instructions from the EMVAOC system for those obstacles to move themselves and/or to be moved; tracking objects on some or all of a job site as part of generating analytics information, such as using data from a single powered earth-moving vehicle on the site or by aggregating information from multiple such earth-moving vehicles, including information of a variety of types (e.g., about a number of vehicles of one or more types that are currently on the site or have passed through it during a designated period of time; about a number of people of one or more types, such as workers and/or visitors, that are currently on the site or have passed through it during a designated period of time; about activities of a particular vehicle and/or a particular person at a current time and/or during a designated period of time, such as vehicles and/or people that are early or late with respect to a defined time or schedule, identifying information about vehicles and/or people such as license plates or RFID transponder IDs or faces or gaits; about other types of site activities, such as material deliveries and/or pick-ups, task performance, etc.); etc.

Various details have been provided with respect to FIGS. 2A-2K, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data.

Figure 3A:
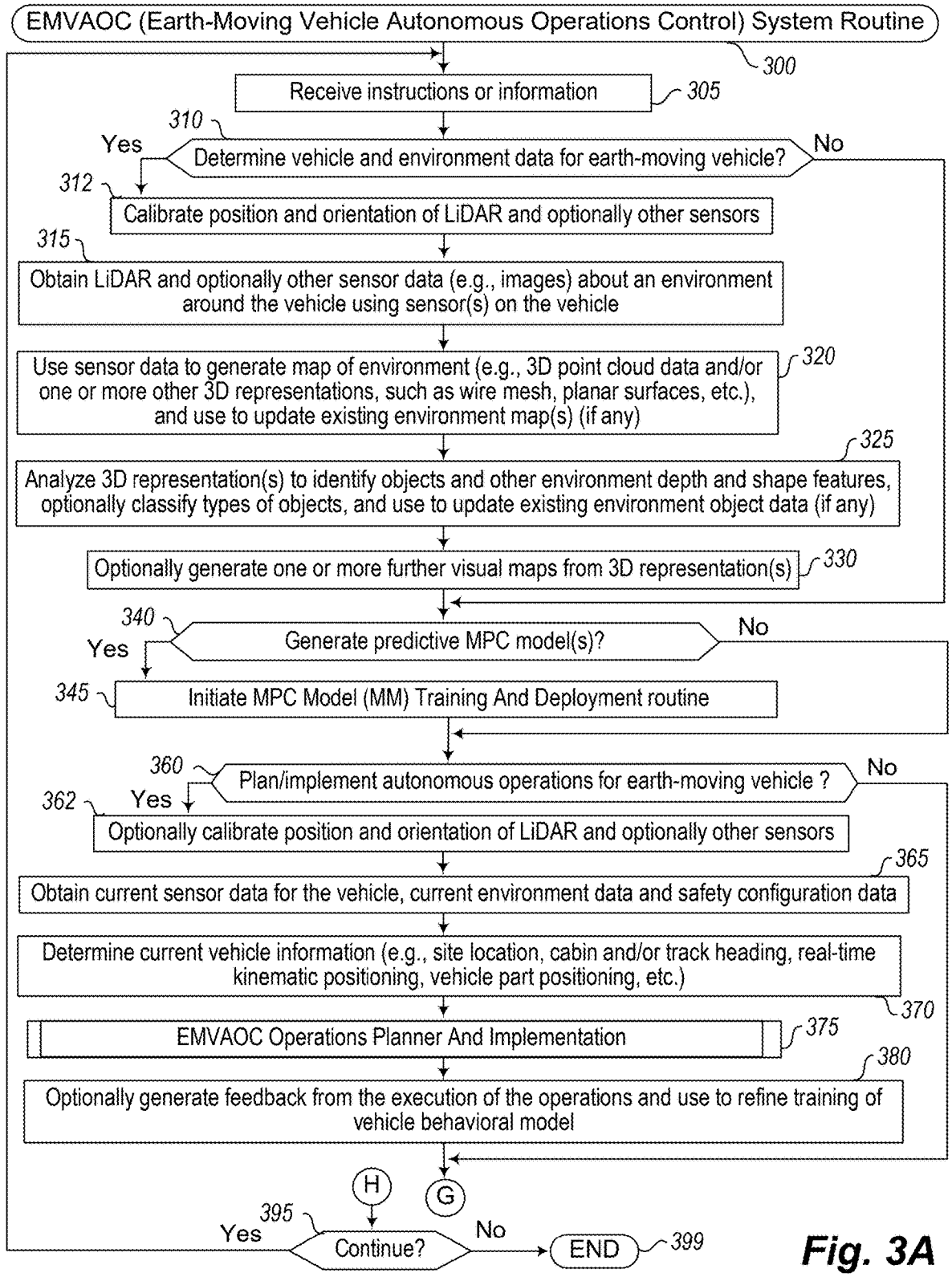
FIGS. 3A-3B are an example flow diagram of an illustrated embodiment of an Earth-Moving Vehicle Autonomous Operations Control (EMVAOC) System routine.
Figure 3B:
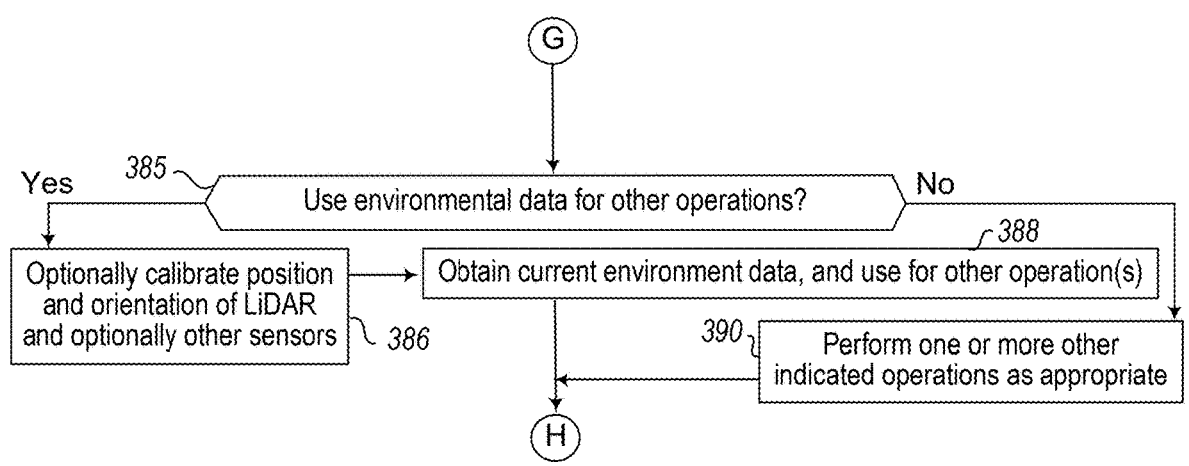

FIGS. 3A-3B are an example flow diagram of an illustrated embodiment of an EMVAOC (Earth-Moving Vehicle Autonomous Operations Control) System routine 300. The routine may be provided by, for example, execution of an embodiment of the EMVAOC system 140 of FIGS. 1A-1C and/or the EMVAOC system discussed with respect to FIGS. 2A-2K and elsewhere herein, such as to perform a computer-implemented method to provide automated operations for implementing autonomous control of powered earth-moving vehicles, including to automatically control movement of some or all of one or more powered earth-moving vehicles on a job site to use one or more trained predictive models (e.g., a trained MPC model specific to the vehicle) to perform tasks while conforming with specified safety rules or other specified safety configuration data. While routine 300 is discussed with respect to controlling operations of a single powered earth-moving vehicle at a time, it will be appreciated that the routine 300 may be performed in other manners in other embodiments, including to control operations of multiple powered earth-moving vehicles of one or more types on a job site, to be implemented by one or more configured devices or systems (optionally in multiple locations and/or operating in a distributed or otherwise coordinated manner, such as with a computing device local to a powered earth-moving vehicle performing some of the automated operations while one or more separate server systems in communication with that computing device perform additional portions of the routine), etc.

The routine 300 begins in block 305, where instructions or other information are received (e.g., waiting at block 305 until such instructions or other information is received). The routine continues to block 310 to determine whether the instructions or information received in block 305 indicate to currently determine environmental perception data for an earth-moving vehicle (e.g., using LiDAR sensors and/or image sensors and optionally other sensors located on the vehicle) and if so continues to perform blocks 312-330—in at least some embodiments, sensor data may be gathered repeatedly (e.g., continuously), and if so at least block 315 may be performed for each loop of the routine and/or repeatedly while the routine is performing other activities or otherwise waiting (e.g., at block 305) to perform other activities. In block 312, the routine in this example embodiment performs automated operations to calibrate the position and orientation of one or more sensors to be used to gather the environment data, such as for each of one or more LiDAR sensors and/or one or more image sensors (e.g., as part of one or more cameras) and/lor one or more infrared sensors—the calibration of each sensor may include determining a current position and orientation of the sensor relative to one or more points on the vehicle used as the basis for a global coordinate system relative to and extending from the point(s), or relative to one or more points on the vehicle having known location(s) in an absolute global coordinate system. As discussed in greater detail elsewhere herein, the calibration of each sensor may include obtaining multiple data sets from the sensor (e.g., 3D point clouds from a LIDAR sensor) with significant overlap from the same vehicle location but with small differences in orientation of the vehicle and/or of the sensor (e.g., by changing orientation of a movable vehicle part on which the sensor is located, by changing orientation of the vehicle chassis on which the sensor is located, etc.), analyzing pairs of datasets to determine parameters that maximize overlap between the datasets in the global coordinate system, and using an ICP (iterative closest point) algorithm to refine the parameters in order to determine a best match between data points in the pair of datasets. In block 315, the routine in this example embodiment then obtains LiDAR data and optionally other sensor data (e.g., one or more images) for an environment around the powered earth-moving vehicle using sensors positioned on the vehicle and optionally additional other sensors on or near the vehicle (e.g., for multiple powered earth-moving vehicles on a job site to share their respective environment data, whether in a peer-to-peer manner directly between two or more such vehicles, and/or by aggregating some or all such environment data in a common storage location accessible to some or all such vehicles), and with obtained data converted into a global coordinate system based in part on determined calibration data. In block 320, the routine then uses the sensor data to generate site map data, such as a 3D point cloud data and optionally one or more other 3D representations of the environment (e.g., using wire mesh, planar services, voxels, etc.), for example in the global coordinate system, and uses the generated 3D representation(s) to update other existing environment data (if any). As discussed in greater detail elsewhere herein, such sensor data may be gathered repeatedly (e.g., continuously), such as in a passive manner for whatever direction the sensor(s) on the vehicle are currently facing and/or in an active manner by directing the sensors to cover a particular area of the environment that is of interest (including moving component parts of the vehicle on which the sensors are mounted or otherwise attached to move the sensors to new positions from which additional data may be obtained), optionally with new calibration performed for each change in position of the sensor relative to the point(s) on the vehicle used for the global coordinate system (e.g., if mounted on a movable component part of the vehicle that has been moved), and environment information from different scans of the surrounding environment may be aggregated in the global coordinate system as data from new areas becomes available and/or to update previous data for an area that was previously scanned. In block 325, the routine then continues to analyze the 3D representation(s) to identify objects and other environment depth and shape features, to classify types of the objects as obstacles with respect to operations of the vehicle, and to update other existing information about such objects (if any), and in block 330 optionally generates one or more further visual maps from the 3D representation(s). As discussed in greater detail elsewhere herein, such obstacle data and other object data may be used in a variety of manners, including by a planner module to determine autonomous operations for the vehicle to perform.

Figure 4A:
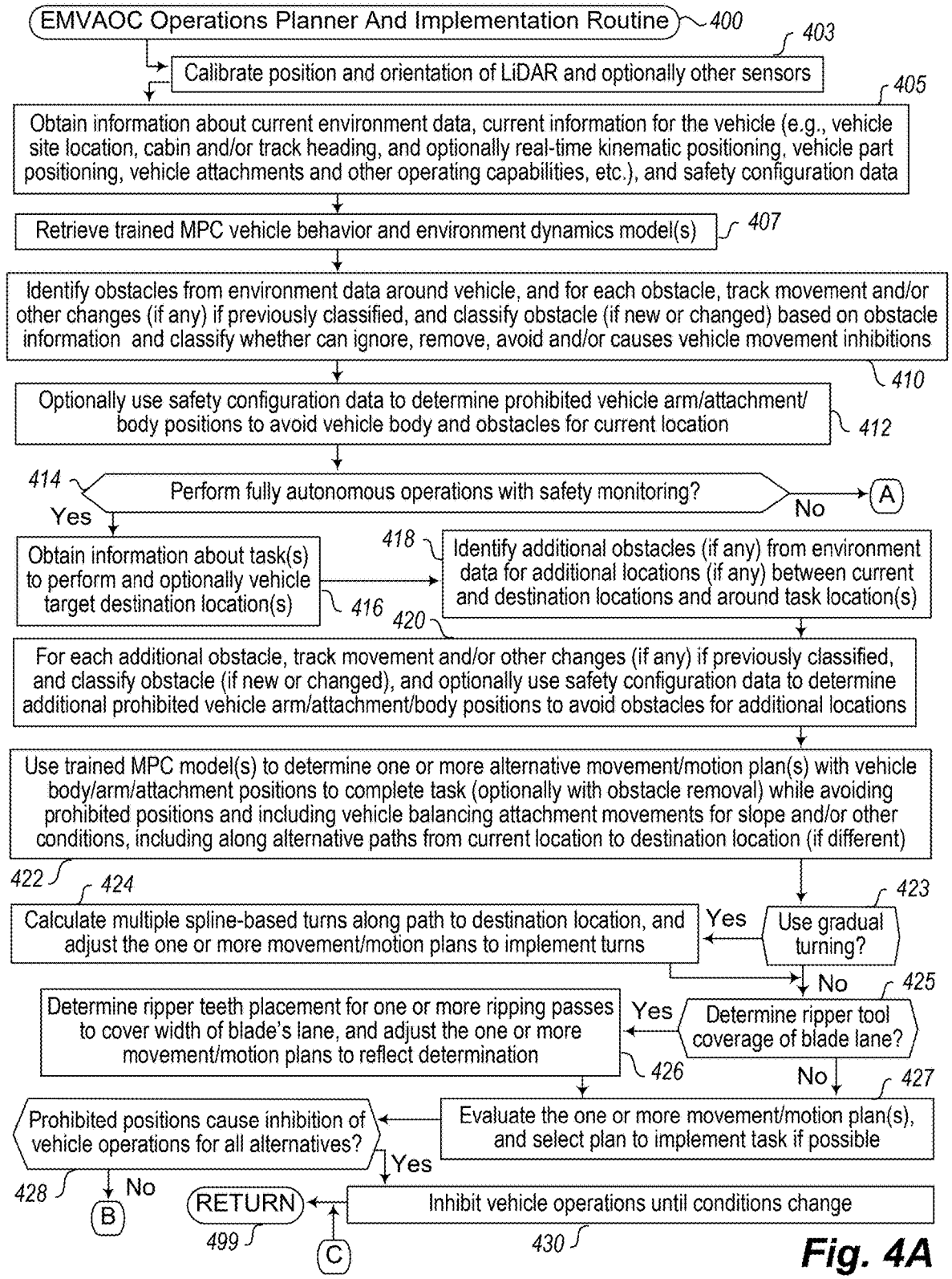
FIGS. 4A-4C are an example flow diagram of an illustrated embodiment of an EMVAOC Operations Planner And Implementation module routine.
Figure 4B:
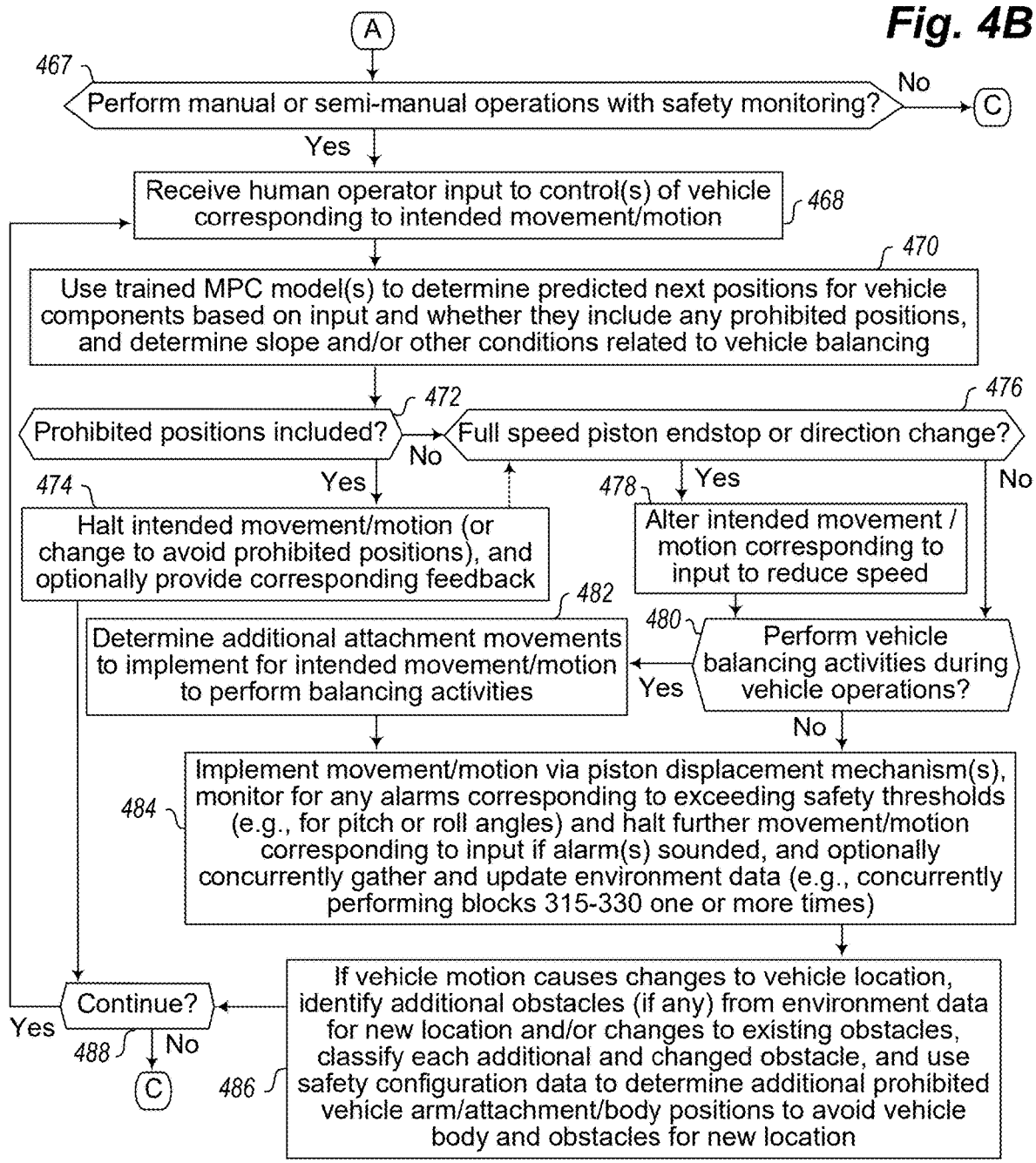
Figure 4C:
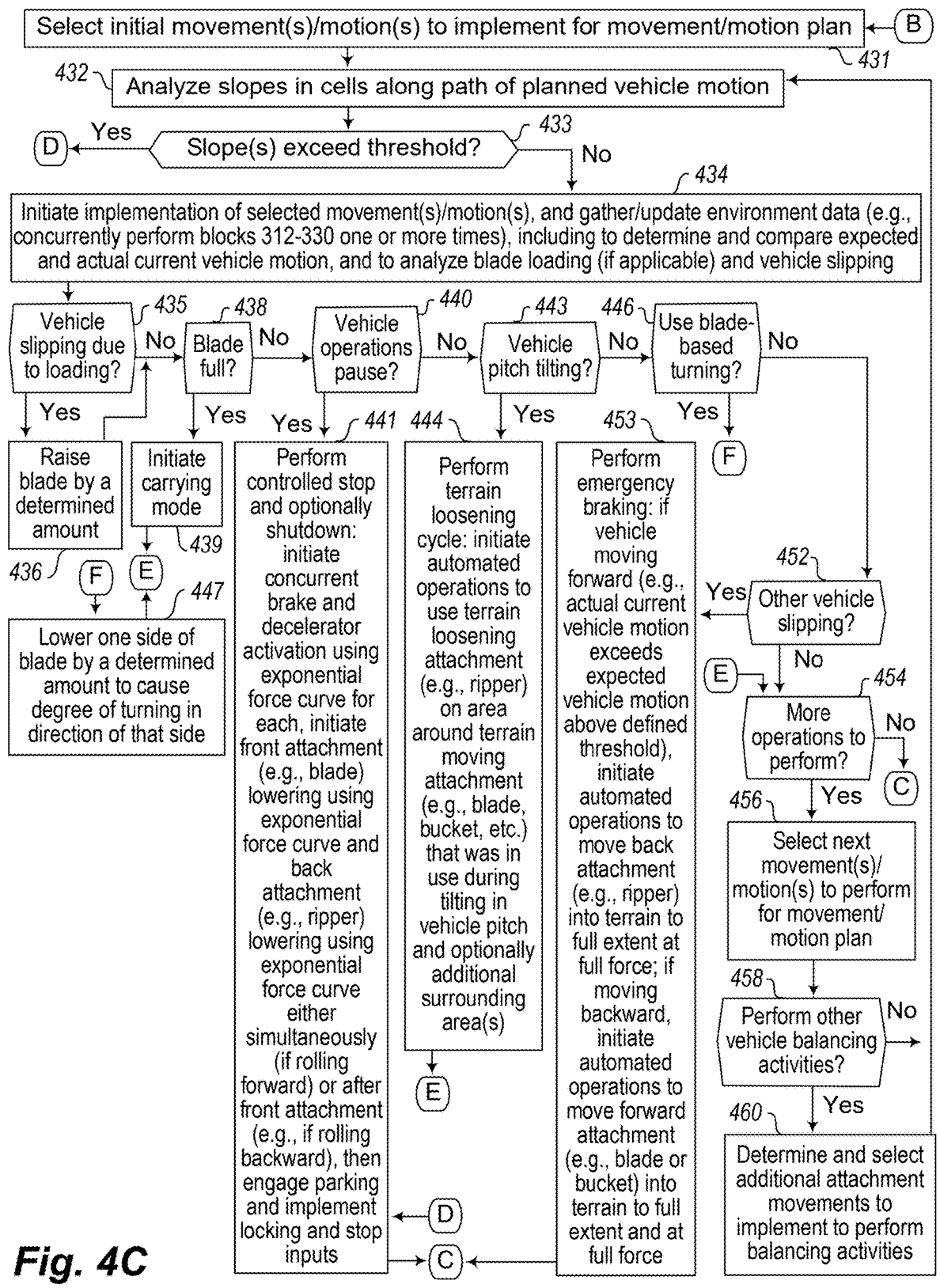
Figure 5:
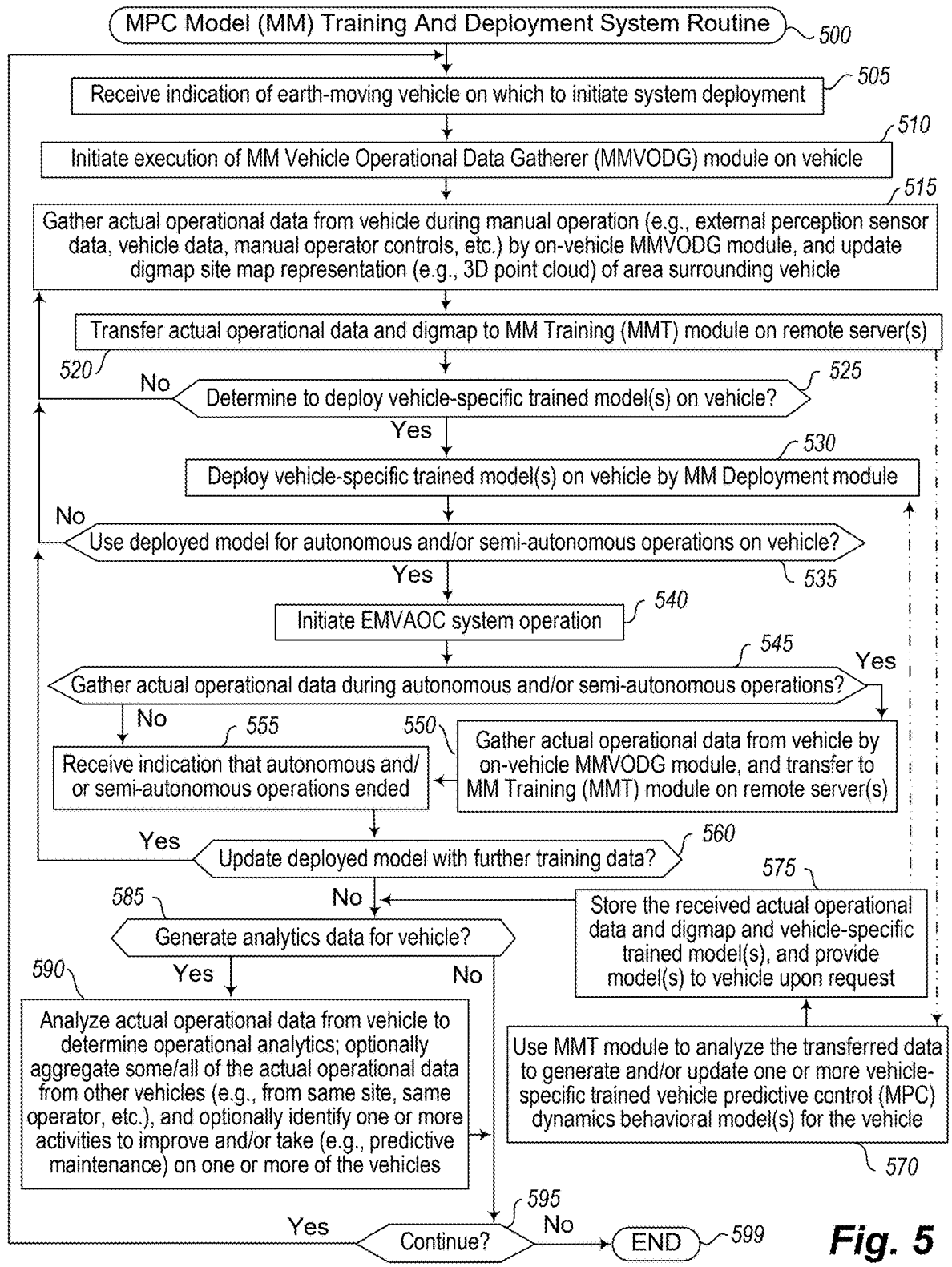
FIG. 5 is an example flow diagram of an illustrated embodiment of a Model Predictive Control (MPC) Model Training And Deployment System routine.

After block 330, or if it is instead determined in block 310 that the instructions or information received in block 305 do not indicate to currently determine environment data for an earth-moving vehicle, the routine 300 continues to block 340 to determine whether the instructions or other information received in block 310 indicate to generate one or more predictive models for the vehicle (e.g., one or more trained MPC models), and if so continues to block 345 to execute an MM Training And Deployment routine, with one example of such a routine illustrated with respect to FIG. 5. After block 345, or if it is instead determined in block 340 that the instructions or other information received in block 310 do not indicate to generate one or more predictive models for the vehicle, the routine continues to block 360 to determine whether the instructions or information received in block 305 indicate to plan and implement autonomous operations of one or more earth-moving vehicles involving vehicle motion and/or tool attachment movement of some or all of one or more powered earth-moving vehicles on a job site to conform with specified safety rules or otherwise satisfy specified criteria, such as while performing one or more tasks and/or multi-task jobs (e.g., to identify one or more target destination locations and optionally tasks to be performed as part of vehicle motion to reach the target destination location(s), such as to create roads along particular paths and/or to remove particular obstacles), and including using environment data for the vehicle (e.g., data just determined in blocks 312-330), and if so continues to perform blocks 362-380 to perform the autonomous operations control. In block 362, the routine optionally performs automated operations to calibrate the position and orientation of one or more sensors to be used to gather the environment data, such as in a manner similar to block 312, and to be performed if the position of the sensor relative to the point(s) on the vehicle used for the global coordinate system has changed since a last calibration (e.g., since block 312 and/or 362 was previously performed) or if a previous calibration was not performed. In block 365, the routine obtains current status information for the earth-moving vehicle(s) (e.g., sensor data for the earth-moving vehicle(s)), current environment data for the vehicle(s), and safety configuration data and/or other specified criteria to use (e.g., as received in block 305, as retrieved from storage, etc.), and with obtained data converted into a global coordinate system based in part on determined calibration data. After block 365, the routine continues to block 370, where it determines information about the earth-moving vehicle (e.g., one or more of the earth-moving vehicle's on-site location, real-time kinematic positioning, cabin and/or track heading, positioning of other component parts of the earth-moving vehicle such as the arm(s)/bucket, particular tool attachments and/or other operational capabilities of the vehicle, etc.). In block 375, the routine then submits input information to an EMVAOC Operations Planner And Implementation subroutine to determine one or more movement/motion plans to be implemented in light of the safety configuration data and/or other specified criteria and optionally one or more tasks and/or jobs to perform, and to implement the movement/motion plan operations by the earth-moving vehicle(s) to perform the one or more tasks-one example of such a subroutine is discussed in greater detail with respect to FIGS. 4A-4C. After block 375, the routine in block 380 optionally generates feedback from the execution of the operations for use in subsequent refinement of the earth-moving vehicle behavioral model's training.

After block 380, or if it is instead determined in block 360 that the information or instructions received in block 305 are not to plan and implement automated operations of earth-moving vehicle(s), the routine continues to block 385 to determine if the information or instructions received in block 305 are to use environment data for other purposes (e.g., for environment data just generated in blocks 312-330), and if so the routine continues to block 386. In block 386, the routine optionally performs automated operations to calibrate the position and orientation of one or more sensors to be used to gather the environment data, such as in a manner similar to blocks 312 and/or 362, and to be performed if the position of the sensor relative to the point(s) on the vehicle used for the global coordinate system has changed since a last calibration (e.g., since block 312 and/or 362 and/or 386 was previously performed) or if a previous calibration was not performed. In block 388, the routine then obtains current environment data, with obtained data converted into a global coordinate system based in part on determined calibration data, and uses the environment data to perform one or more additional types of automated operations-non-exclusive examples of such additional types of automated operations include the following: tracking movement of one or more obstacles (e.g., people, animals, vehicles, falling or sliding objects, etc.), including in response to instructions issued by the EMVAOC system for those obstacles to move themselves and/or to be moved; generating analytics information, such as tracking objects on some or all of a job site using data only from the earth-moving vehicle or by aggregating information from data from the earth-moving vehicle with data from one or more other earth-moving vehicles (e.g., about locations and/or activities of one or more other vehicles and/or people); etc.

If it is instead determined in block 385 that the information or instructions received in block 305 are not to use environment data for other purposes, the routine continues instead to block 390 to perform one or more other indicated operations as appropriate, such as if so indicated in the instructions or other information received in block 305. For example, the operations performed with respect to block 390 may include receiving and storing data and other information for subsequent use (e.g., safety configuration data, including thresholds and other settings to use; other specified criteria to be satisfied during automated operations of the EMVAOC system; actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVAOC system (e.g., for use in a displayed GUI to an operator user that is assisting in activities at the job site and/or to an end user who is monitoring activities), receiving and storing instructions or other information provided by one or more users and optionally initiating corresponding activities, etc. While not illustrated here, in some embodiments the routine may perform further interactions with a client or other end user, such as before, during or after receiving or providing information in block 390, as discussed in greater detail elsewhere herein. In addition, it will be appreciated that the routine may perform operations in a synchronous and/or asynchronous manner.

After blocks 388 or 390, the routine continues to block 395 to determine whether to continue, such as until an explicit indication to terminate is received, or instead only if an explicit indication to continue is received. If it is determined to continue, the routine returns to block 305 to wait for additional information and/or instructions, and otherwise continues to block 399 and ends.

FIGS. 4A-4C are an example flow diagram of an illustrated embodiment of an EMVAOC (Earth-Moving Vehicle Autonomous Operations Control) Operations Planner And Implementation routine 400. The routine may be provided by, for example, execution of an embodiment of modules 147 and/or 144 and/or 146e and/or 146f and/or 146g and/or 146h and/or 146i of the EMVAOC system 140 of FIGS. 1A-1C and/or the EMVAOC system discussed with respect to FIGS. 2A-2K and elsewhere herein, such as to perform a computer-implemented method to provide automated operations related to determining tasks to perform and determining additional operations to implement as part of such task performance if specified criteria occur (e.g., related to controlling vehicle steering using a blade tool attachment), including analyzing information about an environment of a powered earth-moving vehicle and determining corresponding information (e.g., slopes and other non-level surfaces, potential obstacles, classifications of the types of the obstacles, etc.), and determining how to accomplish a goal that includes controlling vehicle motion and/or tool attachment movement of one or more powered earth-moving vehicles on a job site (e.g., optionally including moving a powered earth-moving vehicle from its current location to a determined target destination location, and handling any possible obstacles between the current and destination locations) in accordance with specified safety rules or other specified criteria (e.g., to avoid prohibited 3D positions, to reduce or eliminate vehicle slippage and tilting, etc.). The routine 400 may be invoked in various manners, including in block 375 of the EMVAOC System routine 300 as discussed in FIGS. 3A-3B, and if so may return to that invocation location after the routine returns. While routine 400 is discussed with respect to controlling operations of a single powered earth-moving vehicle at a time, it will be appreciated that the routine 400 may be performed in other manners in other embodiments, including to control operations of multiple powered earth-moving vehicles of the same type and/or multiple types on a job site, to be implemented by one or more configured devices or systems (optionally in multiple locations and/or operating in a distributed or otherwise coordinated manner, such as with a computing device local to a powered earth-moving vehicle performing some of the automated operations while one or more separate server systems in communication with that computing device perform additional portions of the routine), to separate the operations related to object determination and classification from those related to motion and movement planning (e.g., to be executed at different times), etc.

The routine begins in block 403, where it optionally performs automated operations to calibrate the position and orientation of one or more sensors to be used to gather the environment data, such as in a manner similar to blocks 312 and/or 362 and/or 386 of FIGS. 3A-3B, and to be performed if the position of the sensor relative to the point(s) on the vehicle used for the global coordinate system has changed since a last calibration or if a previous calibration was not performed. In block 405, the routine then obtains information that includes current information about a powered earth-moving vehicle (e.g., vehicle location and positioning for various component parts of the vehicle, operating capabilities for the vehicle, etc.), current environment data for an area around the vehicle, and specified criteria to be used (e.g., information about operations related to controlling vehicle steering using a blade tool attachment), and with obtained data converted into a global coordinate system based in part on determined calibration data. After block 405, the routine continues to block 407, where it uses the environment data to identify obstacles around the vehicle, and in block 410, classifies each obstacle as to its type, including to optionally track movement and/or other changes for previously identified obstacles and to reclassify them if needed—such operations for each object may include, for example, classifying the obstacle (if new or changed) based on obstacle information (e.g., size, shape, distance to vehicle, material type, surface conditions, etc.), and classifying whether it can be ignored, removed, avoided and/or causes vehicle movement inhibitions, such as to inhibit vehicle movement if it cannot be removed or avoided within specified safety parameters (e.g., if a heat signature and/or movement indicates a person, animal or vehicle), can be moveable if it fits within a tool attachment or otherwise satisfies defined limits for vehicle's operating capabilities, can be avoidable if it is not moveable but does not inhibit movement or otherwise exceed defined size or other safety criteria (e.g., is a structure, vehicle, etc.), and can be ignored if it satisfies criteria with respect to material type and size and surface conditions (e.g., slope and stickiness/slipperiness of non-level surfaces). In other embodiments and situations, the routine 400 may instead use obstacle-related information generated in block 325 of FIGS. 3A-3B to supplement or replace some or all of the operations of blocks 407 and/or 410. In block 412, the routine then optionally uses specified safety configuration data and optionally other specified criteria to determine prohibited 3D positions corresponding to the obstacles around the vehicle and to the vehicle component parts through which other component parts of the vehicle are not allowed to move, including slopes or other areas that the vehicle is not allowed to transit (e.g., slopes steeper than a defined threshold). In other embodiments, rather than identifying and using prohibited 3D positions based on obstacles and/or parts of the vehicle, some or all such positions may instead be restricted in one or more other manners, such as to include a buffer area around some or all obstacles that is to be used only if alternative movement/motion plans without such restrictive positions are not available, and/or to be used only in certain manners (e.g. at a reduced speed or in other manners to prevent damage to the vehicle and/or the obstacle).

After block 412, the routine continues to block 414, where it determines whether to implement monitoring operations during fully autonomous operations, and if not proceeds to block 467. If it is determined to implement monitoring for fully autonomous operations, the routine continues to block 416, where it obtains information about one or more tasks to be performed, optionally along with one or more target destination locations and/or orientations/directions different from a current location and orientation/direction of the vehicle, and with the task(s) to be performed at the current originating location and/or at the target destination location(s) and/or at one or more intermediate locations between the originating and destination locations. In block 418, the routine then identifies additional obstacles (if any) at the destination location(s) and at one or more additional locations (if any) between the vehicle's current location and the target destination location(s), and in block 420, classifies each additional obstacle along that movement path in a manner similar to that of block 410, and optionally determines additional prohibited 3D positions for the vehicle (e.g., for one or more hydraulic arms, one or more tool attachments, the chassis, wheels and/or tracks, and other parts of the vehicle body) in accordance with the specified safety configuration data. After block 420, the routine continues to block 422 to determine one or more alternative movement/motion plans for the vehicle's tool attachment(s) movements and optionally vehicle motion to complete the task(s) while avoiding any prohibited 3D positions, including with vehicle motion along one or more alternative paths from the current location to the target destination location (if different from the current location), and optionally including associated obstacle removal activities in order to complete the task(s). In block 423, the routine then determines whether to use gradual vehicle turning for movement/motion plans that include motion between originating and destination locations and/or that include vehicle orientation (direction) changes (e.g., for tracked vehicles), and if not proceeds to block 425. Otherwise, the routine continues to block 424 to calculate multiple spline-based gradual turns along each path for the alternative movement/motion plan(s) in accordance with specified turn-related configuration data (e.g., to balance an amount of time used as the number of turns increases with an amount of track wear that occurs as the number of turns decreases, and/or to balance the number of turns with the length or amount of each turn, such as based on vehicle type and/or preferences) and to adjust the alternative movement/motion plan(s) to reflect the gradual turns, before proceeding to block 425—in some embodiments and situations, some or all of the gradual turns are performed while the vehicle is in motion (whether forward or backward), and in other embodiments and situations some or all of the gradual turns are performed while the vehicle's motion forward and backward is stopped. In other embodiments, such gradual turning may be always used or never used, or always or never used based on vehicle type (e.g., used for specified or all tracked vehicle types).

In block 425, the routine then determines whether the task(s) to be performed include using a ripper tool attachment to loosen ground material before subsequent use of one or more other tool attachments to move or otherwise manipulate the loosened ground material, and if so proceeds to block 425 to determine placement for the one or more ripper teeth of the ripper tool attachment to use in one or more passes of the ripper tool attachment in order to cover the width of a lane used by the one or more other tool attachments (e.g., the width of a blade tool attachment to be used in pushing/cutting/loading the loosened ground material), and to adjust the one or more alternative movement/motion plans to reflect the determination. After block 426, or if it was determined in block 425 not to determine ripper tool coverage (e.g., if the task(s) do not include use of a ripper tool attachment), the routine in block 427 then scores or otherwise evaluates some or all of the alternative movement/motion plans with respect to one or more evaluation criteria (e.g., distance traveled; time involved; a safety score or other degree of safe operation, such as based at least in part on the obstacles and obstacle classifications; amount of tread wear and/or other measure of vehicle usage; fuel level and/or battery charge; etc.), and selects one of the movement/motion plans (e.g., a 'best' plan with respect to the evaluation criteria, such as having the highest or lowest score or other evaluation) to implement in order to perform the task(s) (along a selected vehicle motion path to the destination location if different from the originating location). In block 428, the routine then determines if there are prohibited 3D positions that cause vehicle operations to be halted or otherwise inhibited for all alternative movement/motion plans (e.g., if a plan could not be selected to avoid the prohibited 3D positions), and if so continues to block 430 to determine to initiate a halt or other inhibition (e.g., slow down) to vehicle operations until the conditions change (while optionally proceeding to perform one or more other tasks if possible), and otherwise continues to block 431.

In block 431, the routine then selects initial vehicle motion(s) and/or attachment movement(s) to implement, and in block 432 analyzes information about slopes in defined cells along a path (if any) of planned vehicle motion for the selected vehicle motion(s) and/or attachment movement(s). If it is determined in block 433 that a defined quantity of the slopes (e.g., one or more) along such a path exceed a defined threshold, the routine continues to block 441, and otherwise continues to block 434. In block 434, the routine then initiates an implementation of the selected motion(s) and/or movement(s), including to gather and update data about the vehicle and the environment during the implementation of the selected motion(s) and/or movement(s), such as by performing operations corresponding to some or all of blocks 312-330 of FIGS. 3A-3B, including calibrating one or more sensors to be used in gathering data about the vehicle and environment-initial vehicle motion(s) and/or attachment movement(s) that are selected may correspond to an amount of time (e.g., 1 second, 5 seconds, 1 minute, etc.), some or all of a subtask (e.g., a movement of a hydraulic arm, a movement of one or more wheels or tracks, etc.), etc.

The routine then proceeds to perform blocks 435-460 as part of further monitoring during the implementation of the selected movement/motion plan. In particular, in block 435 the routine determines whether the vehicle is estimated to be experiencing slipping due to loading of a blade tool attachment (e.g., based on monitoring as performed in block 434 and/or in an ongoing manner), and if so proceeds to block 436 to raise the blade tool by a determined amount to reduce friction caused by the material being moved by the blade tool—as discussed in greater detail elsewhere herein, the determination of whether the vehicle is estimated to be experiencing slipping may be based at least in part on output of a trained machine learning model that takes as input various parameters about performance of the vehicle and optionally additional input data about the blade tool attachment and its loading. After block 436, or if it is instead determined in block 435 that the vehicle is not estimated to be slipping due to loading of the blade tool attachment, the routine continues to block 438 to determine if a blade tool attachment is estimated to be full (or to otherwise have loading above a defined threshold) during pushing/cutting/loading operations of a pushing/cutting/loading mode, and if so continues to block 439 to initiate a switch to a carrying mode that includes lifting the blade tool attachment about the surface of the terrain and materials that were being pushed/cut/loaded—as discussed in greater detail elsewhere herein, the determination of whether the blade tool is estimated to be full may be based at least in part on output of a trained machine learning model that takes as input various parameters about performance of the vehicle and optionally additional input data about the blade tool attachment and its loading. After block 439, routine continues to block 454.

If it is instead determined in block 438 that a blade tool attachment is not estimated to be full, the routine continues instead to block 440 to determine whether to pause vehicle operations and perform a controlled stop to vehicle operations and optional subsequent vehicle shutdown-such a pause in vehicle operations may be included as part of the movement/motion plan being implemented, and/or may be determined based on current conditions (e.g., an instruction received from a human operator, if the vehicle is nearly out of fuel or is overheating or another fault occurs, if continued operations would interfere with another vehicle and/or person, or if one or more other specified pause criteria are satisfied). If so, the routine continues to block 441 to perform the controlled stop to vehicle operations and optional subsequent vehicle shutdown, such as by initiating concurrent brake and decelerator activation (e.g., using a separate exponential force curve for each), subsequently initiating (e.g., at a specified time during or after the brake and decelerator activation) lowering of the front attachment (e.g., a blade or bucket) into the terrain (e.g., using an exponential force curve), and initiating lowering of the back attachment (e.g., a ripper) into the terrain (e.g., using an exponential force curve) either simultaneously with the front attachment (e.g., if the vehicle is rolling forward) or after the front attachment lowering has begun and optionally has completed (e.g., if the vehicle is rolling backward). After the vehicle is stationary and the vehicle tool attachment(s) movements have stopped, the operations then include engaging the vehicle parking, and optionally then performing locking activities and/or stopping inputs to the vehicle controls. After block 441, the routine continues to block 499 and returns.

If it is instead determined in block 440 not to pause vehicle operations, the routine continues to block 443 to determine whether the vehicle pitch has unplanned tilting relative to the terrain slope and/or tool attachments in use, such as if the front of the tracks or front wheels are lifting off the terrain due to use of the front tool attachment (e.g., using a blade or bucket or ripper to push through terrain or other otherwise push materials), or if the back of the tracks or back wheels are lifting off the terrain due to use of the back tool attachment (e.g., using a blade or bucket or ripper to push through terrain or other otherwise push materials). If so, the routine continues to block 444 to perform a terrain loosening cycle, such as by using one or more tool attachments (e.g., a ripper) to perform terrain loosening by breaking up or tearing through or otherwise loosening the terrain in an area that includes where the front or back tool attachments were working when the vehicle pitch tilting occurred, and optionally around additional areas (e.g., around some or all of the current location of the vehicle). After block 444, the routine continues to block 454. If it is instead determined in block 443 that the vehicle is not having unplanned tilting, the routine continues to block 446 to determine whether to use a blade tool attachment to assist in vehicle turning or other steering (e.g., during forward vehicle motion with the blade tool attachment in use for material pushing/cutting/loading), such as if use of the tracks and/or wheels of the vehicle are not sufficiently maintaining the vehicle motion along a desired path, and if so continues to block 447 to determine a direction in which to correct the vehicle motion to return toward the desired path and to lower the blade tool attachment on the side of the determined direction (and/or to raise the blade tool attachment on the opposite side) while continuing the forward motion—in at least some embodiments and situations, the blade tool side lowering and/or raising may be performed in small increments with associated monitoring (e.g., after each increment, continuously or substantially continuously, etc.) to determine an aggregate effect of the one or more lowering and/or raising increments, such as to continue until a desired direction is reached or vehicle's path is otherwise corrected. After block 447, the routine continues to block 454.

If it is instead determined in block 446 to not use blade-based steering to fully perform or partially assist in vehicle turning, the routine continues instead to block 452 to determine whether the vehicle and/or environment data gathered in block 434 indicates that the vehicle is slipping for one or more other reasons (e.g., due to a sloped and/or slick surface), and if so proceeds to block 453 to initiate corrective slippage-related activities, such as to perform automated emergency braking operations. The emergency braking operations may include determining whether the vehicle is slipping forwards or backwards, and using different vehicle tool attachments accordingly if the vehicle has both one or more front tool attachments (e.g., a bucket or blade) and one or more rear tool attachments (e.g., a ripper with one or more teeth)—if the vehicle has a mid-vehicle tool attachment (e.g., a main blade on a grader), it may be used as a front tool attachment if the vehicle has a back tool attachment but no other front tool attachment, as a back tool attachment if the vehicle has a front tool attachment but no other back tool attachment, or as neither or both if the vehicle has other front and back tool attachments (e.g., a grader vehicle). After block 453, the routine continues to block 499 and returns.

If it is instead determined in block 452 that the vehicle is not slipping for other reasons such as due to a sloped and/or slick surface, or after blocks 439 or 444 or 447, the routine continues to block 454 to determine whether there are more operations to perform for the movement/motion plan, and if not continues to block 499 and returns. Otherwise, the routine continues to block 456 to select next movement(s) and/or motion(s) to perform for the movement/motion plan, and in block 458 the routine then determines whether to perform other vehicle balancing-related activities during vehicle operations for the movement/motion plan, such as based at least in part on the determined slope and/or other determined conditions related to vehicle balancing, and if so continues to block 460 to determine additional attachment movements and/or other changes to implement for the selected movement/motion plan to perform the balancing activities. After block 460, or if it is instead determined in block 458 to not perform vehicle balancing activities, the routine returns to block 432 to analyze the slopes in defined cells corresponding to the selected vehicle motion, if any, before proceeding to implement any such vehicle motion(s) and/or attachment movement(s) along with any determined vehicle balancing activities in block 434 if not determined in block 433 that the slope(s) exceed a defined threshold.

If it is instead determined in block 414 to not implement monitoring as part of fully autonomous operations, the routine continues instead to block 467 to determine whether to instead implement monitoring operations in a semi-autonomous manner that is based in part on input from at least one human operator, and if not proceeds to block 499—in other embodiments and situations, only one of the two types of safety monitoring operations may be performed. If it is instead determined to implement safety monitoring operations in a semi-autonomous manner, the routine proceeds to block 468 to wait for and receive human operator input to one or more controls of the vehicle corresponding to intended vehicle motion and/or attachment movement. In block 470, the routine then determines predicted next positions for the vehicle components/parts based on the input (e.g., in a real-time or near-real-time manner, such as within microseconds or milliseconds or centiseconds or deciseconds or seconds), as well as whether any of the predicted next positions involve any prohibited 3D positions. If it is determined in block 472 that one or more prohibited 3D positions will be included (including any slopes exceeding a defined threshold), the routine continues to block 474 to halt the intended movement/motion corresponding to the input and optionally provide corresponding feedback to the human operator, and then proceeds to block 488—in other embodiments and situations, rather than halting the intended movement/motion, the routine may instead determine an alternative movement/motion to implement that avoids the prohibited 3D positions while reaching the same destination or otherwise achieving the same result as much as possible, and if so may instead change the movement/motion to that alternative movement/motion and proceed to block 476, or instead may alert a human operator that the human operator input to one or more controls of the vehicle will include one or more prohibited 3D positions to enable the human operator to modify the input to the controls accordingly. If it is instead determined in block 472 that the intended movement/motion does not include any prohibited 3D positions (or an alternative movement/motion is determined in block 474), the routine continues instead to block 476 to determine whether the intended movement/motion involves moving a piston for a piston displacement mechanism to its endstop position at full speed (and optionally in some embodiments making an abrupt change from full speed movement of a movable vehicle part in one direction to a substantially opposite direction), and if so continues to block 478 to automatically alter the intended movement/motion to reduce the speed as the endstop position (or position of other abrupt change) is reached, although in some embodiments such checking may not be performed or may be overridden (e.g., if an operator user wants to shake material out of a bucket or other tool attachment)—in other embodiments and situations, rather than automatically reducing the speed, the routine may instead alert a human operator that the human operator input to one or more controls of the vehicle involves moving a piston for a piston displacement mechanism to its endstop position at full speed or to full-speed changing of direction of one or more arms and/or tool attachments to enable the human operator to modify the input to the controls accordingly if appropriate. If it is instead determined in block 476 that the intended movement/motion does not involve reaching a piston endstop position (or direction change location) at full speed, or after block 478, the routine continues instead to block 480 to determine whether to perform vehicle balancing activities during vehicle operations for the movement/motion, such as based at least in part on the determined slope and/or other determined conditions related to vehicle balancing, and if so continues to block 482 to determine additional attachment movements and/or other changes to implement for the movement/motion to perform the balancing activities. After block 482, or if it is instead determined in block 480 to not perform vehicle balancing activities (e.g., due to the vehicle motion not involving any slopes above a defined minimum threshold or otherwise associated with balancing), the routine continues to block 484, where it implements the movement/motion corresponding to the input (and as optionally modified in blocks 474 and/or 478 and/or 482) using one or more piston displacement mechanisms, monitors for any alarms corresponding to exceeding safety thresholds during the movement (e.g., based on pitch and/or roll angles exceeding defined thresholds, such as corresponding to unplanned vehicle pitch tilting and/or yaw tilting and/or roll tilting; based on unplanned slippage on a sloped and/or slick surface; based on conditions to cause controlled stoppage of the vehicle, etc.), and halts further movement (or otherwise takes corrective action) if one or more such alarms are sounded—in at least some embodiments and situations, the performance of block 484 may further include gathering and updating additional environment data that is used during the implementing of the movement (e.g., by concurrently performing some or all of blocks 312-330 one or more times, including optional automated calibration of one or more sensors to be used for gathering data about the environment and/or vehicle). During and/or after block 484, the routine in block 486 performs further operations to, if vehicle motion causes changes to the vehicle location, further identify additional obstacles (if any) from the environment data for additional locations of the vehicle as it moves and to classify the additional obstacles in a manner similar to that for blocks 410 and 420, and to use specified safety configuration data to determine additional prohibited 3D positions corresponding to the additional obstacles, such as for use during the vehicle motion and/or for additional operations at a final destination of the motion based on next inputs received from a human operator. While not illustrated here, in some embodiments the routine may further take additional fully automated actions after receiving input from a human operator user (whether to change the intended movement/motion corresponding to the input and/or to perform additional tasks after the movement/motion), and/or may further take additional fully automated actions that include providing results of determinations to the human operator to prompt possible changes in future input from the human operator user, such as in a manner similar to that discussed with respect to the fully autonomous operations in blocks 416-460, including related to a response to a determination to use blade-based steering to fully perform or partially assist in vehicle turning in a manner similar to blocks 446-447. After blocks 474 or 486, the routine continues to block 488 to determine whether to continue with the semi-autonomous monitoring operations (e.g., until the human operator provides input to indicate that the semi-autonomous monitoring operations are done), and if so returns to block 468 to wait for additional human input. Otherwise, the routine returns at block 499.

FIG. 5 is an example flow diagram of an illustrated embodiment of a Model Predictive Control (MPC) Model Training And Deployment System routine 500. The routine may be provided by, for example, execution of an embodiment of modules 161-163 of FIGS. 1A-1C and/or as discussed with respect to FIGS. 2I-2K and elsewhere herein, such as to perform a computer-implemented method to provide automated operations related to implementing a cycle of training and deployment of a predictive model to control autonomous operations of an earth-moving vehicle. The routine 500 may be invoked in various manners, including in block 345 of the EMVAOC System routine 300 as discussed in FIGS. 3A-3B, and if so may return to that invocation location after the routine returns. While routine 500 is discussed with respect to operations of a single powered earth-moving vehicle at a time, it will be appreciated that the routine 500 may be performed in other manners in other embodiments, including to implement cycles of training and deployment of predictive models for multiple powered earth-moving vehicles of the same type and/or multiple types on one or more job sites, whether consecutively and/or concurrently, as well as to be implemented by one or more configured devices and/or computing systems (optionally in multiple locations and/or operating in a distributed or otherwise coordinated manner, such as with a computing device local to a powered earth-moving vehicle performing some of the automated operations while one or more separate server computing systems in communication with that computing device perform additional portions of the routine), etc.

The routine begins at block 505, where it receives an indication of an earth-moving vehicle on which to initiate system deployment. In block 510, the routine then initiates execution of an MM Vehicle Operational Data Gatherer module on the indicated vehicle (e.g., executing on a computing device on the vehicle), which then in block 515 gathers actual operational data from the vehicle during manual control (e.g., external perception sensor data, vehicle status and movement/motion data, manual operator control input data, etc.), and updates a digmap site map representation (e.g., a 3D point cloud) of an area surrounding the vehicle. In block 520, the routine then transfers the actual operational data and the digmap site map to the MM Training module, which in this example embodiment is executing on one or more separate server computing systems. After block 520, the routine continues to block 525 to determine whether to deploy one or more vehicle-specific trained MPC models on the vehicle, such as after multiple cycles of data gathering and model training, and if not returns to block 515 to continue the cycles of data gathering and model training. If it is instead determined in block 525 to deploy the trained MPC model(s), the routine continues to block 530 to deploy a current copy of at least one vehicle-specific trained MPC model to the vehicle, and in block 535 determines whether or not to initiate use of the deployed model(s) for performing fully autonomous and/or semi-autonomous operations on the vehicle. If the one or more deployed models are not currently to be used for fully autonomous and/or semi-autonomous operations on the vehicle, the routine returns to block 515 to continue the cycles of data gathering and model training, as well as to optionally later deploy a further updated copy of at least one vehicle-specific trained MPC model to the vehicle before the fully autonomous and/or semi-autonomous operations on the vehicle begin. Otherwise, the routine continues to block 540 to initiate execution of the EMVAOC system to perform the autonomous operations on the vehicle using at least one deployed copy of a vehicle-specific trained MPC model, and with one example of such an EMVAOC system routine being illustrated with respect to FIGS. 3A-3B.

After block 540 (e.g., while the EMVAOC system is executing on the vehicle to perform autonomous operations), the routine continues to block 545 to determine whether to gather further actual operational data during fully autonomous and/or semi-autonomous operations on the vehicle, and if so continues to block 550 to gather such actual operational data using the MM Vehicle Operational Data Gatherer module, and to further transfer the gathered data to the MM Training module for further analysis. After block 550, or if it is instead determined in block 545 not to gather the further actual operational data, the routine continues to block 555, where it receives an indication that the fully autonomous and/or semi-autonomous operations are to be ended (e.g., temporarily). In block 560, the routine then determines whether to update the currently deployed MPC model(s) on the vehicle with further training data gathered during future manual control of the vehicle, and if so returns to block 515 to continue the cycles of data gathering and model training. Otherwise, or after block 575, the routine continues to block 585 to determine whether to generate analytics data using actual operational data from the vehicle, and if so continues to block 590 to analyze the actual operational data from the vehicle to determine operational analytics of one or more types. In addition, the routine in block 590 may further aggregate some or all of the actual operational data from the vehicle with corresponding actual operational data from other vehicles (e.g., vehicles from the same site, vehicles operated by the same entity, etc.), and further optionally analyzes the aggregate data to identify one or more activities to improve and/or to take (e.g., predictive maintenance) with respect to one or more of the vehicles. The information determined in block 590 may further be presented or otherwise provided to one or more recipients, as well as stored for subsequent use (e.g., to later generate additional aggregated data). After block 590, or if it is instead determined in block 585 not to generate analytics data for the vehicle, the routine continues to block 595.

While the routine is performing blocks 525-590 after a first pass through blocks 515 and 520 for the vehicle, as well as optionally further performing blocks 515 and 520 additional times during one or more additional cycles, the actual operational data and digmap site data that is transferred in block 520 to the MM Training module is further analyzed and used by the module to repeatedly train at least one vehicle-specific MPC model for the vehicle. In particular, in block 570 (and for each group of transferred actual operational data and updated site map data), the routine analyzes the transferred data to generate and/or update one or more vehicle-specific trained MPC models for the vehicle, and in block 575 stores the received transferred data and current versions of the vehicle-specific trained MPC model(s) for the vehicle for subsequent use (e.g., for deployment of at least one such trained MPC model to the vehicle), as well as to provide the trained MPC model(s) upon request for such deployment and/or other purposes.

In block 595, the routine determines whether to continue, such as until an explicit indication to terminate is received, or instead only if an explicit indication to continue is received. If it is determined to continue, the routine returns to block 505 to wait for an indication of an additional vehicle for which to perform the cycle of training and deployment (and/or for other information and/or instructions), and otherwise continues to block 599 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form.

What is claimed is:

1. A computer-implemented method comprising:
repeatedly, during operations of an earth-moving vehicle for performing one or more tasks on a site under control of at least one human operator,
transferring, by a computing device on the earth-moving vehicle and to one or more computing systems remote from the earth-moving vehicle, actual operational data gathered from the earth-moving vehicle during the performing of the one or more tasks, including data about inputs supplied by the at least one human operator to controls of the earth-moving vehicle, and including perception data from one or more sensors on the earth-moving vehicle indicating at least three-dimensional (3D) surfaces of an area of the site around the earth-moving vehicle, and including vehicle data from one or more additional sensors on the earth-moving vehicle regarding vehicle status and movements of components of the earth-moving vehicle;
updating, by the computing device on the earth-moving vehicle, and based on the perception data, a 3D map of the 3D surfaces of the area of the site around the earth-moving vehicle; and
training, by the one or more computing systems remote from the earth-moving vehicle and based on the transferred actual operational data, a model predictive control (MPC) vehicle behavior and environment dynamics model specific to the earth-moving vehicle, the MPC vehicle behavior and environment dynamics model encoding information about movements of the components of the earth-moving vehicle to implement the performing of the one or more tasks and about resulting changes to the 3D surfaces of the area of the site from the performing of the one or more tasks;
determining, after training the MPC vehicle behavior and environment dynamics model, to initiate autonomous operations on the earth-moving vehicle;
deploying, by at least one of the one or more computing systems remote from the earth-moving vehicle or the computing device on the earth-moving vehicle, a current copy of the trained MPC vehicle behavior and environment dynamics model on the earth-moving vehicle, including transferring the current copy from the one or more computing systems to the earth-moving vehicle; and
initiating, by the computing device on the earth-moving vehicle and using the deployed current copy of the trained MPC vehicle behavior and environment dynamics model on the earth-moving vehicle, the autonomous operations on the earth-moving vehicle.

2. The computer-implemented method of claim 1 wherein the initiating of the autonomous operations on the earth-moving vehicle further includes:

determining, by the deployed current copy of the trained MPC vehicle behavior and environment dynamics model on the earth-moving vehicle, further movements of the components of the earth-moving vehicle to perform at least one further task resulting in predicted changes to the 3D surfaces of the area of the site; and initiating, by the computing device on the earth-moving vehicle, fully autonomous operations of the earth-moving vehicle to perform the further movements of the components of the earth-moving vehicle.

3. The computer-implemented method of claim 1 wherein the initiating of the autonomous operations on the earth-moving vehicle further includes:

determining, by the deployed current copy of the trained MPC vehicle behavior and environment dynamics model on the earth-moving vehicle, further movements of the components of the earth-moving vehicle for performing at least one further task resulting in predicted changes to the 3D surfaces of the area of the site;

monitoring, by the computing device on the earth-moving vehicle, further inputs supplied by at least one human operator to the controls of the earth-moving vehicle for performing the at least one further task; and initiating, by the computing device on the earth-moving vehicle and as part of semi-autonomous operations of the earth-moving vehicle, one or more actions to implement at least one of the further movements based on at least one of the further inputs supplied by the at least one human operator.

4. The computer-implemented method of claim 1 wherein the transferring of the actual operational data further includes transferring the updated 3D map to the one or more computing systems remote from the earth-moving vehicle and further includes transferring data about inputs supplied by two or more human operators to the controls of the earth-moving vehicle during two or more task performance sessions, and wherein the training of the MPC vehicle behavior and environment dynamics model further includes using the transferred updated 3D map and the data about the inputs supplied by the two or more human operators to the controls of the earth-moving vehicle during the two or more task performance sessions.

5. The computer-implemented method of claim 1 further comprising:

generating, by at least one of the computing device or the one or more computing systems, analytics information about performance of the earth-moving vehicle for a plurality of defined metrics over one or more periods of time; and providing the analytics information.

6. The computer-implemented method of claim 5 further comprising:

obtaining, by the one or more computing systems and for each of a plurality of additional earth-moving vehicles separate from the earth-moving vehicle, additional actual operational data gathered from that additional earth-moving vehicle during performing of at least one task by that additional earth-moving vehicle under control of one or more human operators, wherein the plurality of additional earth-moving vehicles are of a vehicle type that is same as the earth-moving vehicle and are operated by a same entity operating the earth-moving vehicle;

generating, by the one or more computing systems and for each of the plurality of additional earth-moving vehicles, additional analytics information about performance of that additional earth-moving vehicle for the plurality of defined metrics over the one or more periods of time;

determining, by the one or more computing systems, aggregated analytics information for the plurality of defined metrics by combining the generated analytics information for the earth-moving vehicle and the generated additional analytics information for each of the plurality of additional earth-moving vehicles; and providing the determined aggregated analytics information.

7. The computer-implemented method of claim 6 further comprising analyzing, by the one or more computing systems, the determined aggregated analytics information to determine one or more suggested improvements for manual performance of one or more tasks by earth-moving vehicles of the vehicle type, and providing the determined one or more suggested improvements for the manual performance of the one or more tasks.

8. The computer-implemented method of claim 1 wherein the earth-moving vehicle is one of an excavator or a bulldozer, wherein the one or more sensors on the earth-moving vehicle include at least one of one or more LiDAR sensors or one or more image sensors, wherein the one or more additional sensors on the earth-moving vehicle include one or more GPS sensors on a chassis of the earth-moving vehicle and one or more inclinometer sensors on one or more of the components of the earth-moving vehicle and one or more pressure sensors on at least one of the components of the earth-moving vehicle, and wherein the method further comprises, after the initiating of the autonomous operations and based on further input received from a human operator, changing a type of the autonomous operations for further activities performed on the earth-moving vehicle.

9. The computer-implemented method of claim 1 wherein the transferring of the actual operational data to the one or more computing systems remote from the earth-moving vehicle is performed by an operational data gatherer module executing on the computing device on the earth-moving vehicle, wherein the training of the MPC vehicle behavior and environment dynamics model is performed by a model training module executing on the one or more computing systems remote from the earth-moving vehicle, and wherein the deploying of the current copy of the trained MPC vehicle behavior and environment dynamics model on the earth-moving vehicle is performed by a deployment module executing on one of the computing device on the earth-moving vehicle or on the one or more computing systems remote from the earth-moving vehicle.

10. A system, comprising:

one or more first sensors mounted on an earth-moving vehicle on a site to obtain environment data about an area of the site around the earth-moving vehicle, including at least one of one or more LiDAR sensors, or one or more image capture devices;

a plurality of second sensors mounted on the earth-moving vehicle to obtain vehicle data about the earth-moving vehicle, including one or more GPS antennas on a cabin of the earth-moving vehicle, and one or more inclinometers mounted on movable components of the earth-moving vehicle; and a computing device on the earth-moving vehicle having one or more hardware processors and one or more memories, the one or more memories having software instructions of one or more software modules that, when executed by the one or more hardware processors, cause the computing device to perform automated operations including at least:
repeatedly, during operations of the earth-moving vehicle for performing one or more tasks on a site under control of at least one human operator,
updating, based on perception data from the one or more first sensors indicating at least surfaces of the area of the site around the earth-moving vehicle, a site map of the surfaces of the area of the site around the earth-moving vehicle; and
training, using actual operational data gathered from the earth-moving vehicle during the performing of the one or more tasks that includes data about inputs supplied by the at least one human operator to controls of the earth-moving vehicle and includes the perception data and includes vehicle data from the plurality of second sensors regarding vehicle status and movements of components of the earth-moving vehicle, a model predictive control (MPC) vehicle behavior and environment dynamics model specific to the earth-moving vehicle, the MPC vehicle behavior and environment dynamics model encoding information about movements of the components of the earth-moving vehicle to implement the performing of the one or more tasks and about resulting changes to the surfaces of the area of the site from the performing of the one or more tasks;
determining, after training the MPC vehicle behavior and environment dynamics model, to initiate autonomous operations on the earth-moving vehicle; and
initiating, using a deployed current copy of the trained MPC vehicle behavior and environment dynamics model on the earth-moving vehicle, the autonomous operations on the earth-moving vehicle.

11. The system of claim 10 further comprising one or more computing systems remote from the earth-moving vehicle, the one or more computing systems having one or more additional hardware processors and one or more additional memories, the one or more additional memories having additional software instructions of one or more additional software modules that, when executed by the one or more additional hardware processors, cause the one or more computing systems to perform additional automated operations including at least:
repeatedly receiving actual operational data that is transferred from the computing device on the earth-moving vehicle;
performing the repeated training of the MPC vehicle behavior and environment dynamics model on the one or more computing systems based on the transferred actual operational data; and
transferring the current copy of the trained MPC vehicle behavior and environment dynamics model from the one or more computing systems to the earth-moving vehicle, to cause deploying of the current copy of the trained MPC vehicle behavior and environment dynamics model to the earth-moving vehicle.

12. The system of claim 11 wherein the additional automated operations further include:
generating analytics information about performance of the earth-moving vehicle for a plurality of defined metrics over one or more periods of time; and
providing the analytics information.

13. The system of claim 12 wherein the additional automated operations further include:
obtaining, for each of a plurality of additional earth-moving vehicles separate from the earth-moving vehicle, additional actual operational data gathered from that additional earth-moving vehicle during performing of at least one task by that additional earth-moving vehicle under control of one or more human operators, wherein the plurality of additional earth-moving vehicles are of a vehicle type that is same as the earth-moving vehicle;
generating, for each of the plurality of additional earth-moving vehicles, additional analytics information about performance of that additional earth-moving vehicle for the plurality of defined metrics over the one or more periods of time;
determining aggregated analytics information for the plurality of defined metrics by combining the generated analytics information for the earth-moving vehicle and the generated additional analytics information for each of the plurality of additional earth-moving vehicles;
analyzing the determined aggregated analytics information to determine or more suggested improvements for manual performance of one or more tasks by earth-moving vehicles of the vehicle type; and
providing the determined one or more suggested improvements for the manual performance of the one or more tasks.

14. The system of claim 11 wherein transferring of the actual operational data to the one or more computing systems remote from the earth-moving vehicle is performed by an operational data gatherer module executing on the computing device on the earth-moving vehicle, wherein the training of the MPC vehicle behavior and environment dynamics model is performed by a model training module executing on the one or more computing systems remote from the earth-moving vehicle, and wherein deploying of the current copy of the trained MPC vehicle behavior and environment dynamics model to the earth-moving vehicle is performed by a deployment module executing on at least one of the computing device on the earth-moving vehicle or the one or more computing systems remote from the earth-moving vehicle.

15. The system of claim 11 wherein transferring of the actual operational data from the computing device on the earth-moving vehicle to the one or more computing systems remote from the earth-moving vehicle further includes transferring the updated site map to the one or more computing systems remote from the earth-moving vehicle and further includes transferring data about inputs supplied by two or more human operators to the controls of the earth-moving vehicle during two or more task performance sessions, and wherein training of the MPC vehicle behavior and environment dynamics model further includes using the transferred updated site map and the data about the inputs supplied by the two or more human operators to the controls of the earth-moving vehicle during the two or more task performance sessions.

16. The system of claim 10 wherein the initiating of the autonomous operations on the earth-moving vehicle further includes:
determining, by the deployed current copy of the trained MPC vehicle behavior and environment dynamics model on the earth-moving vehicle, further movements of the components of the earth-moving vehicle to perform at least one further task resulting in predicted changes to the surfaces of the area of the site; and
initiating fully autonomous operations of the earth-moving vehicle to perform the further movements of the components of the earth-moving vehicle.

17. The system of claim 10 wherein the initiating of the autonomous operations on the earth-moving vehicle further includes:
- determining, by the deployed current copy of the trained MPC vehicle behavior and environment dynamics model on the earth-moving vehicle, further movements of the components of the earth-moving vehicle for performing at least one further task resulting in predicted changes to the surfaces of the area of the site;
- monitoring further inputs supplied by the at least one human operator to the controls of the earth-moving vehicle for performing the at least one further task; and
- initiating, as part of semi-autonomous operations of the earth-moving vehicle, one or more actions to implement at least one of the further movements based on at least one of the further inputs supplied by the at least one human operator.

18. The system of claim 10 wherein the earth-moving vehicle is one of an excavator or a bulldozer, and wherein the automated operations further include, after the initiating of the autonomous operations and based on further input received from a human operator, changing a type of the autonomous operations for further activities performed on the earth-moving vehicle.

19. A computer-implemented method comprising:
- transferring, by a computing device on an earth-moving vehicle on a site and to one or more computing systems remote from the earth-moving vehicle, actual operational data gathered from the earth-moving vehicle during performing of one or more tasks under control of at least one human operator, including data about inputs supplied by the at least one human operator to controls of the earth-moving vehicle, and including perception data from one or more sensors on the earth-moving vehicle indicating at least surfaces of an area of the site around the earth-moving vehicle, and including vehicle data from one or more additional sensors on the earth-moving vehicle regarding vehicle status and movements of components of the earth-moving vehicle;
- updating, by the computing device on the earth-moving vehicle, and based on the perception data, a map of the surfaces of the area of the site around the earth-moving vehicle;
- training, by the one or more computing systems remote from the earth-moving vehicle and based on the transferred actual operational data, a vehicle behavior and environment dynamics model that is specific to the earth-moving vehicle and that represents information about movements of the components of the earth-moving vehicle to implement the performing of the one or more tasks and about resulting changes to the surfaces of the area of the site from the performing of the one or more tasks;
- deploying, by at least one of the one or more computing systems remote from the earth-moving vehicle or the computing device on the earth-moving vehicle, a current copy of the trained vehicle behavior and environment dynamics model on the earth-moving vehicle, including transferring the current copy from the one or more computing systems to the earth-moving vehicle; and
- initiating, by the computing device on the earth-moving vehicle and using the deployed current copy of the trained vehicle behavior and environment dynamics model on the earth-moving vehicle, autonomous operations on the earth-moving vehicle.

20. The computer-implemented method of claim 19 wherein the initiating of the autonomous operations on the earth-moving vehicle further includes:
- determining, by the deployed current copy of the trained vehicle behavior and environment dynamics model on the earth-moving vehicle, further movements of the components of the earth-moving vehicle to perform at least one further task resulting in predicted changes to the surfaces of the area of the site; and
- performing, by the computing device on the earth-moving vehicle, fully autonomous operations of the earth-moving vehicle to perform the further movements of the components of the earth-moving vehicle, or semi-autonomous operations of the earth-moving vehicle to implement at least one of the further movements based on a further input supplied by at least one human operator to the controls of the earth-moving vehicle for performing the at least one further task.

* * * * *